(12) United States Patent
Shimizu et al.

(10) Patent No.: US 10,594,626 B2
(45) Date of Patent: Mar. 17, 2020

(54) INFORMATION PROCESSING SYSTEM AND MANAGEMENT APPARATUS

(71) Applicant: FUJITSU LIMITED, Kawasaki-shi, Kanagawa (JP)

(72) Inventors: Toshihiro Shimizu, Kawasaki (JP); Kohta Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 16/010,544

(22) Filed: Jun. 18, 2018

(65) Prior Publication Data

US 2018/0375797 A1    Dec. 27, 2018

(30) Foreign Application Priority Data

Jun. 27, 2017   (JP) .................. 2017-125355

(51) Int. Cl.
*H04L 12/933* (2013.01)
*H04L 12/753* (2013.01)

(52) U.S. Cl.
CPC .............. *H04L 49/15* (2013.01); *H04L 45/48* (2013.01)

(58) Field of Classification Search
CPC .................................. H04L 49/15; H04L 45/48
See application file for complete search history.

(56) References Cited

U.S. PATENT DOCUMENTS

| | | | |
|---|---|---|---|
| 2015/0256451 A1* | 9/2015 | Nakashima | H04L 45/48 370/389 |
| 2015/0334035 A1* | 11/2015 | Miwa | H04L 12/6418 370/390 |
| 2016/0301565 A1* | 10/2016 | Zahid | H04L 41/0672 |

(Continued)

FOREIGN PATENT DOCUMENTS

| | | |
|---|---|---|
| JP | 2000-20501 | 1/2000 |
| JP | 2010-211553 | 9/2010 |

OTHER PUBLICATIONS

M. Valerio et al., "Recursively Scalable Fat-Trees as Interconnection Networks", IEEE 13th Annual International Phoenix Conference on Computers and Communications, pp. 40-46, 1994 (7 pages).

(Continued)

*Primary Examiner* — Lakeram Jangbahadur
(74) *Attorney, Agent, or Firm* — Fujitsu Patent Center

(57) ABSTRACT

An information processing system includes leaf switches connected in a form of a Latin square fat tree, information processing apparatuses connected to any one of the leaf switches, respectively, and a management apparatus including a first processor. The first processor extracts one or more rows and one or more columns from a lattice portion other than an infinite original point of a finite projection plane corresponding to the Latin square fat tree. The first processor specifies leaf switches corresponding to points included in the extracted one or more rows and included in the extracted one or more columns. The first processor transmits an instruction to execute an all-reduce communication, in which a result of the communication is shared by all members that execute the communication, to a predetermined number of information processing apparatuses among the information processing apparatuses connected to the specified leaf switches.

10 Claims, 56 Drawing Sheets

(56) References Cited

U.S. PATENT DOCUMENTS

2016/0352824 A1* 12/2016 Miwa .................. H04L 67/1044
2017/0085439 A1* 3/2017 Shimizu ................ H04L 49/351

OTHER PUBLICATIONS

T. Shimizu et al., "Accelaration of All-to-all Communication in Latin Square Fat-Tree, Low Cost Scalable Network Toporogy", Computing system vol. 9, No. 4, pp. 38-50, Information Processing Society of Japan, Nov. 2016 (15 pages), with Partial English Translation.

* cited by examiner

FIG. 17

| P(0, 2) | P(1, 2) | P(2, 2) |

| P(0, 1) | P(1, 1) | P(2, 1) |

| P(0, 0) | P(1, 0) | P(2, 0) |

FIG. 26

| PHASE NUMBER | COMMUNICATION 1 | COMMUNICATION 2 |
|---|---|---|
| 1 | (N4,N5) | |
| 2 | (N1,N2) | (N3,N4) |
| 3 | (N1,N3) | (N2,N4) |
| 4 | N4 -> N5 | (N2,N4) |

REPRESENTATIVE
SERVER

REPRESENTATIVE
SERVER

▨ : SPINE SWITCH

☐ : LEAF SWITCH

○ : SERVER

INFORMATION PROCESSING SYSTEM AND MANAGEMENT APPARATUS

CROSS-REFERENCE TO RELATED APPLICATION

This application is based upon and claims the benefit of priority of the prior Japanese Patent Application No. 2017-125355, filed on Jun. 27, 2017, the entire contents of which are incorporated herein by reference.

FIELD

The embodiments discussed herein are related to an information processing system and a management apparatus.

BACKGROUND

The throughput of a parallel distribution processing executed by parallel computer may be enhanced by improving the communication efficiency in the parallel computer through an optimization of a connection form of a server and a switch (i.e., network topology) in the parallel computer. In addition, when a large number of servers are connected with a small number of switches by an optimization of the network topology in the parallel computers, construction cost of the parallel computers may be suppressed.

A network topology called a Latin square fat tree is disclosed in a technical journal. The Latin square fat tree has a feature that there is only one route through a spine switch between two predetermined different leaf switches. Using the Latin square fat tree, it is possible to connect more servers with the same number of switches as compared to a common two-stage fat tree.

In the parallel computer, a collective communication called all-reduce communication is often executed. The all-reduce communication refers to a communication in which all target nodes hold the result of an operation executed using data possessed by all of the target nodes, and the name of all-reduce refers to an operation thereof. When the all-reduce can be executed by some servers in a system adopting the Latin square fat tree (hereinafter, referred to as a Latin square fat tree system), other collective communication, etc. can be executed with respect to servers other than the some servers.

Related technologies are disclosed in, for example, M. Valerio, L. E. Moser and P. M. Melliar-Smith, "Recursively Scalable Fat-Trees as Interconnection Networks", IEEE 13th Annual International Phoenix Conference on Computers and Communications, 1994.

SUMMARY

According to an aspect of the present invention, provided is an information processing system including a plurality of leaf switches connected in a form of a Latin square fat tree, a plurality of information processing apparatuses connected to any one of the plurality of leaf switches, respectively, and a management apparatus including a first processor. The first processor is configured to extract one or more rows and one or more columns from a lattice portion other than an infinite original point of a finite projective plane corresponding to the Latin square fat tree. The first processor is configured to specify leaf switches corresponding to points included in the extracted one or more rows and included in the extracted one or more columns. The first processor is configured to transmit an instruction to execute an all-reduce communication, in which a result of the communication is shared by all members that execute the communication, to a predetermined number of information processing apparatuses among the information processing apparatuses connected to the specified leaf switches.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 17 is a diagram for describing a rectangular area;

FIG. 26 is a diagram illustrating an example of a first communication table;

DESCRIPTION OF EMBODIMENTS

First Embodiment

Figure 1:
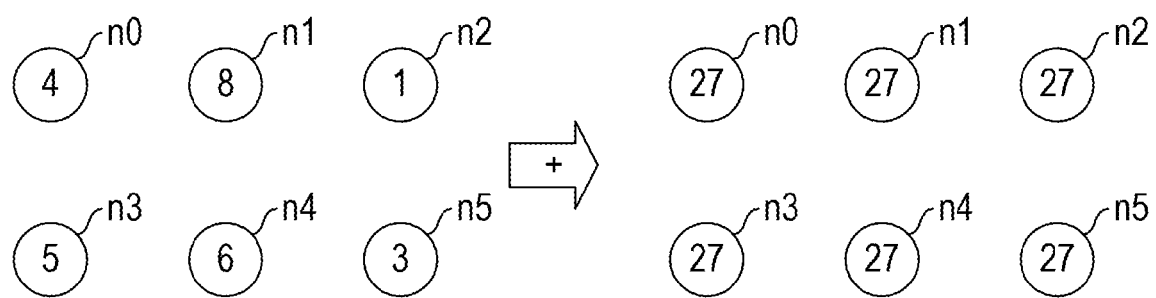
FIG. 1 is a diagram for describing all-reduce communication.

FIG. 1 to FIGS. 4A and 4B are diagrams for describing the all-reduce communication. In FIG. 1, a server n0 has a value of "4", a server n1 has a value of "8", a server n2 has a value of "1", a server n3 has a value of "5", a server n4 has a value of "6", and a server n5 has a value of "3". In a case where an operation specified in all reduce is "addition", each of the servers n0 to n5 has a value of "27".

Figure 2A:
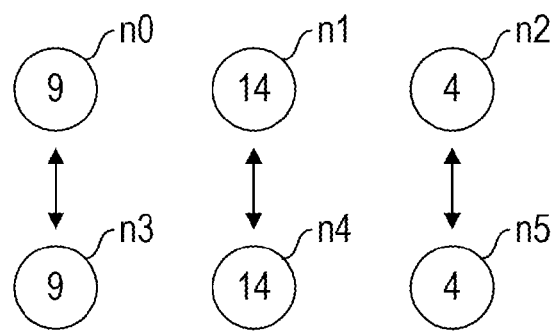
FIGS. 2A and 2B are diagrams for describing all-reduce communication.

The all-reduce communication for implementing a state illustrated on a right side of FIG. 1 is performed as illustrated in, for example, FIGS. 2A, 2B, 3A, and 3B. First, as illustrated in FIG. 2A, as the value is shared between the server n0 and the server n3, a value of "9" is calculated by the addition; as the value is shared among the server n1 and the server n4, a value of "14" is calculated by the addition; and as the value is shared between the server n2 and the server n5, the value "4" is calculated by the addition.

Figure 2B:
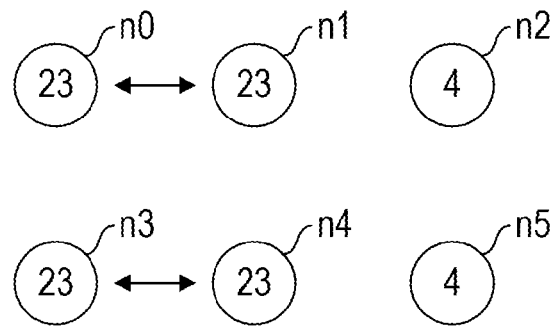

As illustrated in FIG. 2B, as the value is shared between the server n0 and the server n1, a value of "23" is calculated by the addition, and as the value is shared between the server n3 and the server n4, a value "23" is calculated by the addition.

Figure 3A:
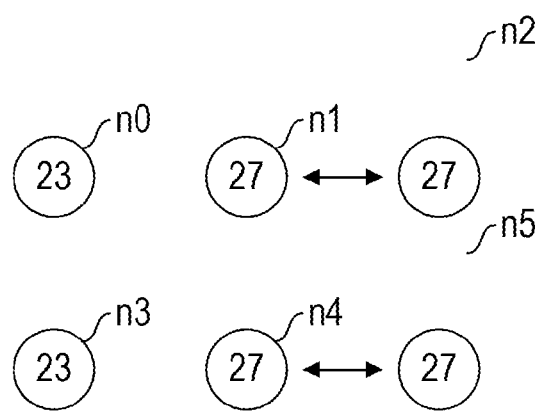
FIGS. 3A and 3B are diagrams for describing all-reduce communication.

As illustrated in FIG. 3A, as the value is shared between the server n1 and the server n2, a value of "27" is calculated by the addition, and as the value is shared between the server n4 and the server n5, the value of "27" is calculated by the addition.

Figure 3B:
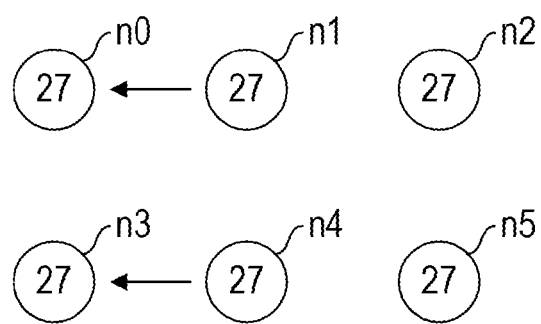

Finally, as illustrated in FIG. 3B, the server n1 transmits the value of "27" to the server n0 and the server n4 transmits the value of "27" to the server n3. As a result, as illustrated in FIG. 3B, the servers n0 to n5 may have the value of "27".

Figure 4A:
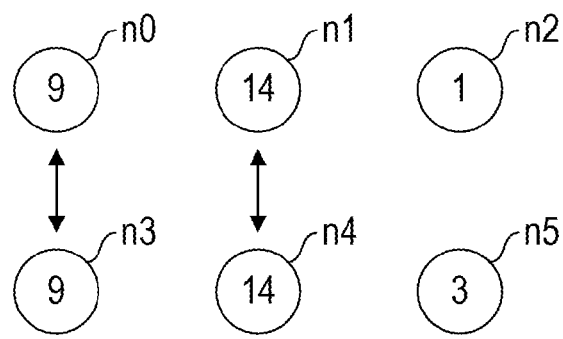
FIGS. 4A and 4B are diagrams for describing all-reduce communication.

Herein, a target may not be all of the servers n0 to n5, but some of the servers n0 to n5 may be the target. As an example, the all-reduce communication targeting the servers n0, n1, n3, and n4 will be described. First, as illustrated in FIG. 4A, as the value is shared between the server n0 and the server n3, the value of "9" is calculated by the addition, and as the value is shared between the server n1 and the server n4, the value of "14" is calculated by the addition.

Figure 4B:
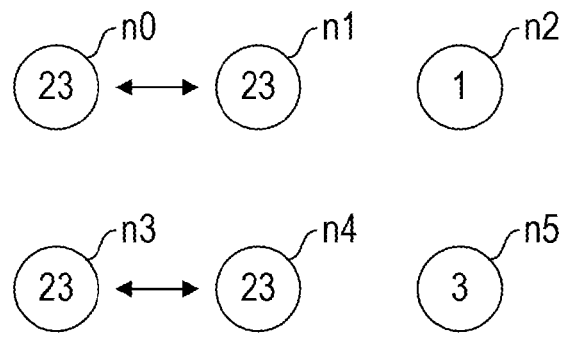

As illustrated in FIG. 4B, as the value is shared between the server n0 and the server n1, a value of "23" is calculated by the addition, and as the value is shared between the server n3 and the server n4, the value of "23" is calculated by the addition. As a result, the servers n0, n1, n3, and n4 may have the value of "23".

Figure 5:
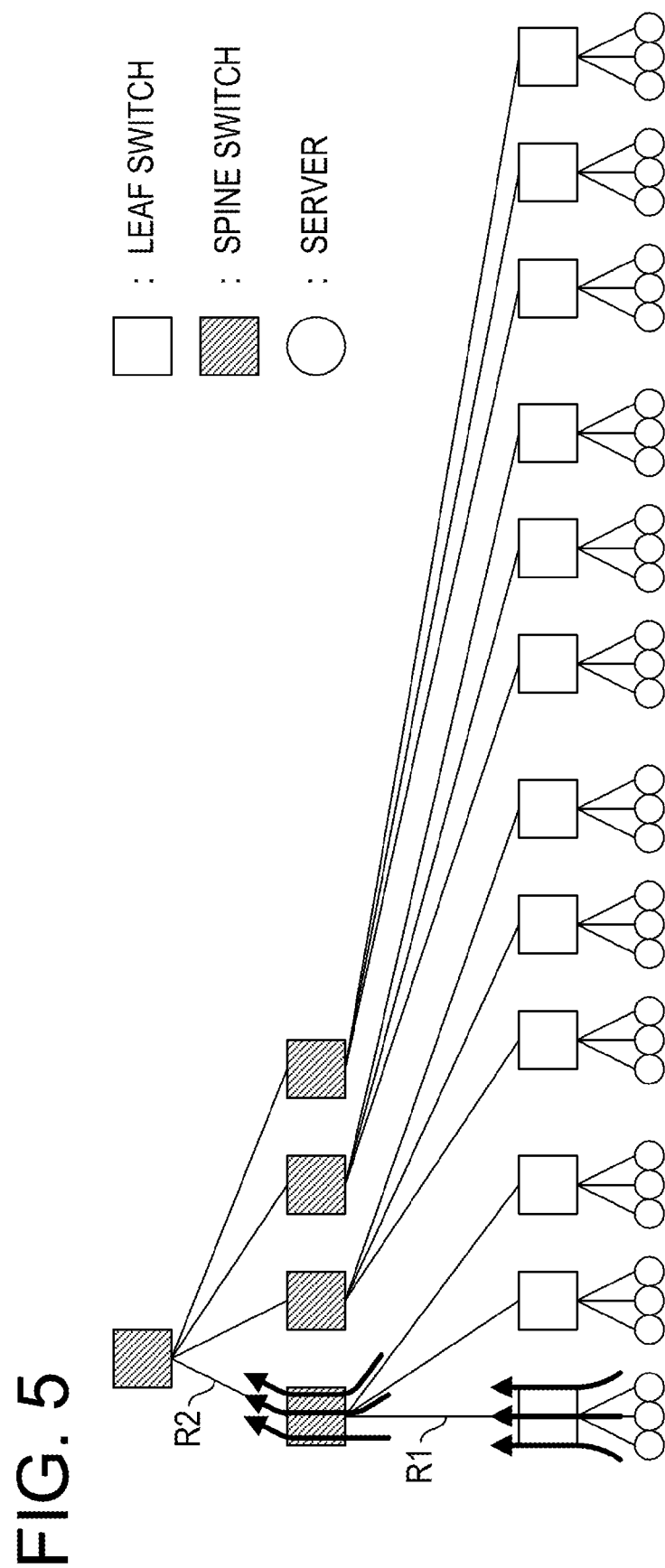
FIG. 5 is a diagram illustrating route contention when the all-reduce communication is executed in topology having a general tree structure.
Figure 6:
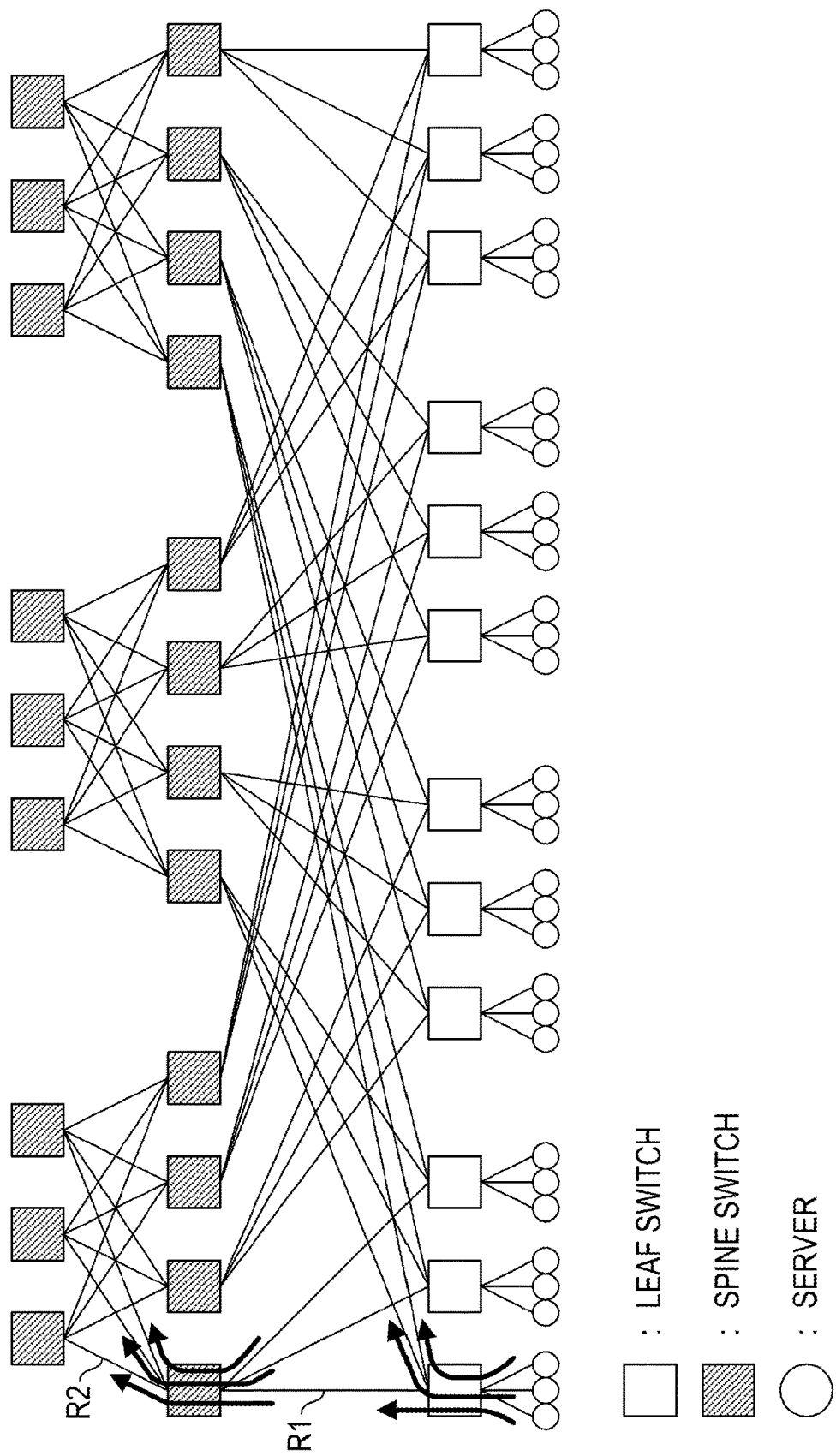
FIG. 6 is a diagram illustrating route contention when the all-reduce communication is executed in topology having a fat tree structure.

In the embodiment, it is considered that a route contention is avoided when such all-reduce communication is executed by some servers in a Latin square fat tree system. Herein, the route contention indicates that a plurality of packets is simultaneously transmitted in the same direction of one route and a communication time becomes longer due to an occurrence of the route contention. For example, FIG. 5 illustrates a route contention when the all-reduce communication is executed in a network topology having a general tree structure. In FIG. 5, a circled figure represents a server, a non-hatched square figure represents a leaf switch, and a hatched square figure represents a spine switch. In FIG. 5, the route contention occurs in a route R1 and the route contention also occurs in a route R2. In this case, for example, as illustrated in FIG. 6, the route contention may be avoided by changing the tree structure to a fat tree structure. However, when the fat tree structure is adopted, the total number of switches becomes larger than that in the example of FIG. 5.

Figure 7:
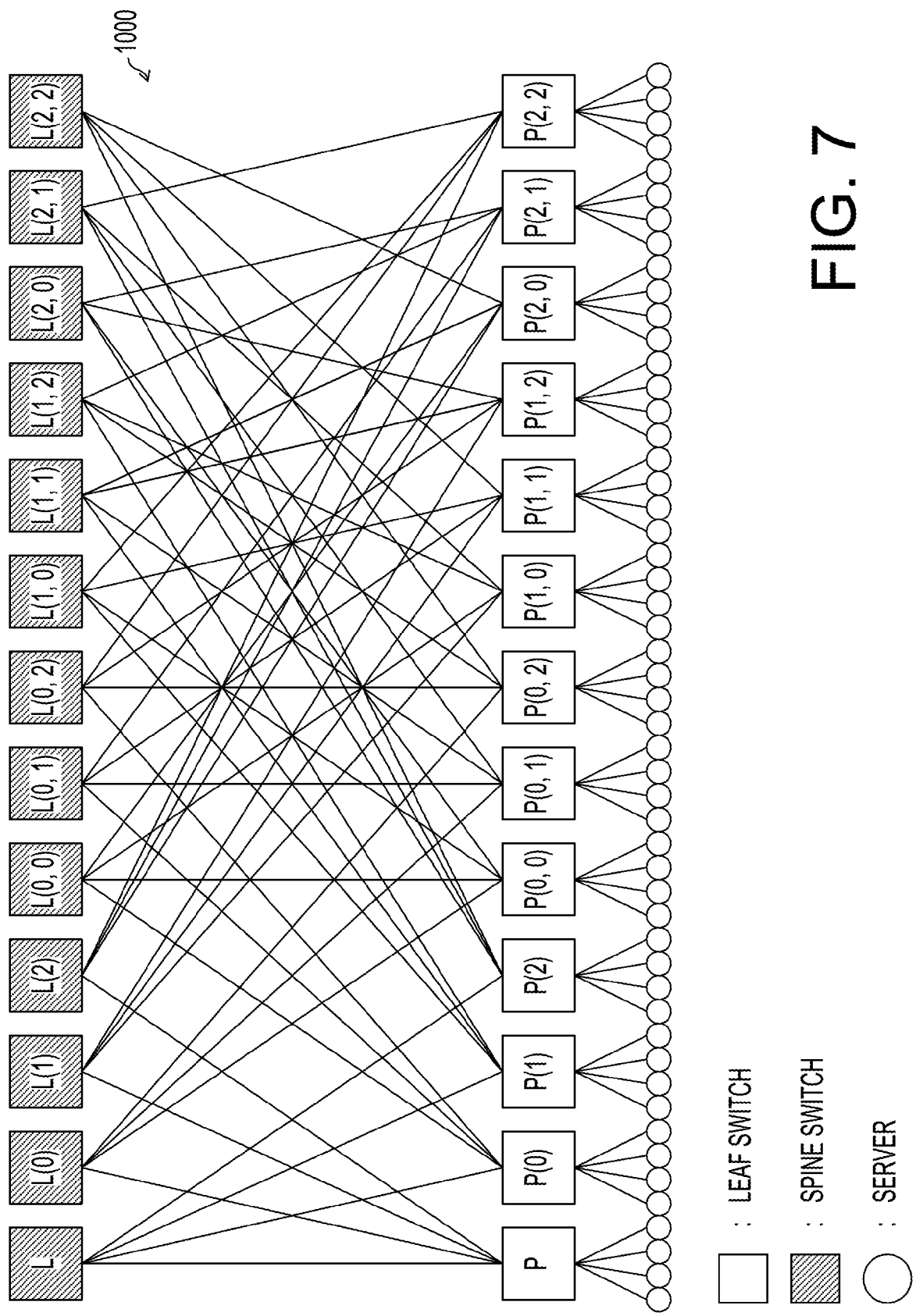
FIG. 7 is a diagram illustrating an overview of a Latin square fat tree system of the embodiment.

FIG. 7 is a diagram illustrating a Latin square fat tree system 1000 of the embodiment. In the embodiment, a connection form between 13 spine switches and 13 leaf switches is a Latin square fat tree. Since 4 servers are connected to each leaf switch, the Latin square fat tree system 1000 has 52 servers that execute parallel distribution processing. The spine switch and the leaf switch are, for example, infini-band switches. The server is, for example, a physical server. Hereinafter, the number of servers connected to the leaf switch is set to d. In the embodiment, d=4.

In the example of FIG. 7, the number of spine switches and the number of leaf switches are 13, but may be other than 13. For other examples, see an appendix.

Figure 8:
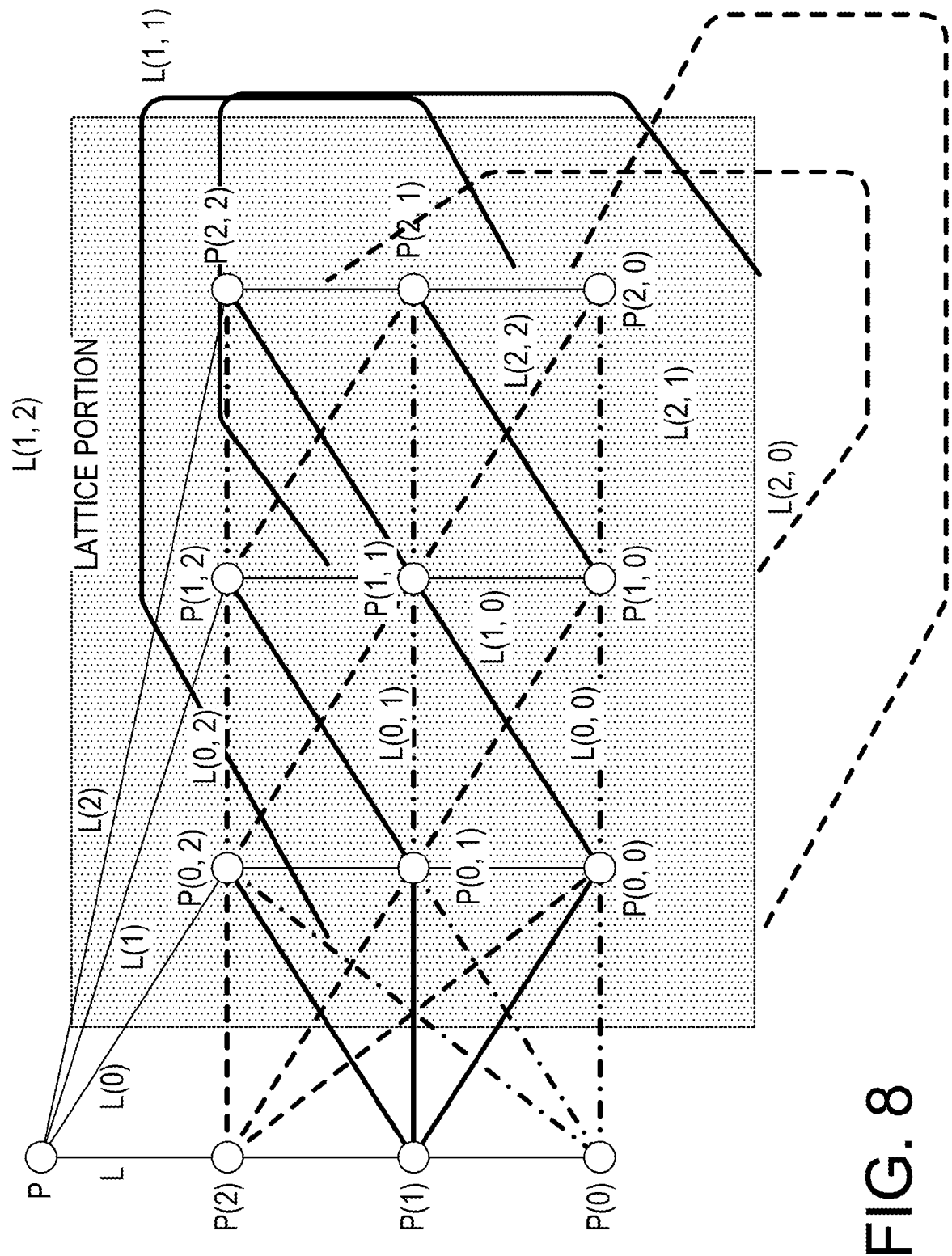
FIG. 8 is a diagram illustrating a finite projective plane.

In FIG. 7, a character string representing a point on the finite projective plane corresponding to the Latin square fat tree illustrated in FIG. 7 is attached to each spine switch and each leaf switch. FIG. 8 is a diagram illustrating a finite projective plane corresponding to the Latin square fat tree illustrated in FIG. 7. The order of the finite projective plane illustrated in FIG. 8 is 3 and the number of ports of the spine switch or the leaf switch is 8. The point represents the leaf switch and a straight line represents the spine switch. In a case where a lattice portion is determined as illustrated in FIG. 7, a leaf switch P, a leaf switch P(0), a leaf switch P(1), and a leaf switch P(2) correspond to infinite far points. Further, for the finite projective plane, see the appendix.

Figure 9:
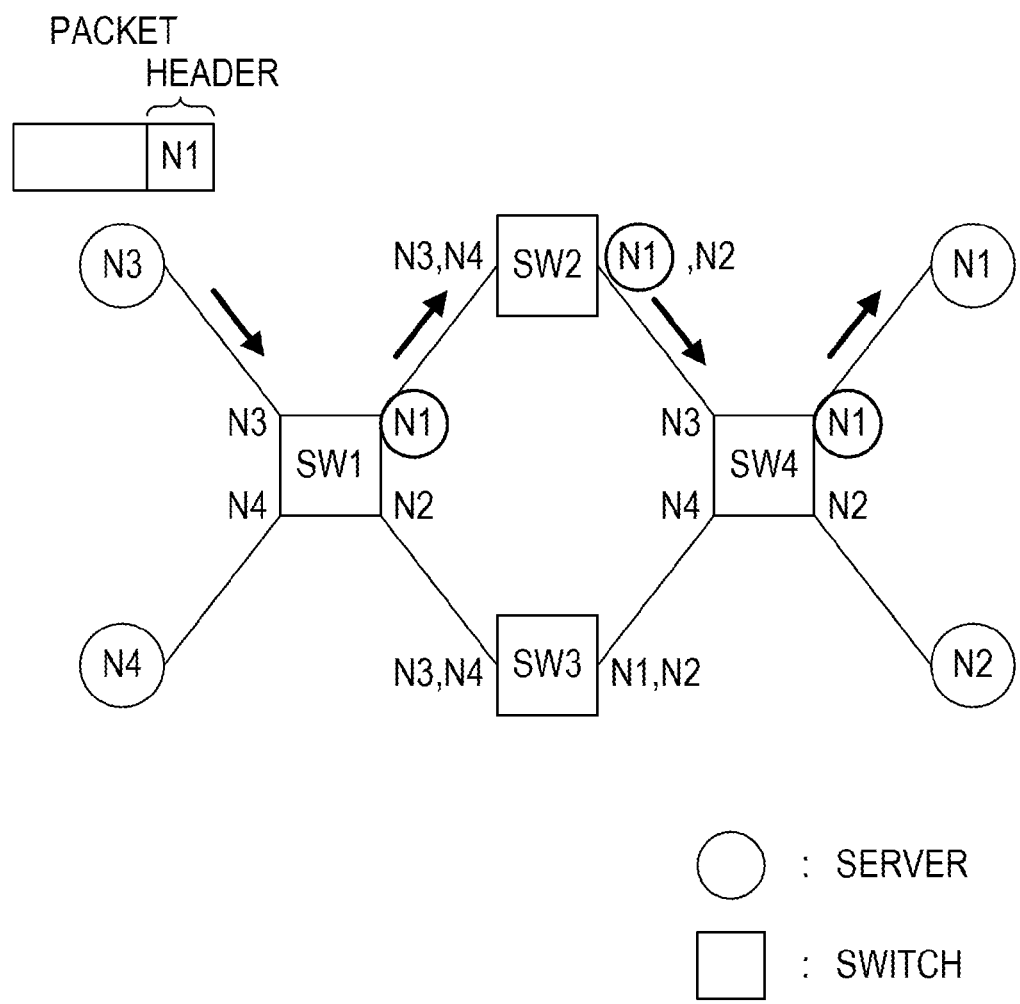
FIG. 9 is a diagram for describing routing in a network of an infinite band.

In the Latin square fat tree system 1000 of the embodiment, in order to avoid the route contention, an InfiniBand network in which regular and fixed routing is performed is used. The routing in the InfiniBand network will be described with reference to FIG. 9. In FIG. 9, the circled figure represents the server and a square figure represents the switch. A line segment represents a link of the InfiniBand and the character string next to the line segment represents identification information of the server at a receiving destination. A thick solid arrow represents a communication route.

In the example of FIG. 9, the server N3 transmits a packet whose receiving destination is the server N1. A header of the packet includes identification information (e.g., local identifier (LID)) of the receiving destination. Since the identification information of the server as the receiving destination corresponds to each output port in each switch, each switch outputs the packet to the output port corresponding to the identification information of the receiving destination, which is included in the packet. In the example of FIG. 9, the packet reaches the server N1 via a switch SW1, a switch SW2, and a switch SW4.

As described above, the network of the embodiment is not a network in which the route is automatically determined like Ethernet (registered trademark), but a network in which regular and fixed routing is performed.

Apart from the identification information, it is assumed that the number is allocated to each server. Specifically, any one number of 0 to 3 is allocated to each of four servers connected to each leaf switch and the server allocated with "0", the server allocated with "1", the server allocated with "2", and the server allocated with "3' are connected to each leaf switch.

Figure 10:
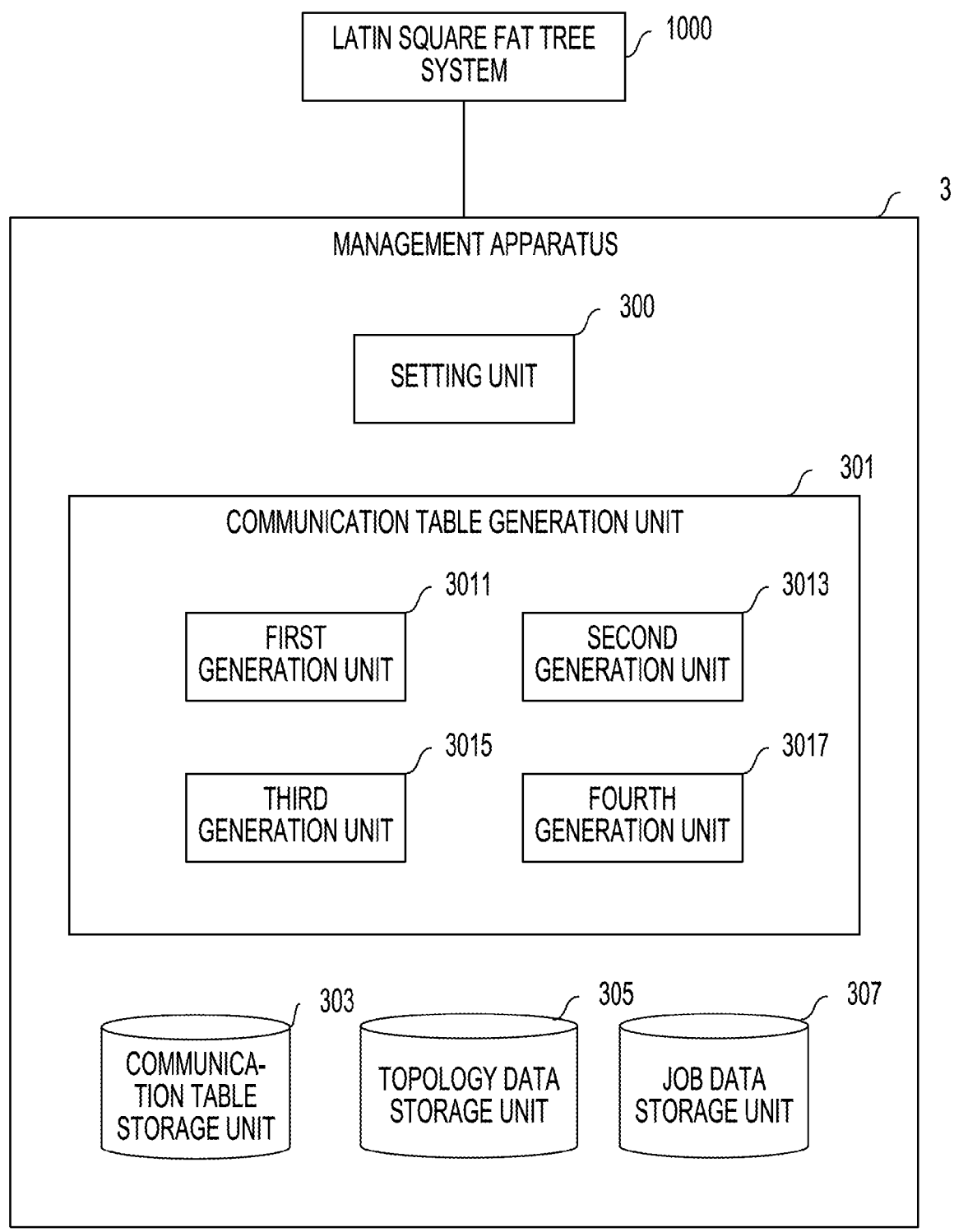
FIG. 10 is a functional block diagram of a management apparatus.

As illustrated in FIG. 10, the Latin square fat tree system 1000 is connected to a management apparatus 3 by a management local area network (LAN) or the like, and the communication in the Latin square fat tree system 1000 is managed by the management apparatus 3. The management apparatus 3 includes a setting unit 300, a communication table generation unit 301, a communication table storage unit 303, a topology data storage unit 305, and a job data storage unit 307. The communication table generation unit 301 includes a first generation unit 3011, a second generation unit 3013, a third generation unit 3015, and a fourth generation unit 3017. The setting unit 300 and the communication table generation unit 301 are implemented, for example, by executing a program loaded in a memory 2501 in FIG. 55 on a central processing unit (CPU) 2503. The communication table storage unit 303, the topology data storage unit 305, and the job data storage unit 307 are installed, for example, in the memory 2501 or a hard disk drive (HDD) 2505 in FIG. 55.

Based on data stored in the topology data storage unit 305, the setting unit 300 performs the processing of selecting some servers executing the all-reduce among the servers in the Latin square fat tree system 1000 (hereinafter, referred to as execution servers) and stores a processing result in the job data storage unit 307. Based on the information of the network topology of the Latin square fat tree system 1000, which is stored in the topology data storage unit 305 and the data stored in the job data storage unit 307, the first generation unit 3011 generates a first communication table and stores the generated first communication table in the communication table storage unit 303. Based on the information of the network topology of the Latin square fat tree system 1000, which is stored in the topology data storage unit 305 and the data stored in the job data storage unit 307, the second generation unit 3013 generates a second communication table and stores the generated second communication table in the communication table storage unit 303. Based on the information of the network topology of the Latin square fat tree system 1000, which is stored in the topology data storage unit 305 and the data stored in the job data storage unit 307, the third generation unit 3015 generates a third communication table and stores the generated third communication table in the communication table storage unit 303. Based on the information of the network topology of the Latin square fat tree system 1000, which is stored in the topology data storage unit 305 and the data stored in the job data storage unit 307, the fourth generation unit 3017 generates a fourth communication table and stores the generated fourth communication table in the communication table storage unit 303. The communication table generation unit 301 transmits the first to fourth communication tables stored in the communication table storage unit 303 to the server selected by the setting unit 300 at a predetermined timing or according to a request.

Figure 11:
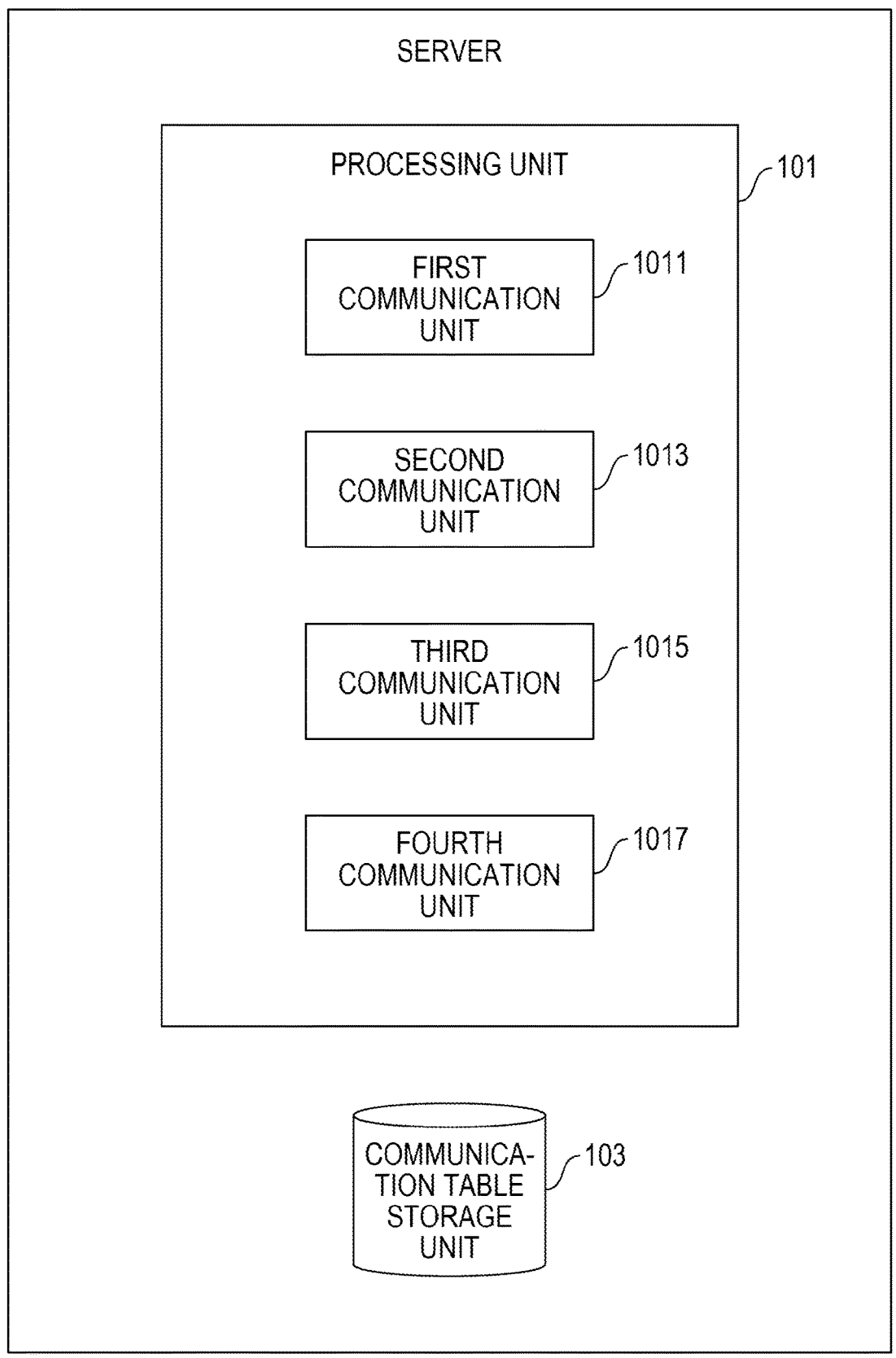
FIG. 11 is a functional block diagram of a server.

FIG. 11 is a functional block diagram of a server. The server includes the processing unit 101 and the communication table storage unit 103. The processing unit 101 includes a first communication unit 1011, a second communication unit 1013, a third communication unit 1015, and a fourth communication unit 1017. The processing unit 101 is implemented, for example, by executing the program loaded to the memory 2501 in FIG. 55 on the CPU 2503. The communication table storage unit 103 is installed, for example, in the memory 2501 or the HDD 2505 in FIG. 55.

The communication table storage unit 103 stores the first to fourth communication tables received from the management apparatus 3. The first communication unit 1011 performs communication according to the first communication table stored in the communication table storage unit 103. The second communication unit 1013 performs the communication according to the second communication table stored in the communication table storage unit 103. The third communication unit 1015 performs the communication according to the third communication table stored in the communication table storage unit 103. The fourth communication unit 1017 performs the communication according to the fourth communication table stored in the communication table storage unit 103.

Figure 12:
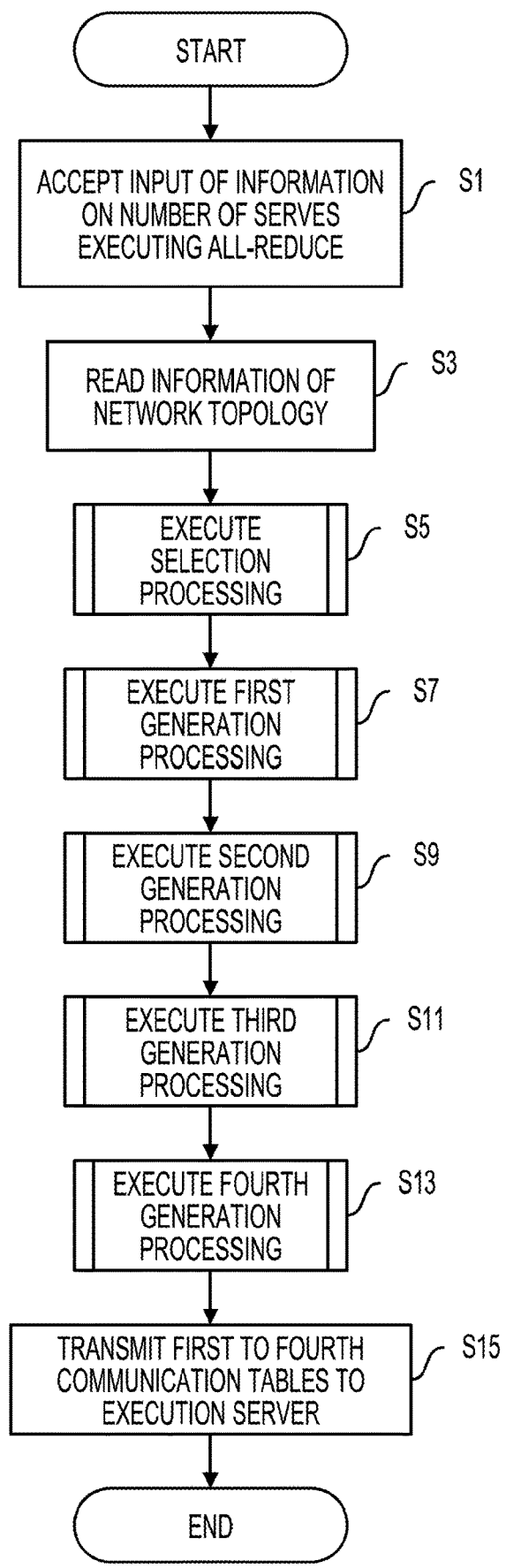
FIG. 12 is a diagram illustrating a processing flow of processing executed by the management apparatus.

Next, with reference to FIGS. 12 to 38, the processing executed by the management apparatus 3 will be described. FIG. 12 is a diagram illustrating a processing flow of processing executed by the management apparatus 3.

The setting unit 300 in the management apparatus 3 receives an input of information on the number of servers that execute the all-reduce (i.e., execution servers) (FIG. 12: step S1). The information on the number of execution servers is input by, for example, an administrator.

The setting unit 300 reads the information of the network topology of the Latin square fat tree system 1000 from the topology data storage unit 305 (step S3). The information of the network topology includes, for example, information on a connection relationship among the spine switch, the leaf switch, and the server.

The setting unit 300 executes the selection processing based on the information input in step S1 and the information read in step S3 (step S5). The selection processing will be described below.

The first generation unit 3011 executes first generation processing which is processing of generating the first communication table based on the information of the network topology read in step S3 and the data stored in the job data storage unit 307 (step S7). The first generation processing will be described below.

The second generation unit 3013 executes second generation processing which is processing of generating the second communication table based on the information of the network topology read in step S3 and the data stored in the job data storage unit 307 (step S9). The second generation processing will be described below.

The third generation unit 3015 executes third generation processing which is processing of generating the third communication table based on the information of the network topology read in step S3 and the data stored in the job data storage unit 307 (step S11). The third generation processing will be described below.

The fourth generation unit 3017 executes fourth generation processing which is processing of generating the fourth communication table based on the information of the network topology read in step S3 and the data stored in the job data storage unit 307 (step S13). The fourth generation processing will be described below.

The communication table generation unit 301 reads the first to fourth communication tables stored in the communication table storage unit 303 and transmits the read first to fourth communication tables to the execution server (step S15). In addition, the processing ends.

When such processing is executed, the server which receives the first to fourth communication tables may execute the all-reduce communication in an appropriate order.

Figure 13:
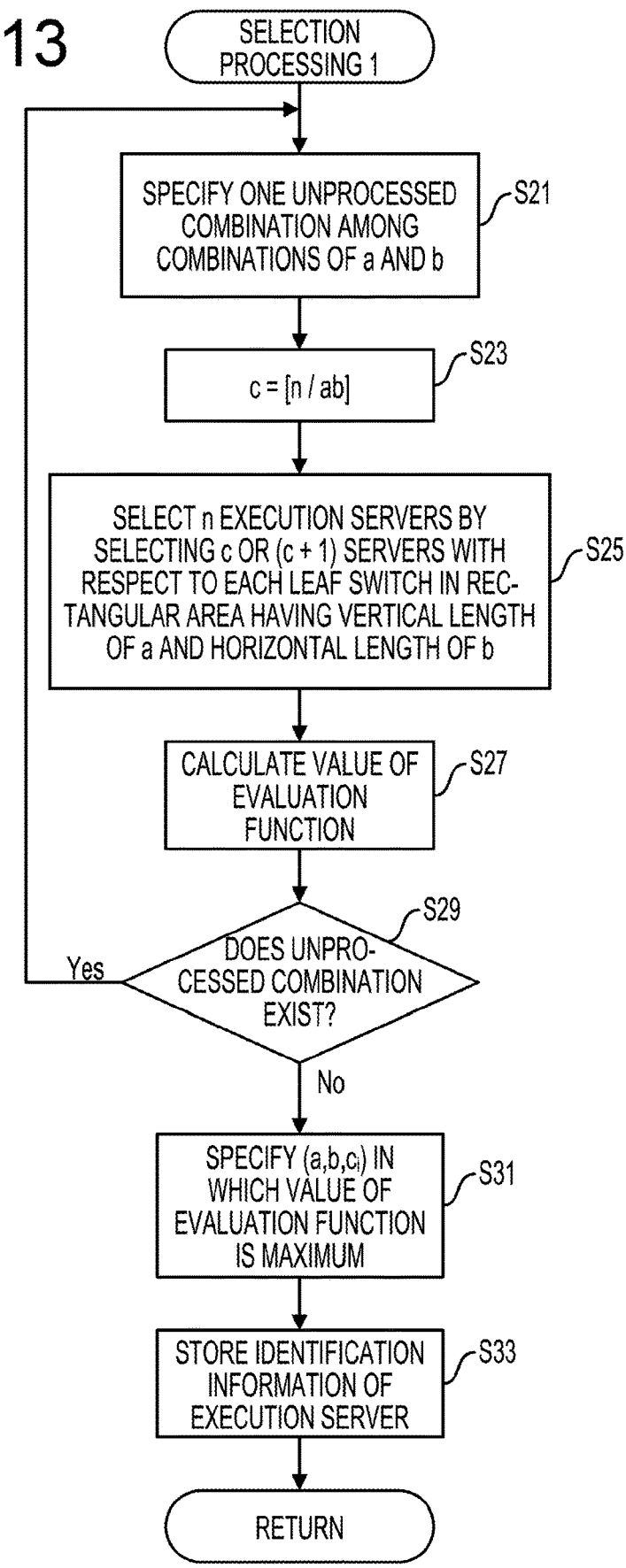
FIG. 13 is a diagram illustrating the processing flow of selection processing according to a first embodiment.

Next, the selection processing of the first embodiment will be described with reference to FIGS. 13 to 19. FIG. 13 is a diagram illustrating the processing flow of the selection processing.

The setting unit 300 specifies one unprocessed combination among combinations of variables a and b (FIG. 13: step S21). The variable a satisfies $1 \leq a \leq d$ and represents a vertical length (i.e., the number of rows) of a rectangle included in the lattice portion. The variable b satisfies $1 \leq b \leq d$ and represents a horizontal length (i.e., the number of columns) of the rectangle included in the lattice portion.

The setting unit 300 sets a variable c as $c=[n/ab]$ (step S23). The variable c is a variable for determining the number of execution servers connected to one leaf switch. Here, n represents the number of execution servers, which is indicated by the information input in step S1. "[ ]" represents a Gaussian symbol and $[n/ab]$ is an integer part of $(n/ab)$. Hereinafter, the leaf switch connected to the execution server is called an execution switch.

The setting unit 300 selects c or (c+1) execution servers for each leaf switch in a rectangular area whose vertical length is a and horizontal length is b in the lattice portion to select a total of n execution servers (step S25).

Figure 14:
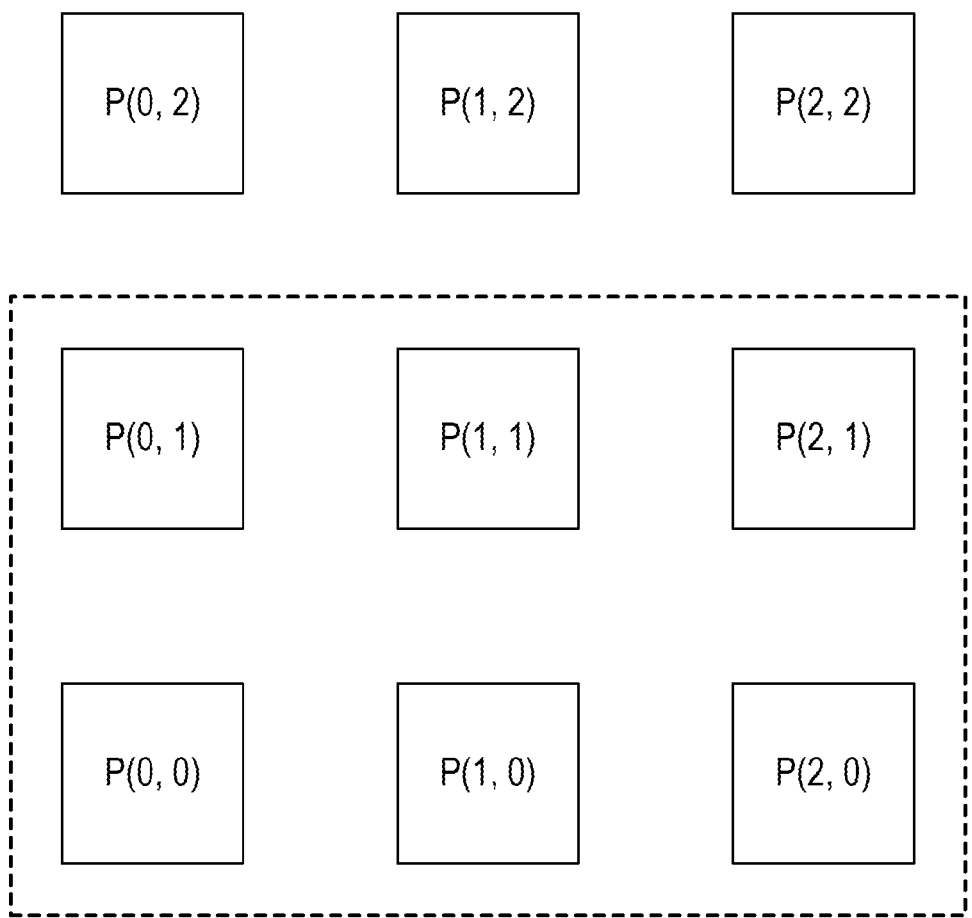
FIG. 14 is a diagram for describing a rectangular area.
Figure 15:
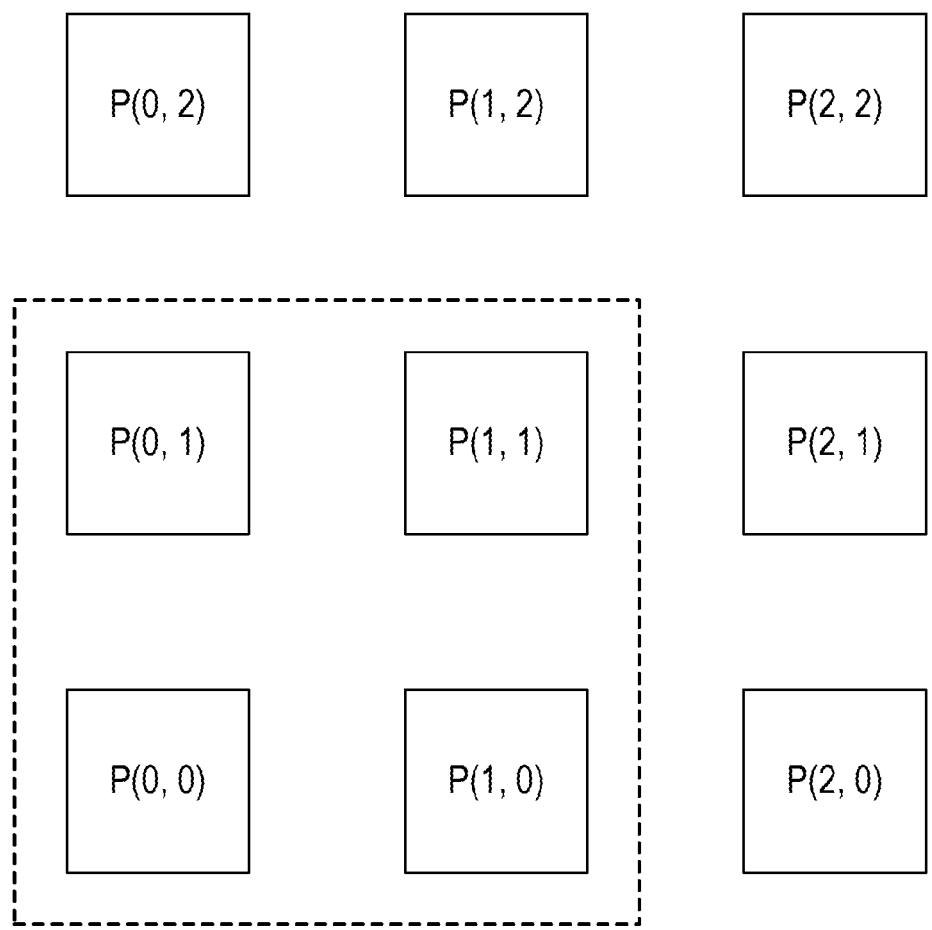
FIG. 15 is a diagram for describing a rectangular area.

FIG. 14 is a diagram illustrating an example of a rectangular area. In the example of FIG. 14, a rectangular area is illustrated, which includes a leaf switch P(0,0), a leaf switch P(0,1), a leaf switch P(1,0), a leaf switch P(1,1) a leaf switch P(2,0), and a leaf switch P(2,1). In this case, a=2 and b=3. In the first embodiment, c or (c+1) servers are selected as the execution servers from each leaf switch in the rectangular area.

The setting unit 300 calculates a value of an evaluation function f based on the variables a and b and the number of execution servers connected to each execution switch (hereinafter referred to as $c_i$) (step S27). For example, the evaluation function f is set based on communication cost, a use situation of the server connected to the leaf switch (e.g., usable or unusable), and a physical position of the leaf switch and as the value of the evaluation function f becomes larger, the combination of the variable a, the variable b, and the variable $c_i$ is preferable for execution of the all-reduce.

The setting unit 300 determines whether there is the unprocessed combination among the combinations of the variables a and b (step S29). When there is the unprocessed combination (step S29: Yes route), the processing returns to step S21.

In the meantime, when there is no unprocessed combination (step S29: No route), the setting unit 300 executes the following processing. Specifically, the setting unit 300 specifies the variables a, b, and $c_i$ in a case where the value of the evaluation function calculated in step S27 is the maximum (step S31).

The setting unit 300 sets the rectangular area in the lattice portion based on the specified variables a and b. In addition, based on the specified variable $c_i$, the setting unit 300 specifies the execution server for each leaf switch in the rectangular area and stores the identification information of the execution server in the job data storage unit 307 (step S33). In addition, the processing returns to a calling source.

When such processing is executed, an appropriate server may be caused to execute the all reduce from the viewpoint of the communication cost and the like.

Further, the rectangular area is not limited to the example as illustrated in FIG. 14. For example, the rectangular area may be a rectangular area illustrated in FIG. 15. That is, the rectangular area may be a rectangular area in which the number of rows is less than the number of rows in the lattice portion and the number of columns is less than the number of columns in the lattice portion.

Figure 16:
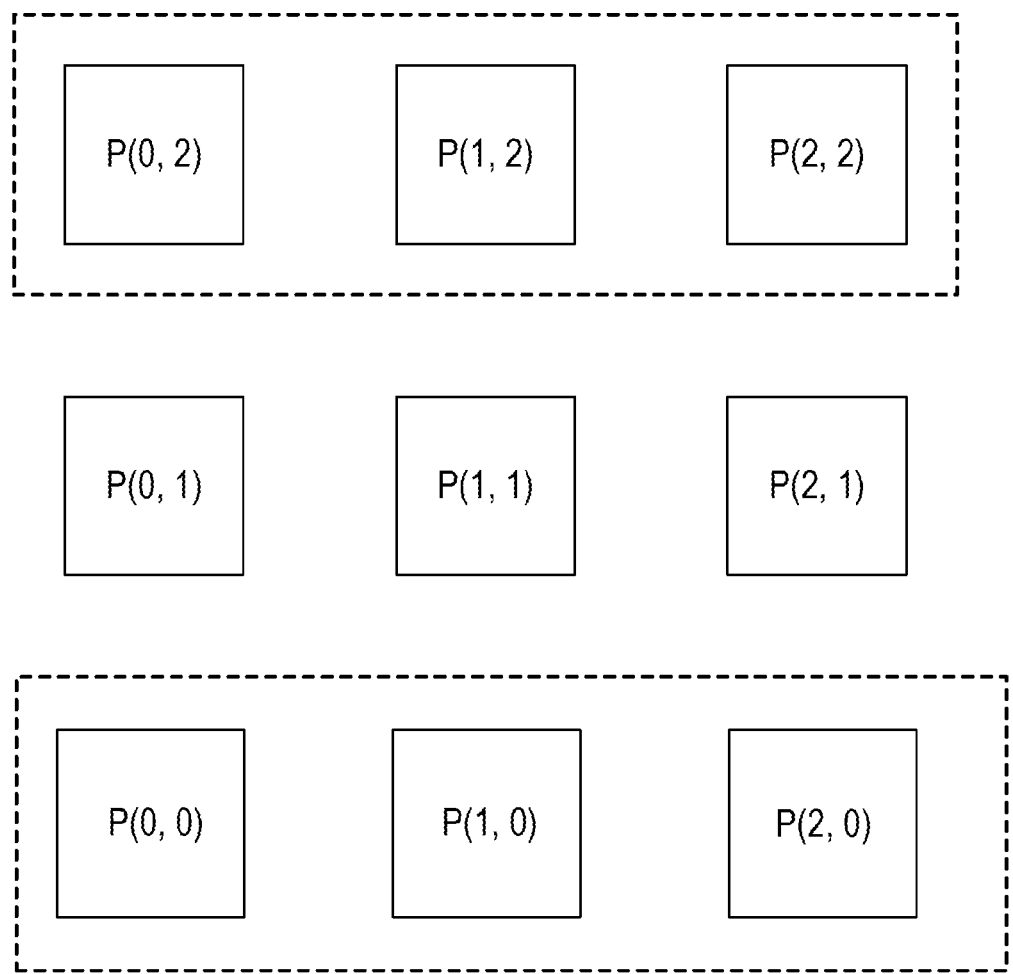
FIG. 16 is a diagram for describing a rectangular area.

Further, the rectangular area may be, for example, a rectangular area illustrated in FIG. 16. That is, the rectangular area may be divided into two or more rectangular areas. Further, in the example of FIG. 16, since the leaf switch P(0,0) and the leaf switch P(0,2) are connected to the same spine switch, the leaf switch P(1,0) and the leaf switch P(1,2) are connected to the same spine switch, and the leaf switch P(2,0) and the leaf switch P(2,2) are connected to the same spine switch, the communication cost of the example of FIG. 16 is the same as the communication cost of the example of FIG. 14.

Figure 17:
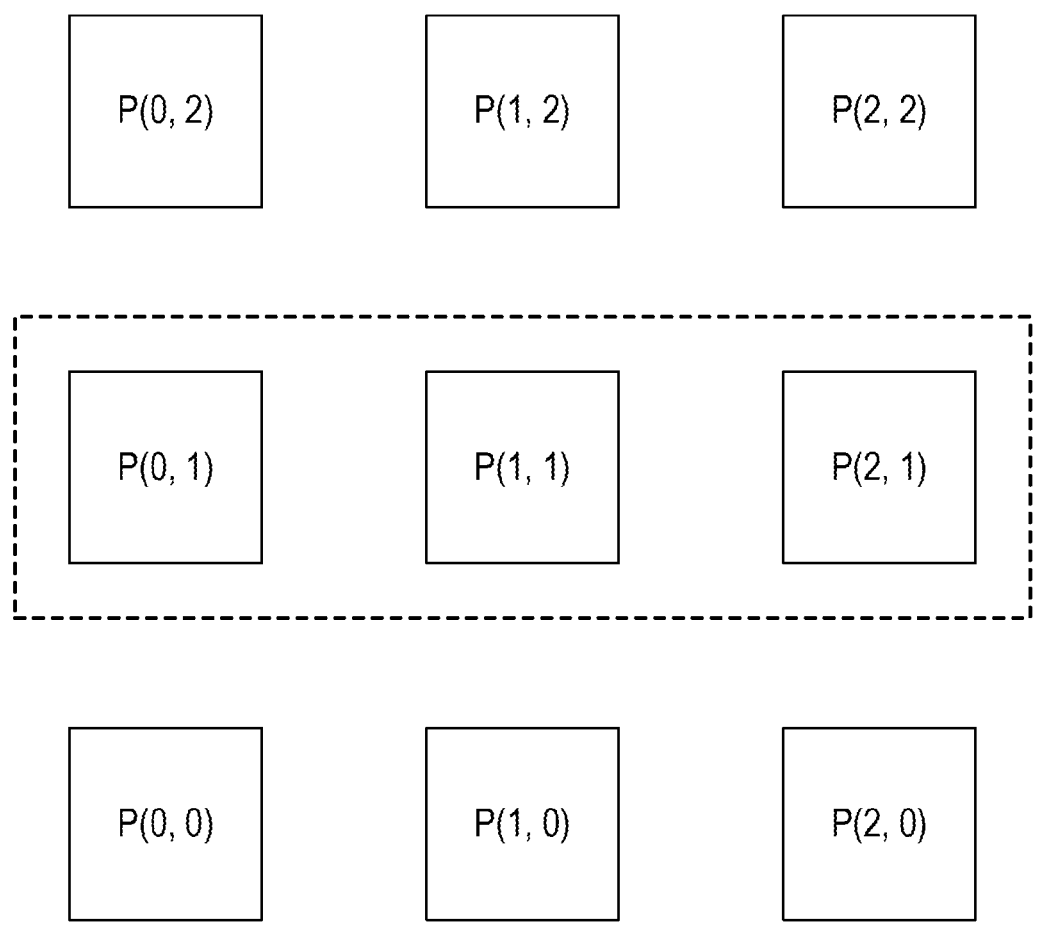

The rectangular area may be, for example, a rectangular area illustrated in FIG. 17. That is, the number of rows may be one and the number of columns may be one. When the number of rows is 1, the all-reduce implemented by the second communication table (i.e., all-reduce in a column direction) may be omitted. Further, when the number of columns is 1, the all-reduce implemented by the third communication table (i.e., all-reduce in a row direction) may be omitted.

Figure 18:
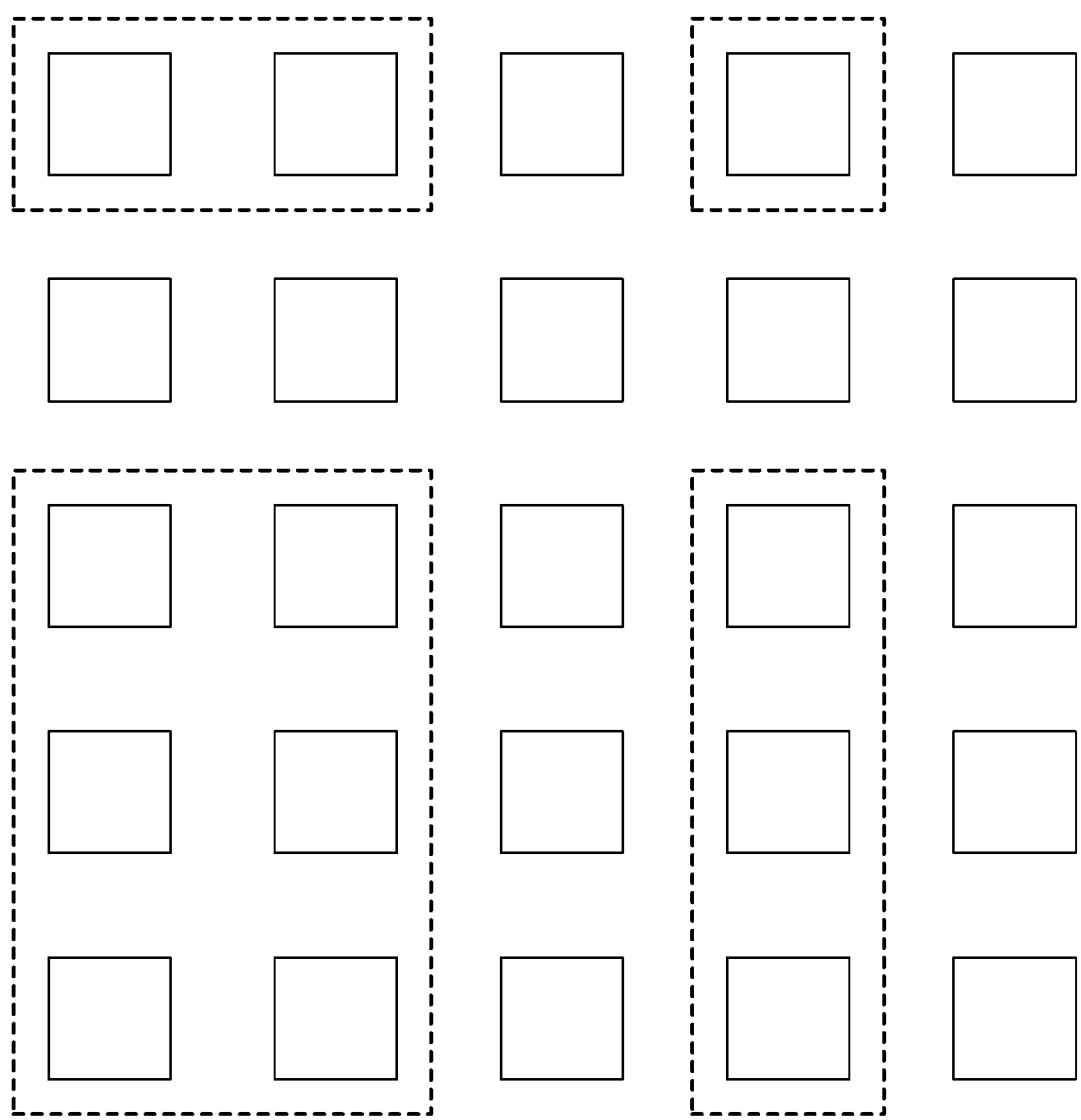
FIG. 18 is a diagram for describing a rectangular area.

It is possible to similarly set even a rectangular area when the size of the lattice portion is not 3×3. For example, as illustrated in FIG. 18, when the size of the lattice portion is 5×5, a rectangular area may be set as indicated by a broken line in FIG. 18.

Figure 19:
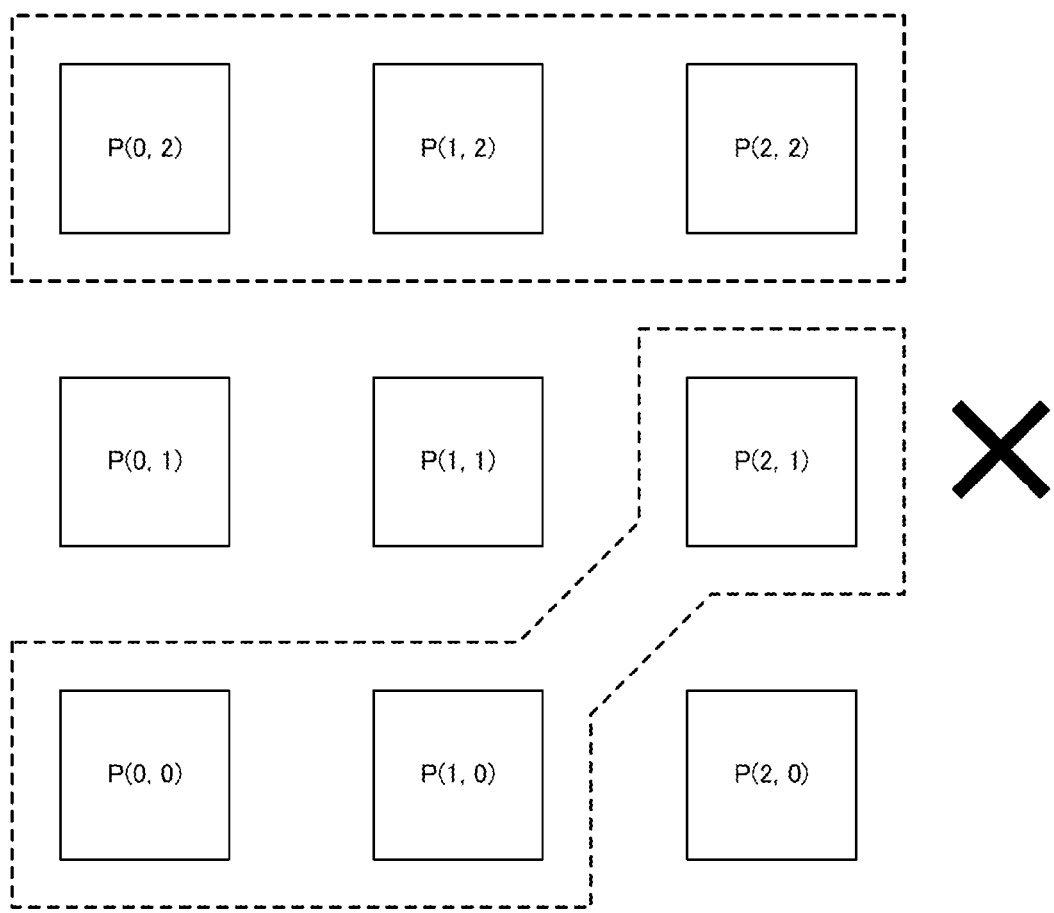
FIG. 19 is a diagram for describing a rectangular area.

As illustrated in FIGS. 14 to 18, a leaf switch included in any one of a rows selected from the lattice portion and included in any one of b columns selected from the lattice portion may be handled as the leaf switch in the rectangular area. Contrary to this, for example, when the rectangular area is set as illustrated in FIG. 19, the leaf switch P(2,1) is not connected to a spine switch L(0,0) to which the leaf switch P(0,0) and the leaf switch P(1,0) are connected so as not to efficiently perform communication. Therefore, the rectangular area illustrated in FIG. 19 is not permitted.

Figure 20:
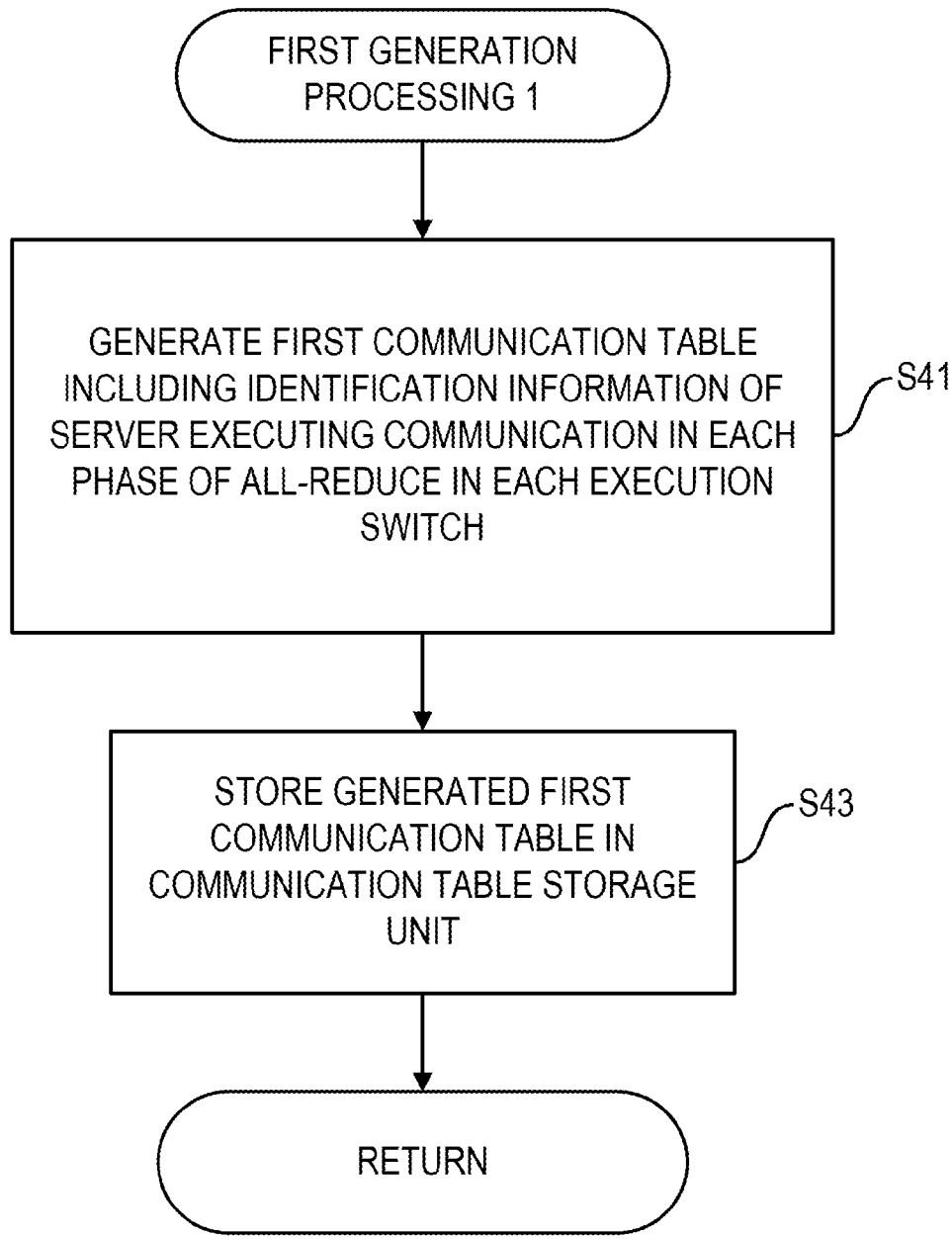
FIG. 20 is a diagram illustrating the processing flow of first generation processing according to the first embodiment.

Next, the first generation processing will be described with reference to FIGS. 20 to 26. FIG. 20 is a diagram illustrating the processing flow of first generation processing according to the first embodiment.

The first generation unit 3011 generates the first communication table including the identification information of the server that executes the communication in each phase of the all-reduce in each execution switch (FIG. 20: step S41).

FIGS. 21A and 21B to FIG. 25 are diagrams for describing the all-reduce between the servers connected to the execution switch. In FIGS. 21A and 21B to FIG. 25, a square figure represents a leaf switch which is the execution switch, the circled figure represents the server, and the line segment connecting the leaf switch and the server represents a link. The number attached to the server represents the value held by the server.

First, a case where the number of servers connected to the leaf switch is an even number (herein, 4 which is a power of 2) will be described with reference to FIGS. 21A, 21B, and 22.

Figure 21A:
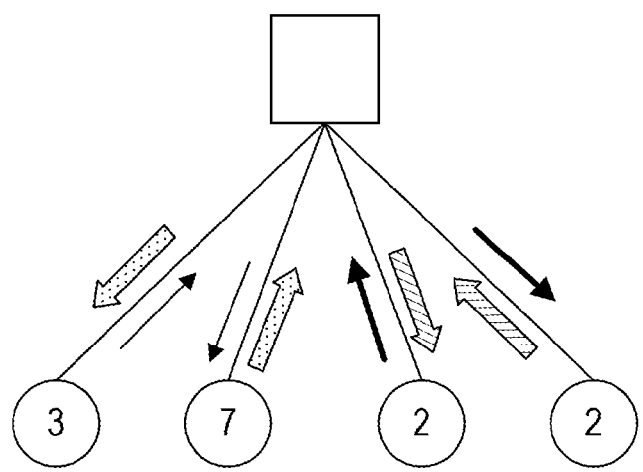
FIGS. 21A and 21B are diagrams for describing all-reduce between servers connected to an execution switch.

For example, it is assumed that 4 servers have "3", "7", "2", and "2", respectively, as illustrated in FIG. 21A. In this case, the value is shared in each of a pair including two servers and an operation of the value (herein, addition) is performed. In this case, since a plurality of packets is not simultaneously transmitted in the same direction of one route, the route contention does not occur.

Figure 21B:
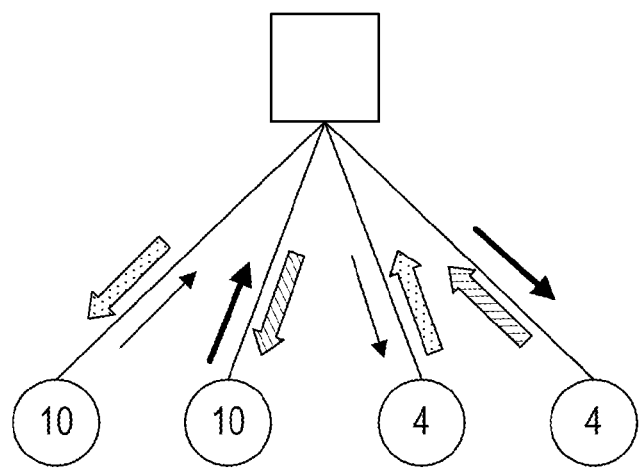

Then, it is assumed that 2 servers have a value of "10" and two remaining servers have a value of "4" as illustrated in FIG. 21B. In addition, the value in each of the pair including the server having the value of "10" and the server having the value of "4" is shared and an operation of the value (herein, addition) is performed. Herein, since the plurality of packets is not simultaneously transmitted in the same direction of one route, the route contention does not occur.

Figure 22:
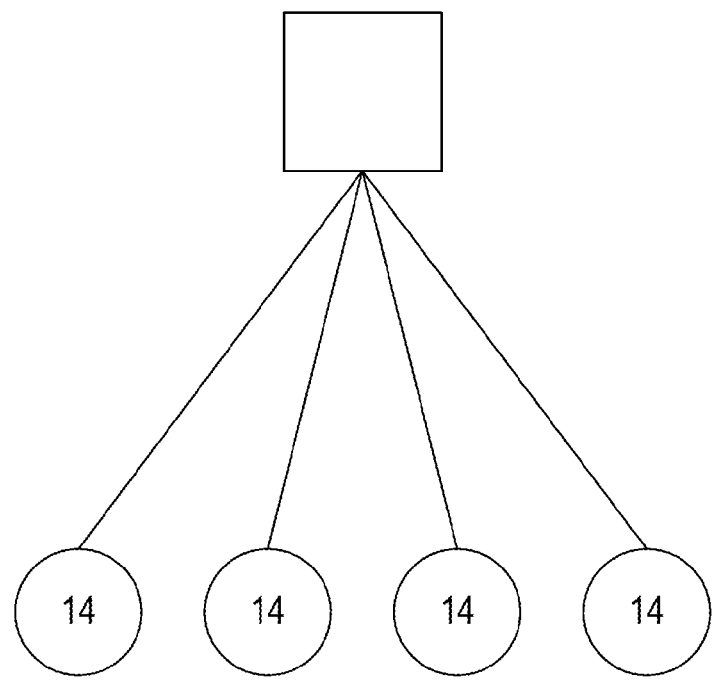
FIG. 22 is a diagram for describing the all-reduce between the servers connected to the execution switch.

Accordingly, finally, each server has the value of "14" as illustrated in FIG. 22.

Next, a case where the number of servers connected to the leaf switch is an odd number (herein, 5) will be described with reference to FIGS. 23A, 23B, 24A, 24B, and 25.

Figure 23A:
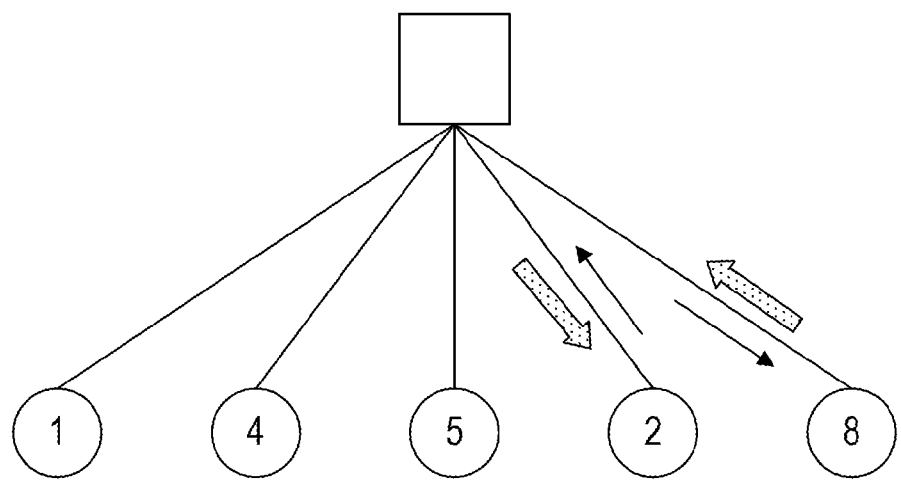
FIGS. 23A and 23B are diagrams for describing the all-reduce between the servers connected to the execution switch.

For example, it is assumed that 5 servers have "1", "4", "5", "2", and "8", respectively, as illustrated in FIG. 23A. In this case, the value is shared in two servers among five servers and an operation of the value (herein, addition) is performed. Herein, since the plurality of packets is not simultaneously transmitted in the same direction of one route, the route contention does not occur.

Figure 23B:
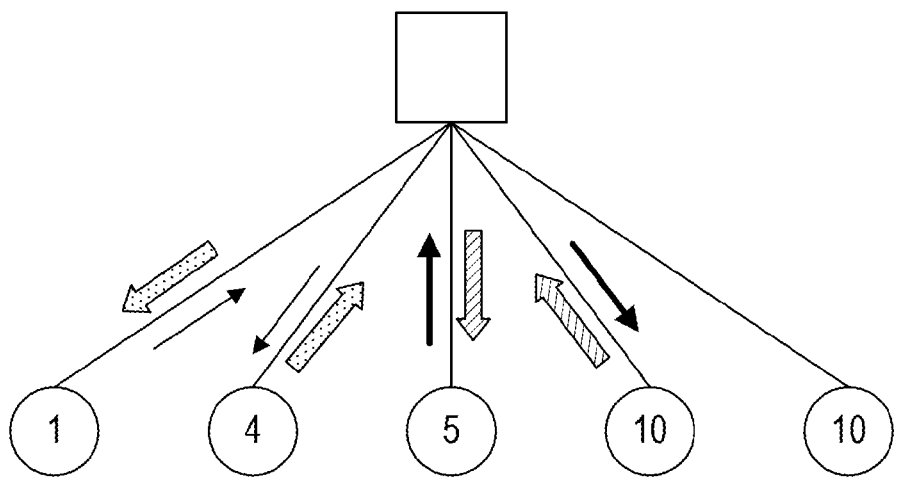

Then, 5 servers have "1", "4", "5", "10", and "10", respectively, as illustrated in FIG. 23B. In addition, the value is shared in the pair including the server having the value of "1" and the server having the value of "4" and in the pair including the server having the value of "5" and the server having the value of "10" and an operation of the value is performed. Herein, since the plurality of packets is not simultaneously transmitted in the same direction of one route, the route contention does not occur.

Figure 24A:
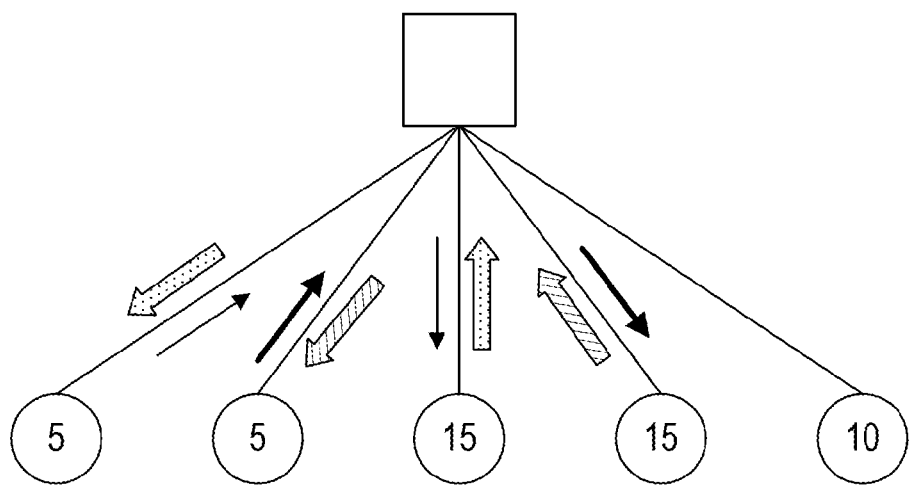
FIGS. 24A and 24B are diagrams for describing the all-reduce between the servers connected to the execution switch.

Then, 5 servers have "5", "5", "15", "15", and "10", respectively, as illustrated in FIG. 24A. In addition, the value is shared in each of the pair including the server having the value of "5" and the server having the value of "15" and an operation of the value is performed. Herein, since the plurality of packets is not simultaneously transmitted in the same direction of one route, the route contention does not occur.

Figure 24B:
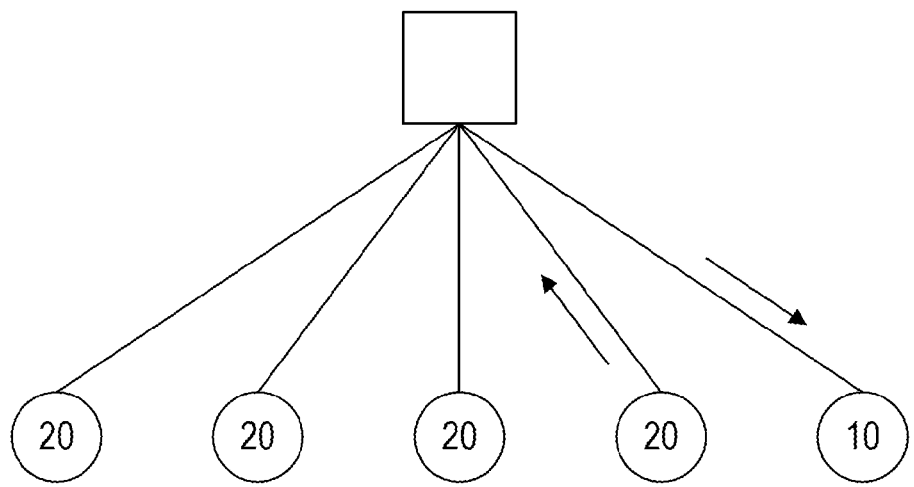

Then, 5 servers have "20", "20", "20", "20", and "10", respectively, as illustrated in FIG. 24B. In addition, the server having the value of "20" notifies the value of "20 to the server having the value of "10". Herein, since the plurality of packets is not simultaneously transmitted in the same direction of one route, the route contention does not occur.

Figure 25:
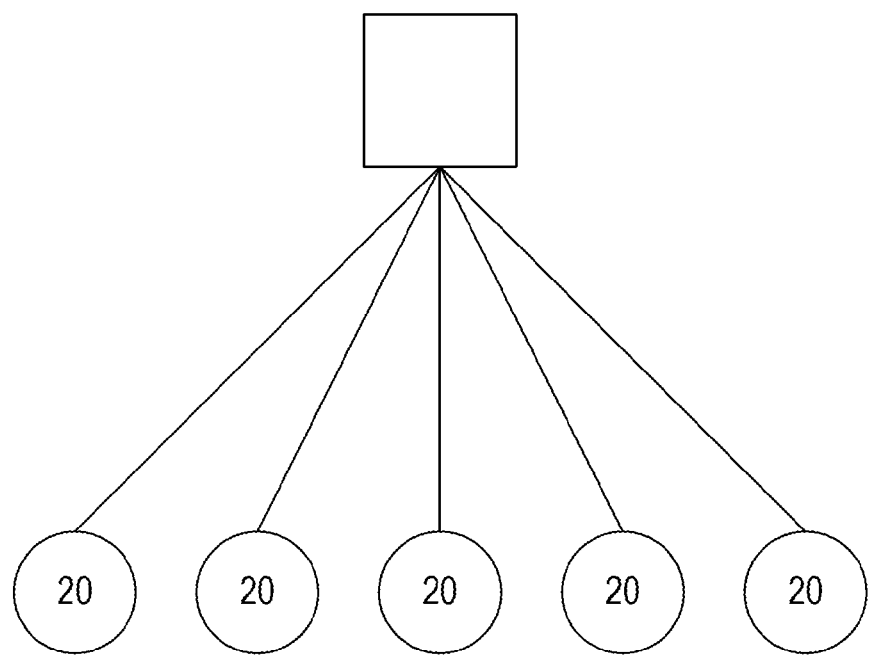
FIG. 25 is a diagram for describing the all-reduce between the servers connected to the execution switch.

Then, as illustrated in FIG. 25, finally, five servers each have the value of "20".

Although the above description is a description of an example of the all-reduce performed among a plurality of servers, even in a case where the number of servers is a number other than such an example, the all-reduce may be fundamentally performed in the same method.

Here, processing of generating the communication table in the case of performing the all-reduce among n (n is a natural number) servers (hereinafter, referred to as Allreduce (n)) will be described. In the embodiment, the communication table is generated by recursive processing.

(1) When the number n of servers connected to the leaf switch is 1, the processing ends.

(2) When the number n of servers connected to the leaf switch is 2, communication information on the communication between two servers (specifically, information on a pair of servers) is written in the communication table.

(3) When the number n of servers connected to the leaf switch is an odd number 2m+1 (m is the natural number), two servers (server P and server Q) of the n servers are selected and the communication information regarding the all-reduce communication is written in the communication table between the server P and the server Q. In addition, Allreduce(2m) is called for one of the server P and the server Q and remaining (2m−1) servers (i.e., 2m servers). Then, the communication information for transmitting a result of Allreduce(2m) from the server P to the server Q is written in the communication table.

(4) When the number of servers connected to the leaf switch is 2m (m is a natural number of 2 or more), the server is divided into m groups and m groups and Allreduce(m) is called with respect to each group concurrently.

When such processing is executed, the communication table is generated in the case of performing the all-reduce among n servers. As is apparent from the description of FIGS. 21A and 21B to FIG. 25, when the all-reduce communication is performed according to the communication table generated by such a method, the route contention does not occur.

Referring back to the description of FIG. 20, the first generation unit 3011 stores the first communication table generated in step S41 in the communication table storage unit 303 (step S43). In addition, the processing returns to the calling source.

FIG. 26 is a diagram illustrating an example of a first communication table. In the example of FIG. 26, a phase number and information of the pair of servers executing the communication are registered in the first communication table. A character string such as N1 represents the identification information of the server (e.g., LID). Communication 1 and communication 2 are executed concurrently. For example, in phase 2, communication between the server N1 and the server N2 and communication between the server N3 and the server N4 are performed concurrently. According to the communication table illustrated in FIG. 26, a communication partner of each server in phases 1 to 4 is as follows.

Server N1: -, N2, N3, -, server N2: -, N1, N4, -, server N3: -, N4, N1, -, server N4: N5, N3, N2, N5 (transmission), server N5:N4, -, -, N4 (reception)

Herein, "-" indicates that communication is not performed, "(transmission)" indicates transmission, and "(reception)" indicates reception. For example, the server N5 communicates with the server N4 in phase 1, does not communicate with the server N4 in phases 2 and 3, and receives data from the server N4 in phase 4. Further, in the example of FIG. 26, communication information on one execution switch is illustrated, but communication information on each execution switch is actually included in the first communication table.

Figure 27:
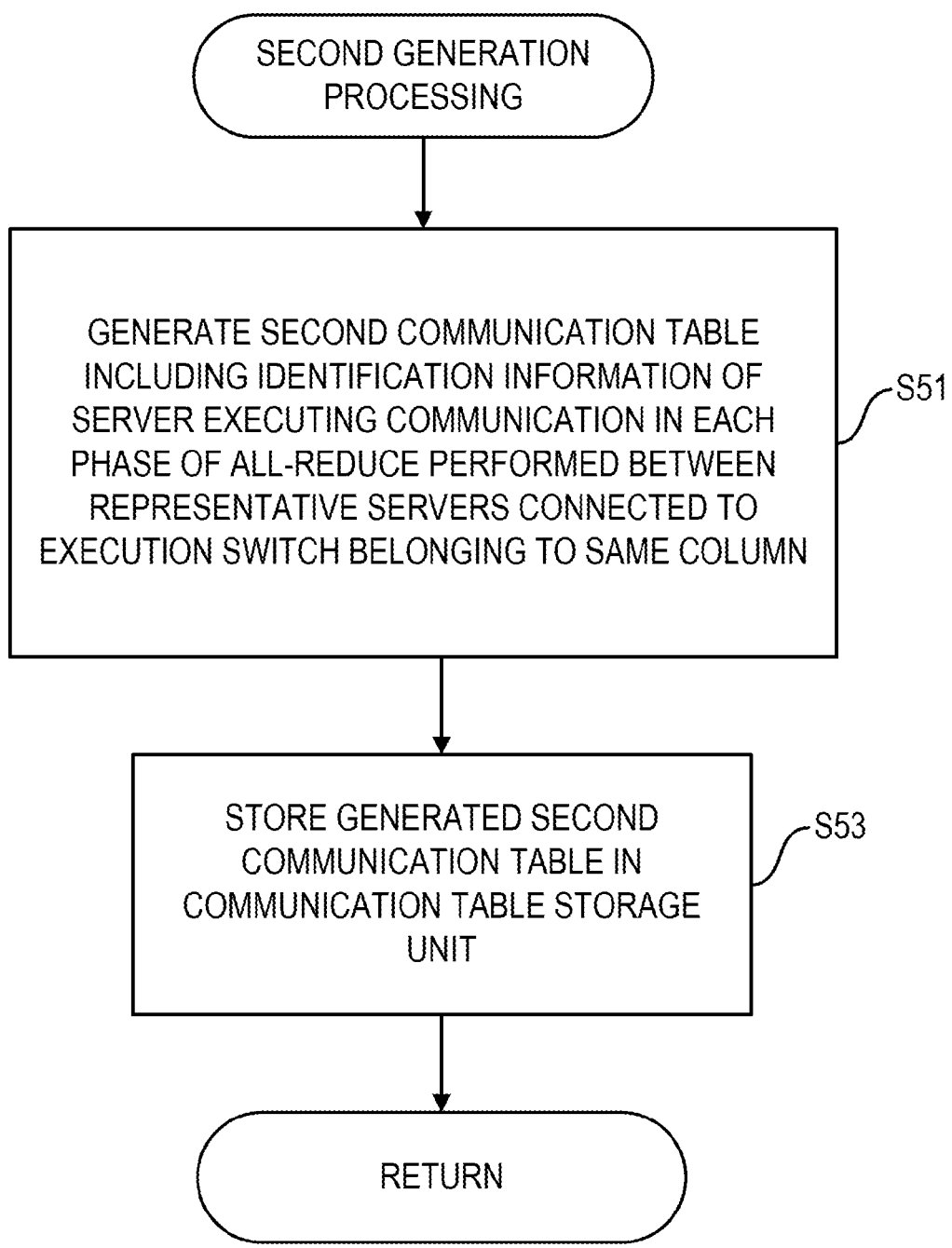
FIG. 27 is a diagram illustrating the processing flow of second generation processing.
Figure 28:
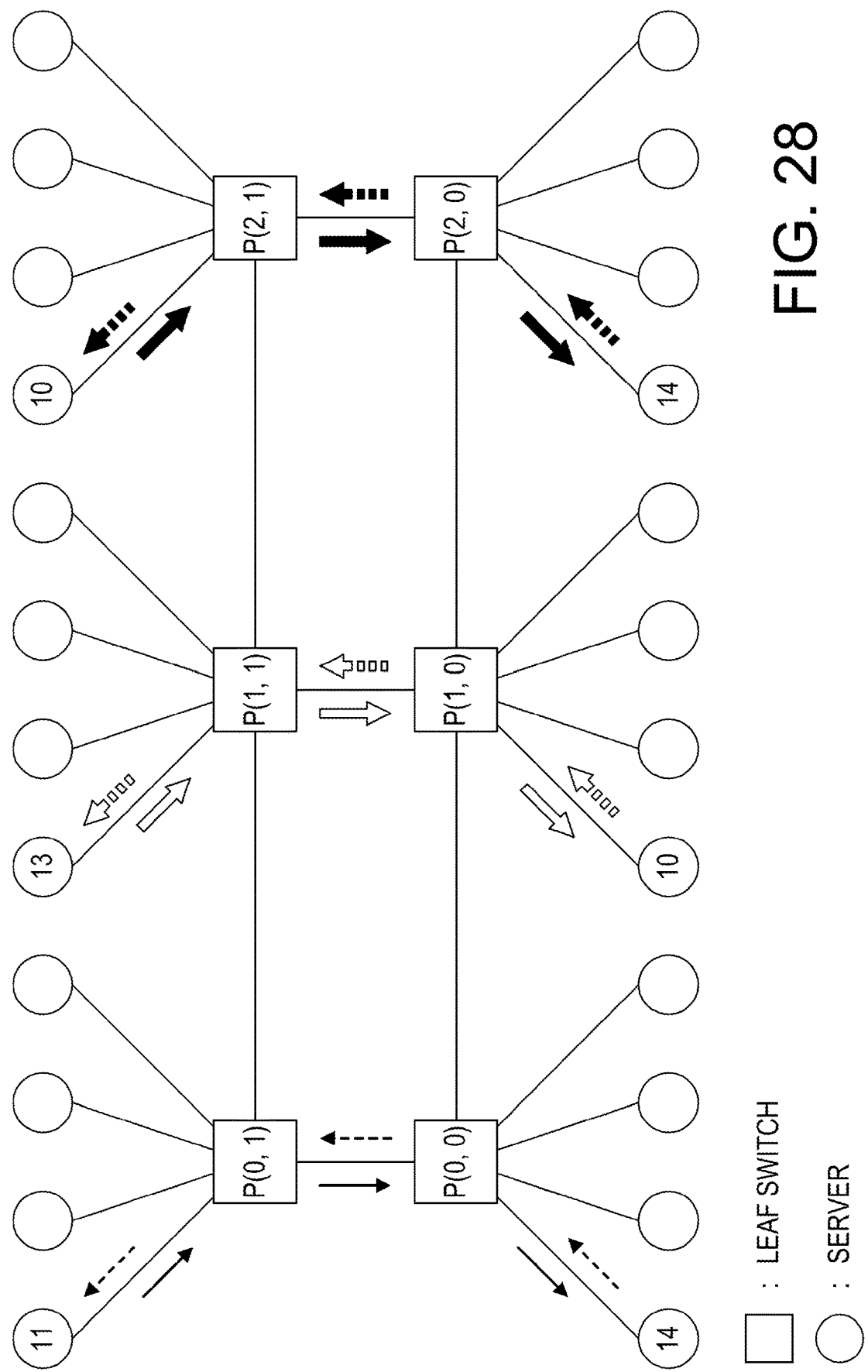
FIG. 28 is a diagram for describing the all-reduce implemented by a second communication table.

Next, the second generation processing will be described with reference to FIGS. 27 to 29. FIG. 27 is a diagram illustrating the processing flow of the second generation processing.

The second generation unit 3013 generates the second communication table including the identification information of the server that executes the communication in each phase of the all-reduce performed between representative servers connected to the execution switches belonging to the same column (FIG. 27: step S51). Herein, the representative server is a server that executes communication with an execution server connected to another execution switch among execution servers connected to the same execution switch. The representative switch is randomly selected, for example, based on the number allocated to the execution server or among the execution servers connected to the same execution switch.

The all-reduce to be implemented in the second communication table will be described with reference to FIGS. 28 and 29. FIG. 28 illustrates, as an example, the leaf switch P(0,1), the leaf switch P(1,1), the leaf switch P(2,1), the leaf switch P(0,0), the leaf switch P(1,0) and the leaf switch P(2,0) which are the execution switches. The representative server connected to the leaf switch P(0,1) has the value of "11". The representative server connected to the leaf switch P(1,1) has the value of "13". The representative server connected to the leaf switch P(2,1) has the value of "10". The representative server connected to the leaf switch P(0,0) has the value of "14". The representative server connected to the leaf switch P(1,0) has the value of "10". The representative server connected to the leaf switch P(2,0) has the value of "14".

In this case, the value is shared between the representative server connected to the leaf switch P(0,1) and the representative server connected to the leaf switch P(0,0) and an operation of the value is executed. The value is shared between the representative server connected to the leaf switch P(1,1) and the representative server connected to the leaf switch P(1,0) and an operation of the value is executed. The value is shared between the representative server connected to the leaf switch P(2,1) and the representative server connected to the leaf switch P(2,0) and an operation of the value is executed. Further, communication for each column is performed in parallel.

Figure 29:
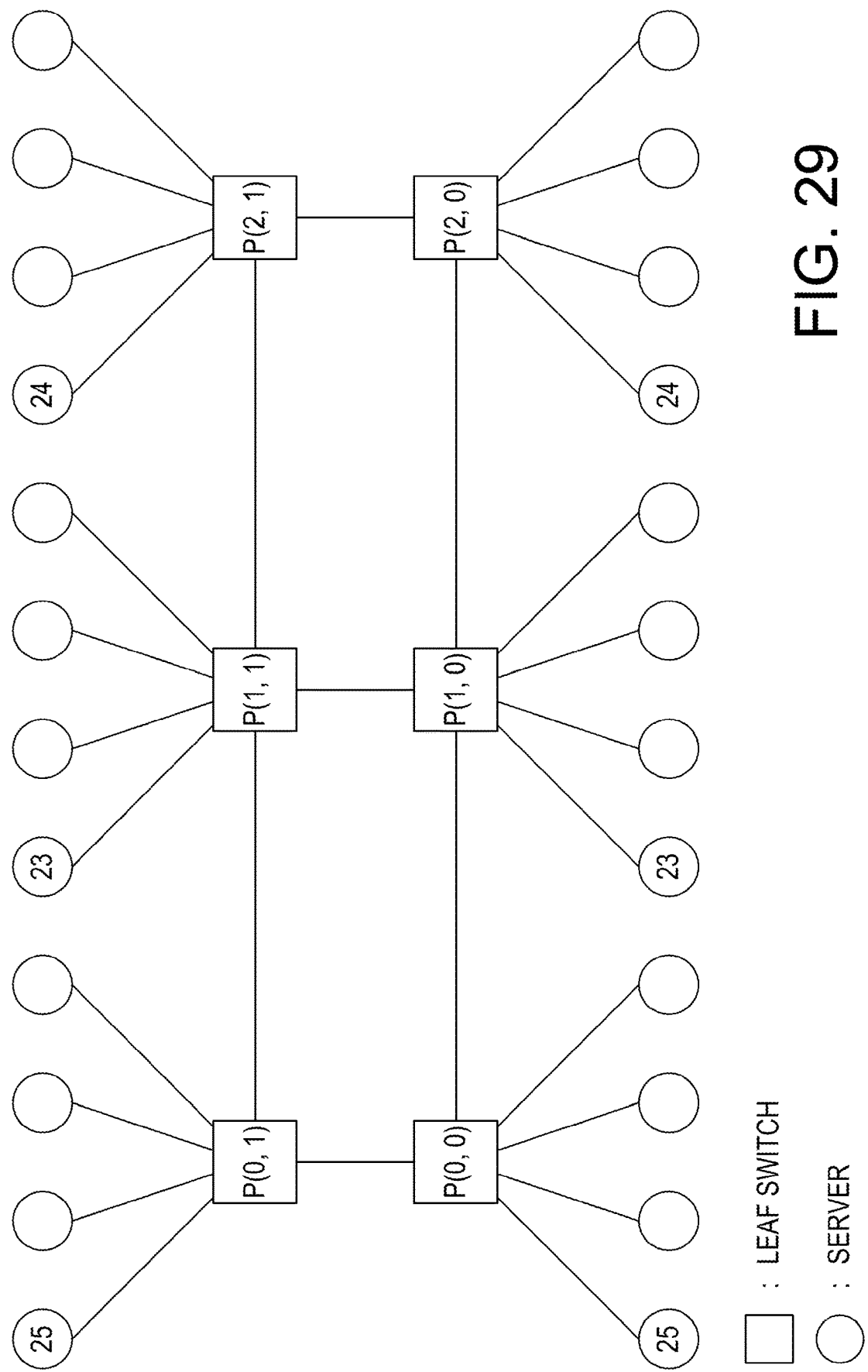
FIG. 29 is a diagram for describing the all-reduce implemented by the second communication table.

As a result, as illustrated in FIG. 29, the representative server connected to the leaf switch P(0,1) has the value of "25". The representative server connected to the leaf switch P(1,1) has the value of "23". The representative server connected to the leaf switch P(2,1) has the value of "24". The representative server connected to the leaf switch P(0,0) has the value of "25". The representative server connected to the leaf switch P(1,0) has the value of "23". The representative server connected to the leaf switch P(2,0) has the value of "24".

In each phase of the communication as described above, there is no link where the plurality of packets is simultaneously transmitted in the same direction, so that the route contention does not occur.

Referring back to the description of FIG. 27, the second generation unit 3013 stores the second communication table generated in step S51 in the communication table storage unit 303 (step S53). In addition, the processing returns to the calling source. Further, since the second communication table is a communication table for the all-reduce, the second communication table is generated in the same method as the first communication table, and as a result, the second communication table has the same format. However, since the all-reduce implemented by the second communication table is the all-reduce performed between the representative servers connected to the execution switches belonging to the same column, the communication information on each column in which the all-reduce is performed is stored.

Figure 30:
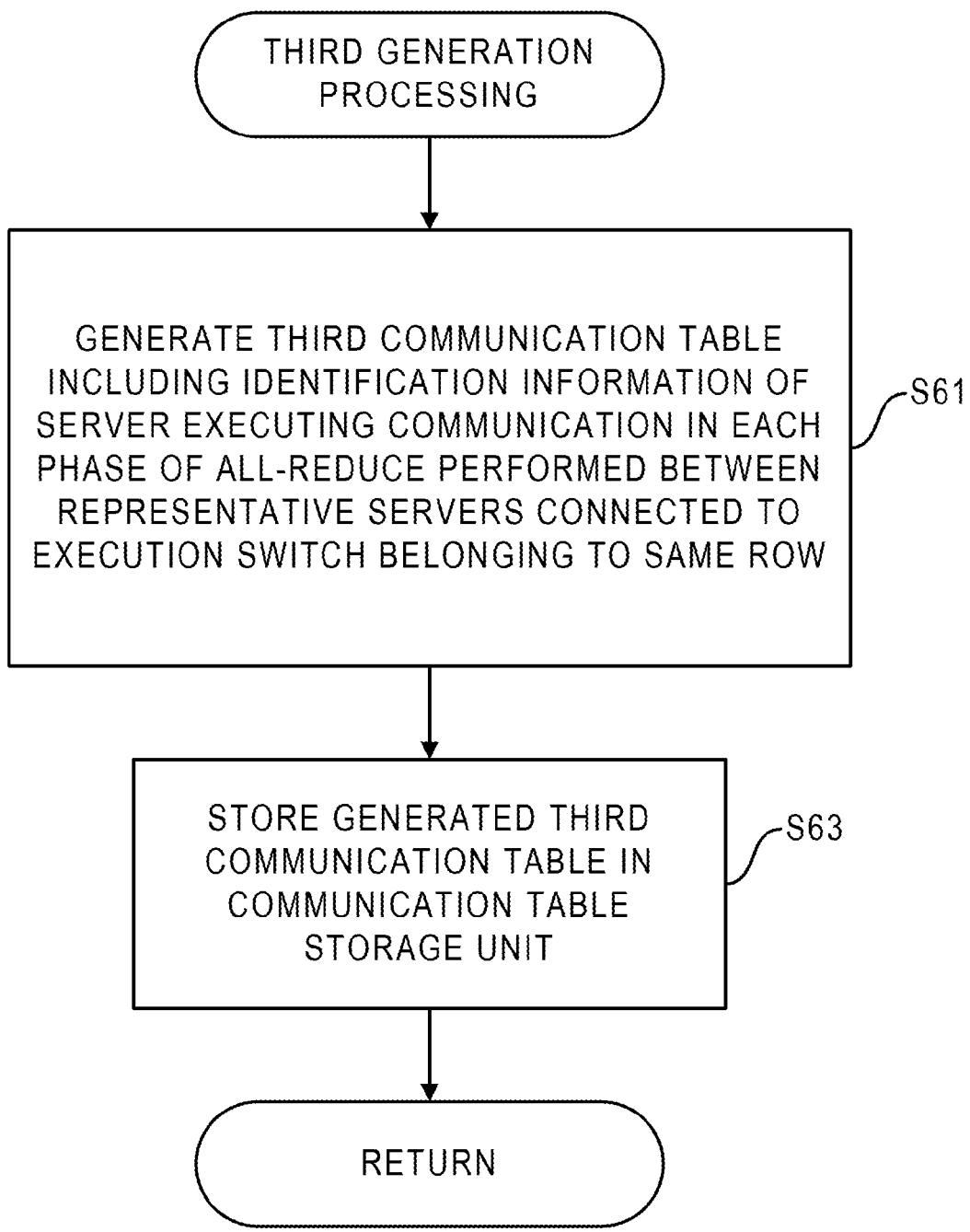
FIG. 30 is a diagram illustrating the processing flow of third generation processing.

Next, the third generation processing will be described with reference to FIGS. 30 to 34. FIG. 30 is a diagram illustrating the processing flow of the third generation processing.

The third generation unit 3015 generates the third communication table including the identification information of the server that executes the communication in each phase of the all-reduce performed between the representative servers connected to the execution switches belonging to the same row (FIG. 30: step S61). As described above, the representative server is the server that executes communication with the execution server connected to another execution switch among the execution servers connected to the same execution switch.

Figure 31:
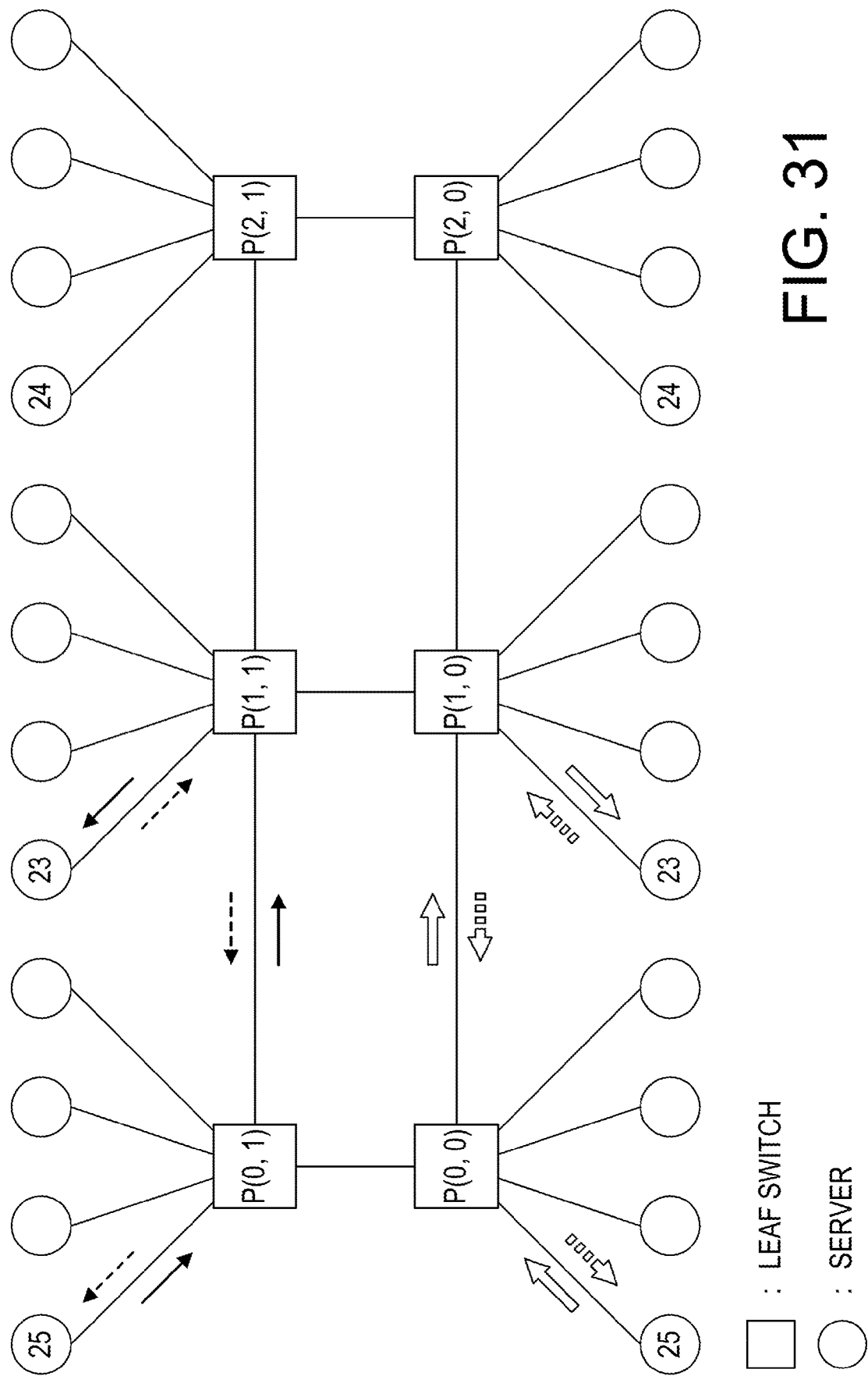
FIG. 31 is a diagram for describing the all-reduce implemented by a third communication table.

The all-reduce to be implemented in the third communication table will be described with reference to FIGS. 31 to 34. FIG. 31 illustrates, as an example, the leaf switch P(0,1), the leaf switch P(1,1), the leaf switch P(2,1), the leaf switch P(0,0), the leaf switch P(1,0) and the leaf switch P(2,0) which are the execution switches. The representative server connected to the leaf switch P(0.1) has the value of "25". The representative server connected to the leaf switch P(1.1) has the value of "23". The representative server connected to the leaf switch P(2.1) has the value of "24". The representative server connected to the leaf switch P(0.0) has the value of "25". The representative server connected to the leaf switch P(1,0) has the value of "23". The representative server connected to the leaf switch P(2.0) has the value of "24".

First, for example, as illustrated in FIG. 31, the value is shared between the representative server connected to the leaf switch P(0,1) and the representative server connected to the leaf switch P(1,1) and an operation of the value is executed. The value is shared between the representative server connected to the leaf switch P(0,0) and the representative server connected to the leaf switch P(1,0) and an operation of the value is executed. Further, the communication for each row is performed in parallel.

Figure 32:
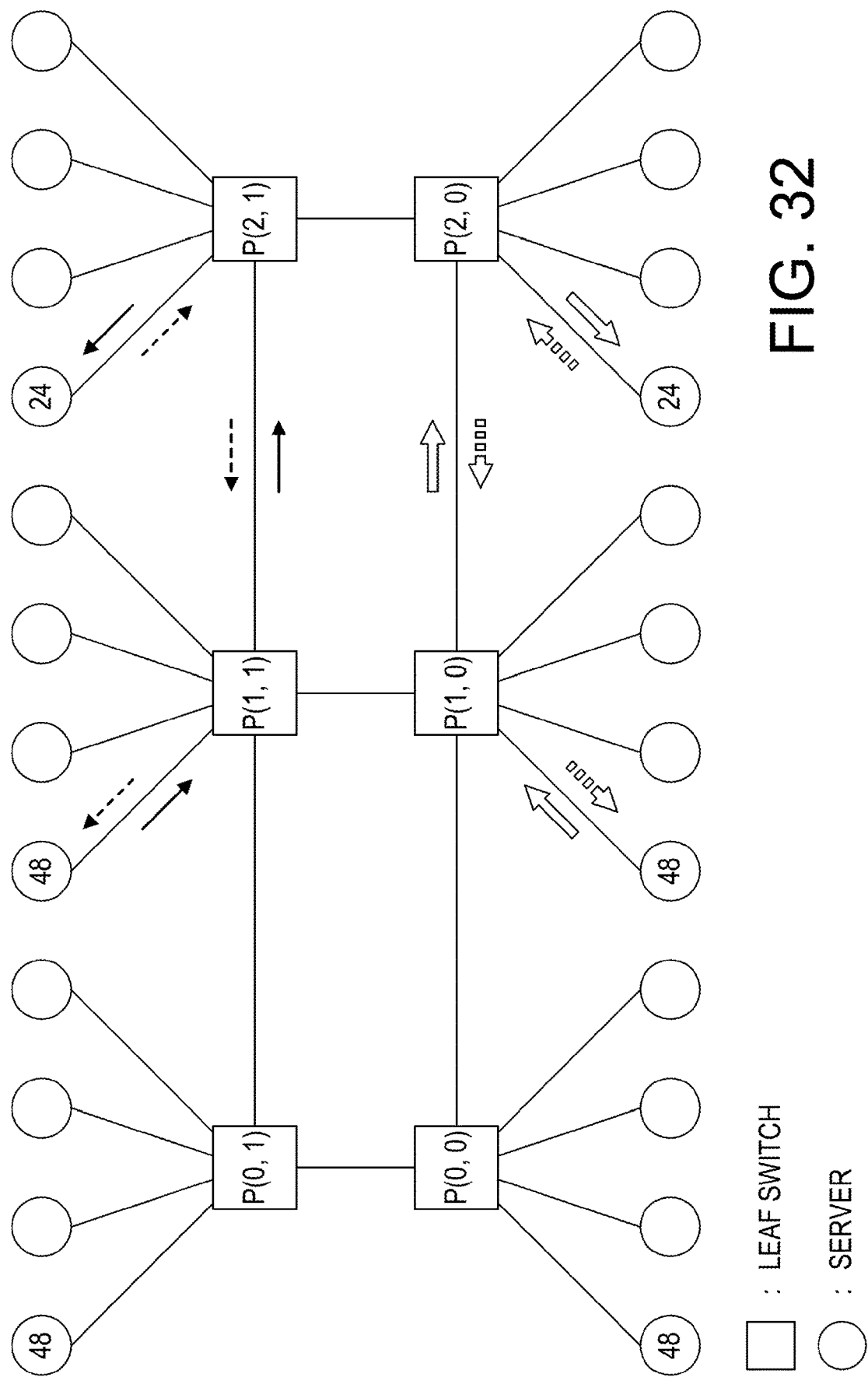
FIG. 32 is a diagram for describing the all-reduce implemented by the third communication table.

Next, for example, as illustrated in FIG. 32, the value is shared between the representative server connected to the leaf switch P(1,1) and the representative server connected to the leaf switch P(2,1) and an operation of the value is executed. The value is shared between the representative server connected to the leaf switch P(1,0) and the representative server connected to the leaf switch P(2,0) and an operation of the value is executed. Further, the communication for each row is performed in parallel.

Figure 33:
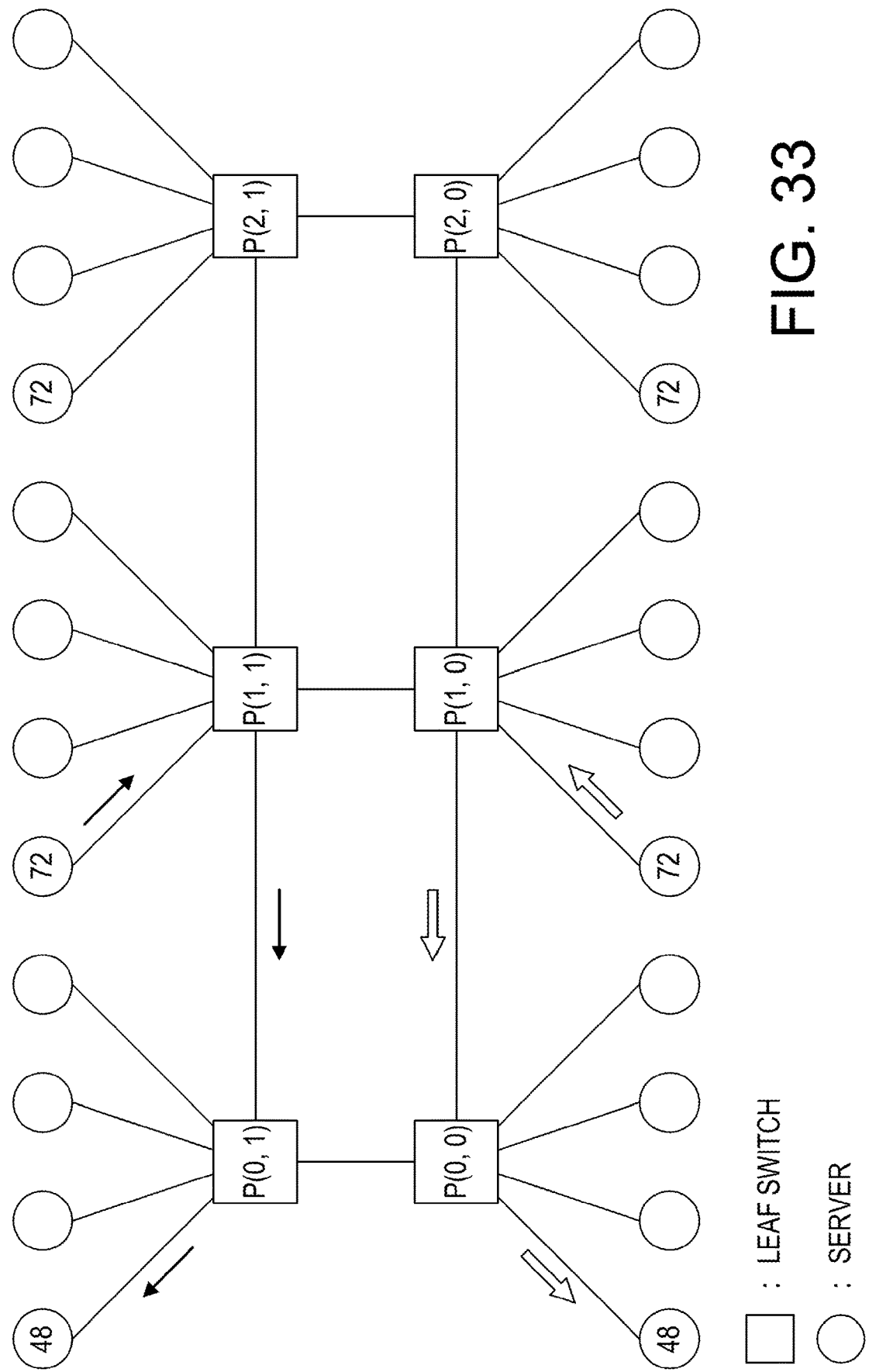
FIG. 33 is a diagram for describing the all-reduce implemented by the third communication table.

Next, for example, as illustrated in FIG. 33, the result is transmitted from the representative server connected to the leaf switch P(1,1) to the representative server connected to the leaf switch P(0,1). The result is transmitted from the representative server connected to the leaf switch P(1,0) to the representative server connected to the leaf switch P(0,0). Further, the communication for each row is performed in parallel.

Figure 34:
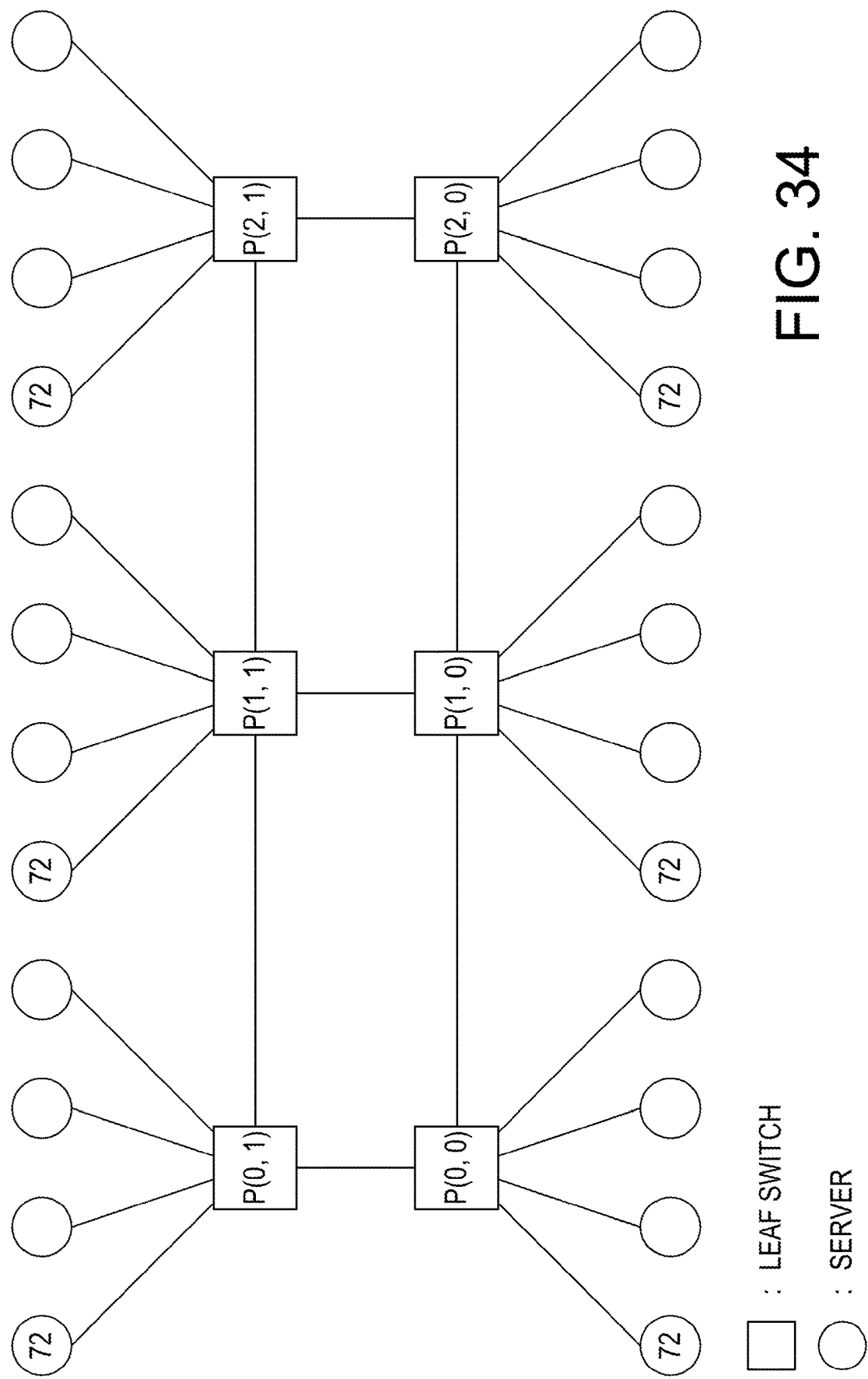
FIG. 34 is a diagram for describing the all-reduce implemented by the third communication table.

As a result, as illustrated in FIG. 34, each representative server has a value of "72". In each phase of the communication as described above, there is no link where the plurality of packets is simultaneously transmitted in the same direction, so that the route contention does not occur.

Referring back to the description of FIG. 30, the third generation unit 3015 stores the third communication table generated in step S61 in the communication table storage unit 303 (step S63). In addition, the processing returns to the calling source. Further, since the third communication table is the communication table for the all-reduce, the third communication table is generated in the same method as the first communication table, and as a result, the third communication table has the same format. However, since the all-reduce implemented by the third communication table is the all-reduce performed between the representative servers connected to the execution switches belonging to the same row, the communication information on each row in which the all-reduce is performed is stored.

Figure 35:
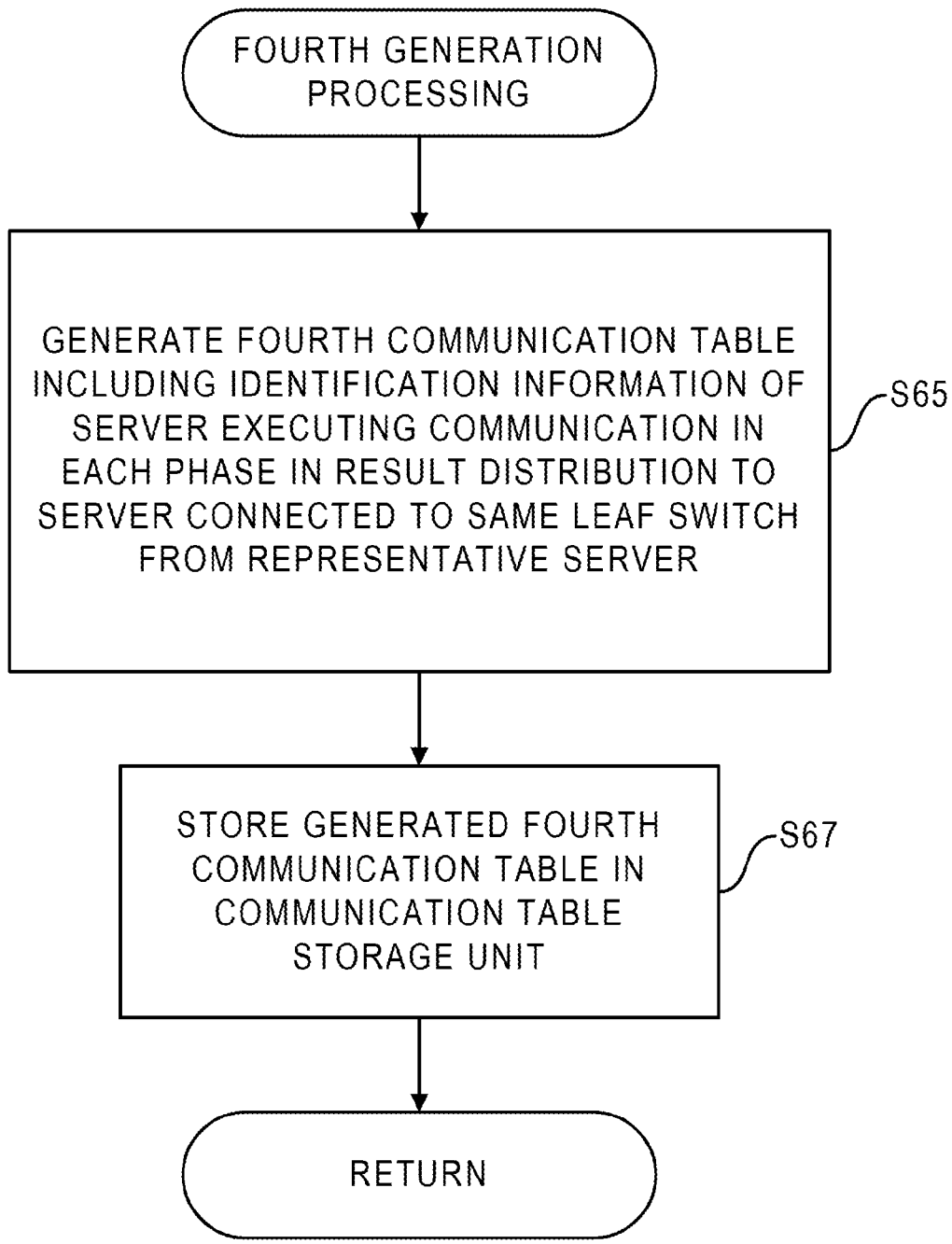
FIG. 35 is a diagram illustrating the processing flow of fourth generation processing.

Next, the fourth generation processing will be described with reference to FIGS. 35 to 38. FIG. 35 is a diagram illustrating the processing flow of the fourth generation processing.

The fourth generation unit 3017 generates the fourth communication table including the identification information of the server that executes the communication in each phase in distributing the result from each representative server to another server connected to the same leaf switch as the corresponding representative server (FIG. 35: step S65).

Figure 36:
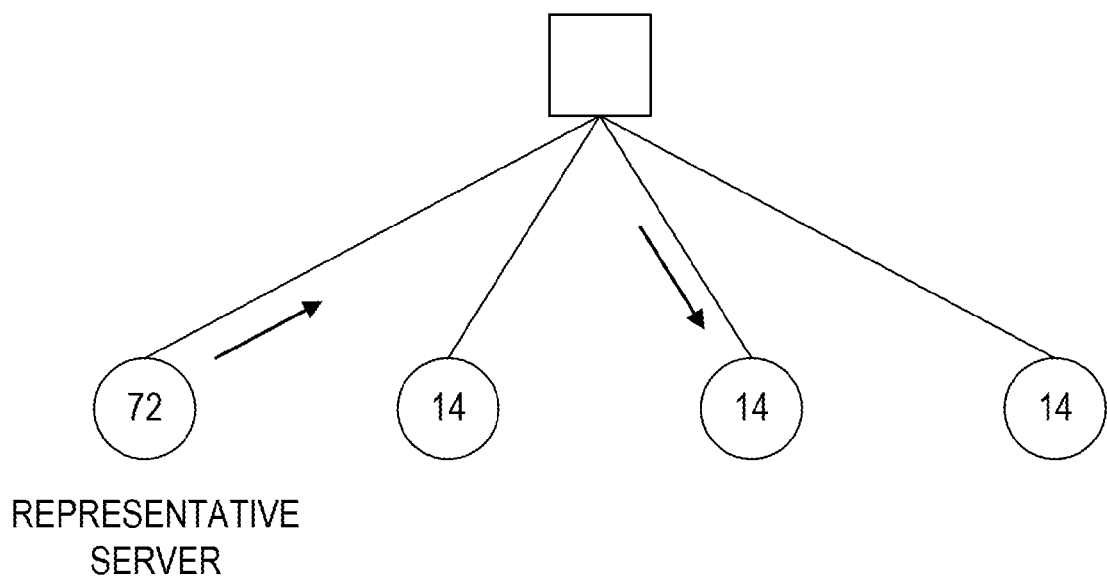
FIG. 36 is a diagram for describing a result distribution implemented by a fourth communication table.
Figure 37:
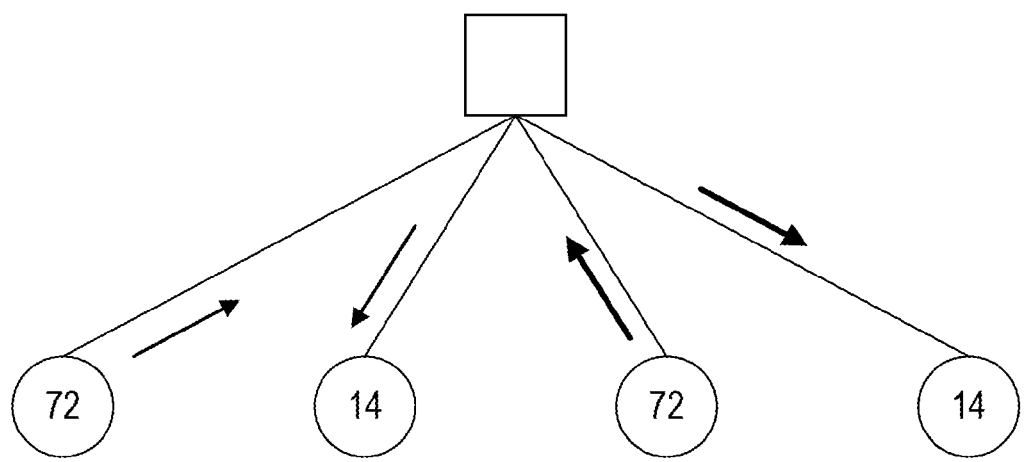
FIG. 37 is a diagram for describing a result distribution implemented by a fourth communication table.
Figure 38:
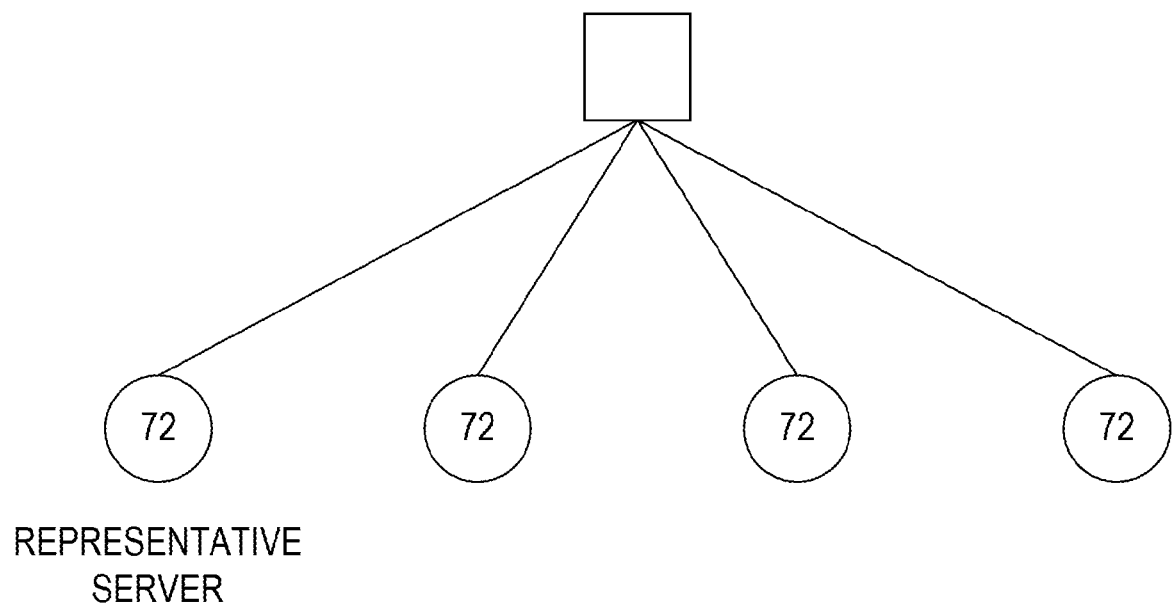
FIG. 38 is a diagram for describing a result distribution implemented by the fourth communication table.

The result distribution to be implemented in the fourth communication table will be described with reference to FIGS. 36 to 38. In FIGS. 36 to 38, as one example, one leaf switch and four servers connected to the leaf switch are illustrated and the server located at the leftmost side is the representative server. First, as illustrated in FIG. 36, the representative server transmits the value of "72" to a second server from a right side.

Then, as illustrated in FIG. 37, the representative server and the second server from the right side have the value of "72" and a first server from the right side and a third server from the right side have the value of "14". In addition, as illustrated in FIG. 37, the representative server transmits the value of "72" to the third server from the right side and the second server from the right side transmits the value of "72" to the first server from the right side.

Then, as illustrated in FIG. 38, each server has the value of "72" which is the result of the all-reduce. As described above, the result distribution by the fourth communication table is implemented. The number of phases is 2 and there is no link where the plurality of packets is simultaneously transmitted in the same direction in any phase, so that the route contention does not occur.

Referring back to the description of FIG. 35, the fourth generation unit 3017 stores the fourth communication table generated in step S65 in the communication table storage unit 303 (step S67). In addition, the processing returns to the calling source. Further, since in the fourth communication table, the communication information regarding the result distribution in each execution switch is stored in the same format as the first communication table illustrated in FIG. 26, so that a detailed description thereof will be omitted herein.

Next, with reference to FIGS. 39 and 40, the processing executed by the server will be described. The processing is processing executed by each server which receives the first to fourth communication tables from the management apparatus 3.

Figure 39:
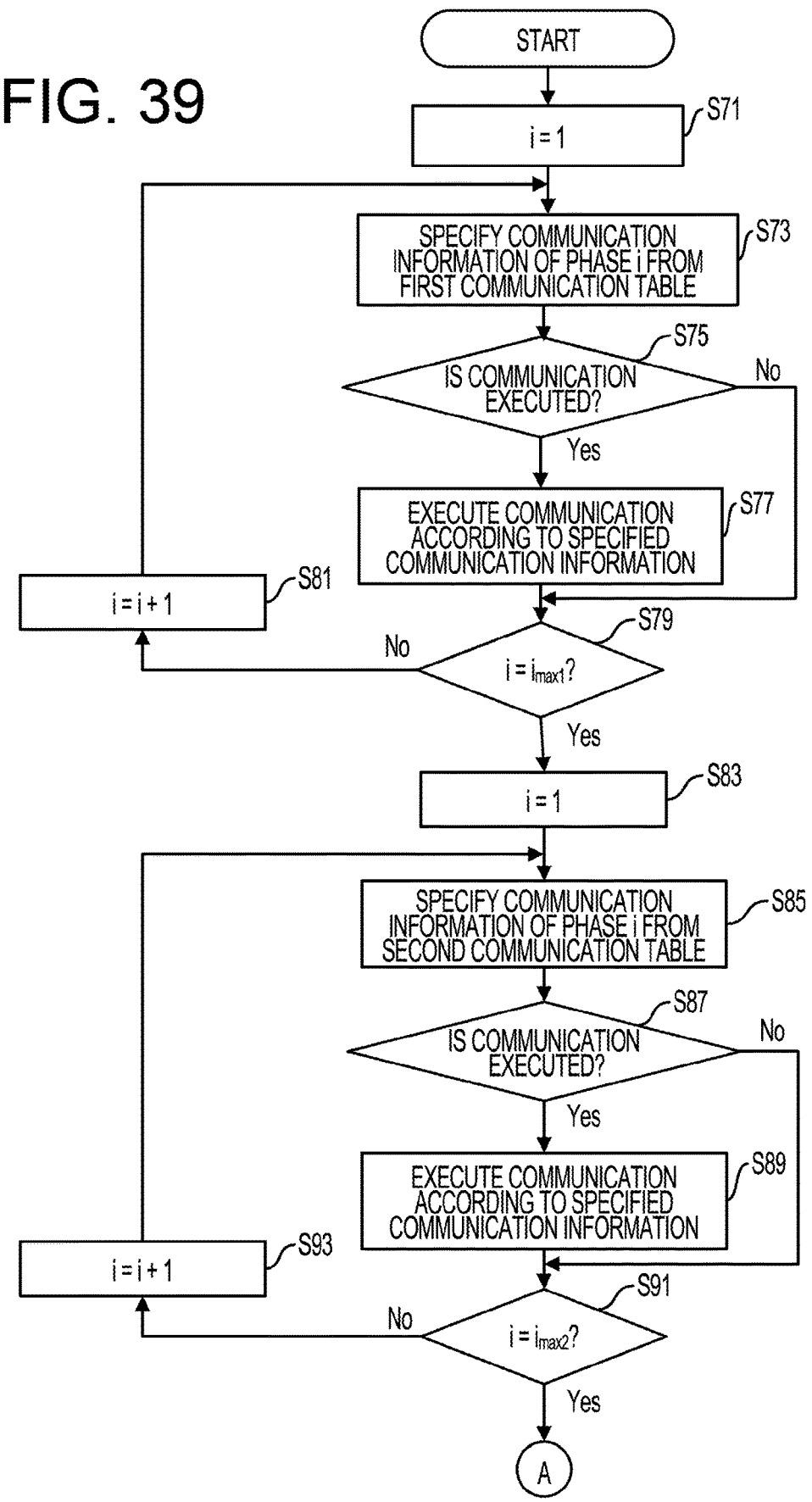
FIG. 39 is a diagram illustrating the processing flow of the processing executed by the server.

FIG. 39 is a diagram illustrating the processing flow of processing executed by the server.

The first communication unit 1011 in the server sets 1 as a variable i representing a phase number (FIG. 39: step S71).

The first communication unit 1011 specifies communication information of phase i from the first communication table stored in the communication table storage unit 103 (step S73).

The first communication unit 1011 determines whether its own server (i.e., the server that executes the processing) executes communication at phase i (step S75). Whether its own server executes the communication at phase i is determined depending on whether the specified communication information includes the identification information of its own server.

When its own server does not execute the communication at phase i (step S75: No route), the processing proceeds to step S79. In the meantime, when its own server executes the communication at phase i (step S75: Yes route), the first communication unit 1011 executes the communication according to the communication information specified at step S73 (step S77).

As described above, the communication performed according to the first communication table is the all-reduce communication between the servers connected to the same leaf switch and the server that receives the value from another server executes the operation related to the all-reduce.

The first communication unit 1011 determines whether $i=i_{max1}$ is established (step S79). $i_{max1}$ is a maximum value of the phase number of the communication performed according to the first communication table. When $i=i_{max1}$ is not established (step S79: No route), the first communication unit 1011 increments i by 1 (step S81). Then, the processing proceeds to step S73. Further, the end of the phase is confirmed by barrier synchronization.

In the meantime, when $i=i_{max1}$ is established (step S79: Yes route), the second communication unit 1013 sets 1 as the variable i representing the phase number (step S83).

The second communication unit 1013 specifies the communication information of phase i from the second communication table stored in the communication table storage unit 103 (step S85).

The second communication unit 1013 determines whether its own server (i.e., the server that executes the processing) executes the communication at phase i (step S87). Whether its own server executes the communication at phase i is determined depending on whether the specified communication information includes the identification information of its own server.

When its own server does not execute the communication at phase i (step S87: No route), the processing proceeds to step S91. In the meantime, when its own server executes the communication at phase i (step S87: Yes route), the second communication unit 1013 executes the communication according to the communication information specified at step S85 (step S89).

As described above, the communication performed according to the second communication table is the all-reduce communication performed between the representative servers connected to the execution switches belonging to the same column and the server that receives the value from another server executes the operation related to the all-reduce.

The second communication unit 1013 determines whether $i=i_{max2}$ is established (step S91). $i_{max2}$ is the maximum value of the phase number of the communication performed according to the second communication table. When $i=i_{max2}$ is not established (step S91: No route), the second communication unit 1013 increments i by 1 (step S93). Then, the processing proceeds to step S85. Further, the end of the phase is confirmed by the barrier synchronization.

In the meantime, when $i=i_{max2}$ is established (step S91: Yes route), the processing proceeds to step S95 of FIG. 40 via terminal A.

Figure 40:
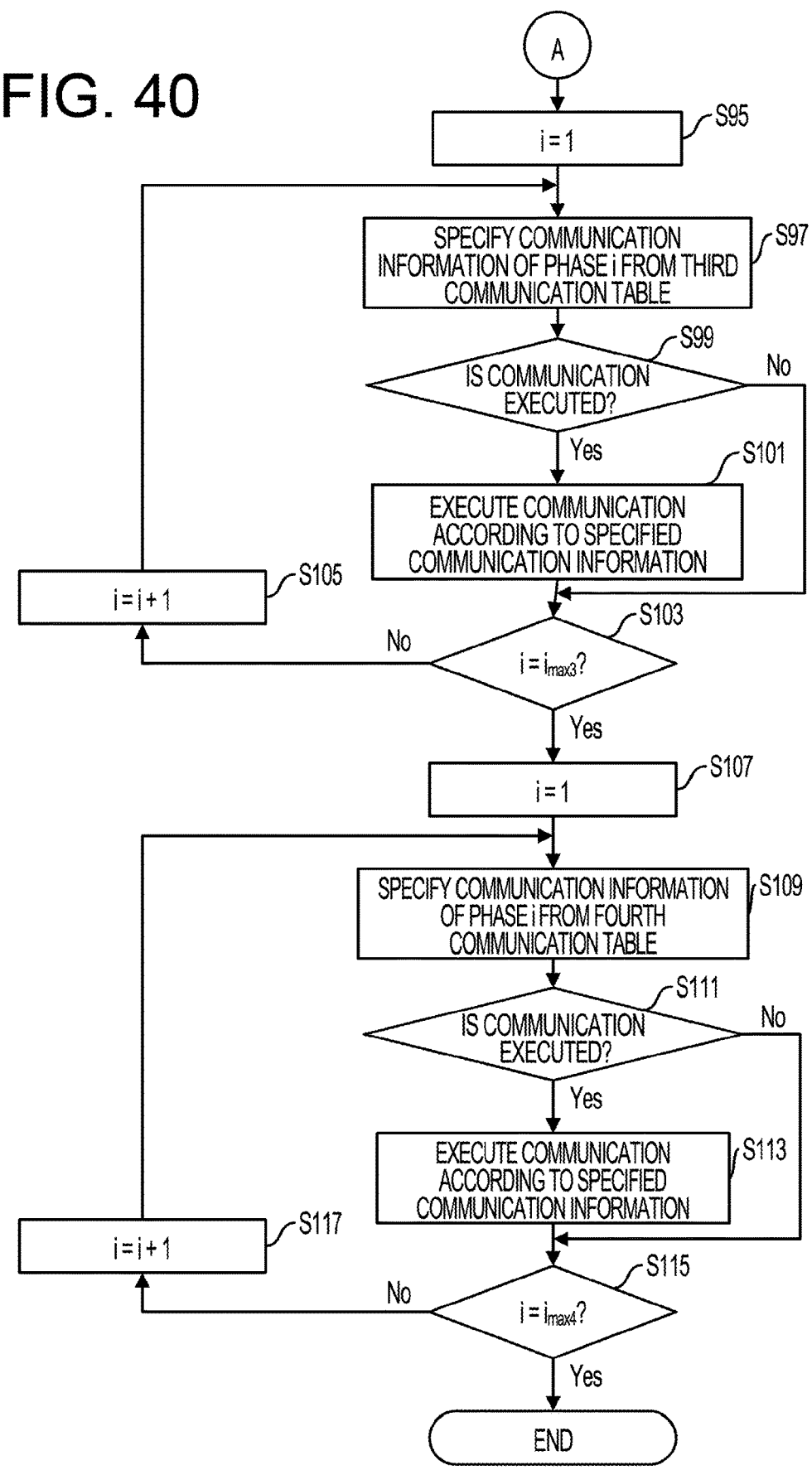
FIG. 40 is a diagram illustrating the processing flow of the processing executed by the server.

Referring to the description of FIG. 40, the third communication unit 1015 sets 1 as the variable i representing the phase number (FIG. 40: step S95).

The third communication unit 1015 specifies the communication information of phase i from the third communication table stored in the communication table storage unit 103 (step S97).

The third communication unit 1015 determines whether its own server (i.e., the server that executes the processing) executes the communication at phase i (step S99). Whether its own server executes the communication at phase i is determined depending on whether the specified communication information includes the identification information of its own server.

When its own server does not execute the communication at phase i (step S99: No route), the processing proceeds to step S103. In the meantime, when its own server executes the communication at phase i (step S99: Yes route), the third communication unit 1015 executes the communication according to the communication information specified at step S97 (step S101).

As described above, the communication performed according to the third communication table is the all-reduce communication performed between the representative servers connected to the execution switches belonging to the same row and the server that receives the value from another server executes the operation related to the all-reduce.

The third communication unit 1015 determines whether $i=i_{max3}$ is established (step S103). $i_{max3}$ is a maximum value of the phase number of the communication performed according to the third communication table. When $i=i_{max3}$ is not established (step S103: No route), the third communication unit 1015 increments i by 1 (step S105). Then, the processing proceeds to step S97. Further, the end of the phase is confirmed by the barrier synchronization.

In the meantime, when $i=i_{max3}$ is established (step S103: Yes route), the fourth communication unit 1017 sets 1 as the variable i representing the phase number (step S107).

The fourth communication unit 1017 specifies the communication information of phase i from the fourth communication table stored in the communication table storage unit 103 (step S109).

The fourth communication unit 1017 determines whether its own server (i.e., the server that executes the processing) executes the communication at phase i (step S111). Whether its own server executes the communication at phase i is determined depending on whether the specified communication information includes the identification information of its own server.

When its own server does not execute the communication at phase i (step S111: No route), the processing proceeds to step S115. In the meantime, when its own server executes the communication at phase i (step S111: Yes route), the fourth communication unit 1017 executes the communication according to the communication information specified at step S109 (step S113).

As described above, the communication performed according to the fourth communication table is the result distribution from the representative server having the result of the all-reduce to another server connected to the same leaf switch as the corresponding server.

The fourth communication unit 1017 determines whether $i=i_{max4}$ is established (step S115). $i_{max4}$ is the maximum value of the phase number of the communication performed according to the fourth communication table. When $i=i_{max4}$ is not established (step S115: No route), the fourth communication unit 1017 increments i by 1 (step S117). Then, the processing proceeds to step S109. Further, the end of the phase is confirmed by the barrier synchronization.

In the meantime, $i=i_{max4}$ is established (step S115: Yes route), the processing ends.

When such processing is executed, the all-reduce may be implemented by some servers in the Latin square fat tree system 1000. Accordingly, other collective communication or the like may be executed with respect to servers other than the server that executes the all-reduce.

As described above, in the embodiment, the route contention does not occur in each process of the all-reduce communication.

Second Embodiment

In the second embodiment, selection processing different from the selection processing according to the first embodiment is executed. The selection processing according to the second embodiment will be described with reference to FIGS. 41 to 43.

Figure 41:
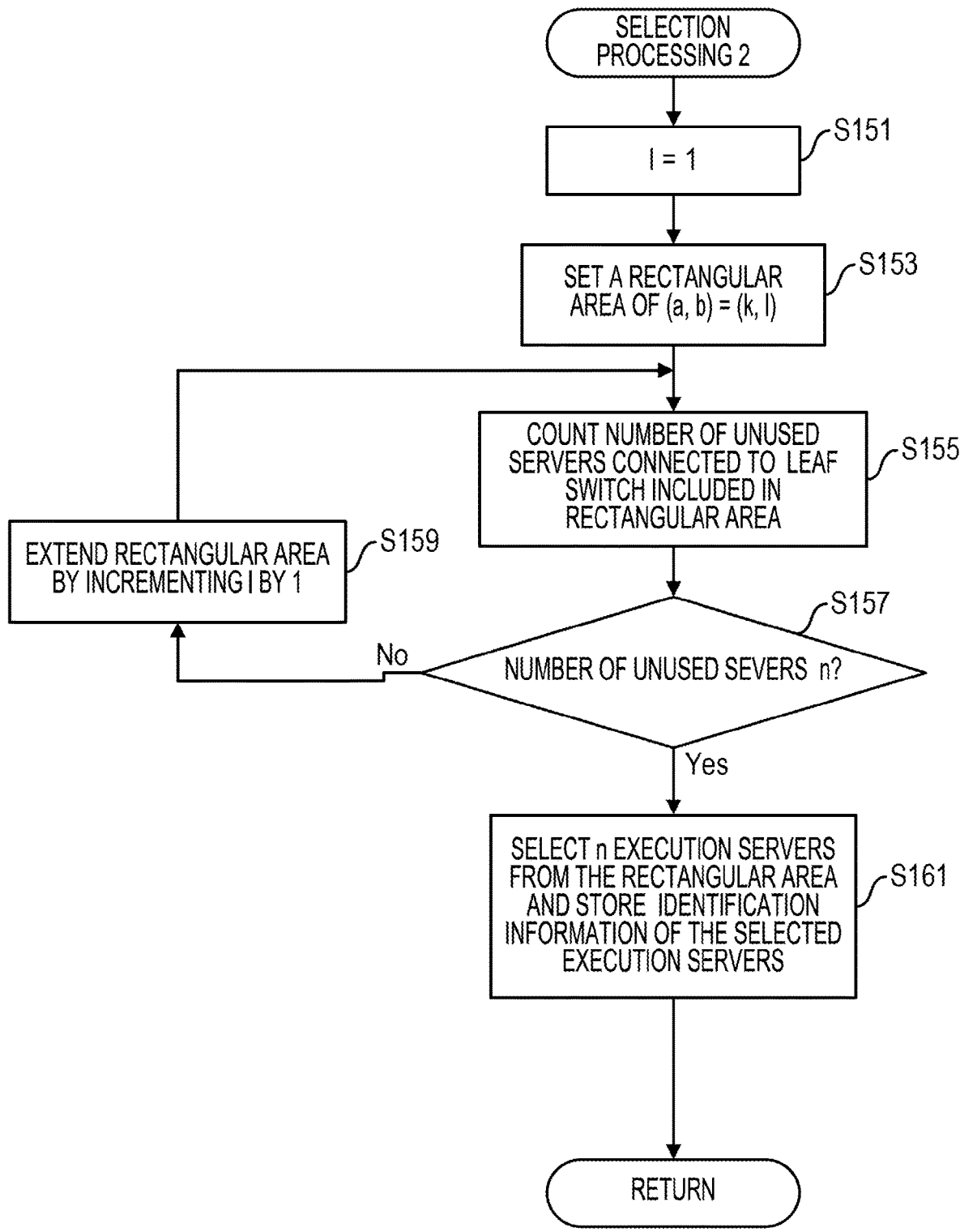
FIG. 41 is a diagram illustrating a processing flow of selection processing according to a second embodiment.

FIG. 41 is a diagram illustrating a processing flow of selection processing according to a second embodiment. k is a natural number satisfying 1≤k≤d and is preset.

First, the setting unit 300 sets a variable l as l=1 (FIG. 41: step S151).

The setting unit 300 sets a rectangular area of (a, b)=(k, l) in the lattice portion of the finite projection plane (step S153).

The setting unit 300 counts the number of unused servers connected to the leaf switch included in the rectangular area set in step S153 (step S155). Further, it is assumed that the management apparatus 3 manages whether each server in the Latin square fat tree system 1000 is in use.

The setting unit 300 determines whether the number of unused servers counted in step S155 is equal to or larger than n (step S157). n represents the number of execution servers, which is indicated by the information input in step S1.

When the number of unused servers counted in step S155 is not equal to or larger than n (step S157: No route), the setting unit 300 executes the following processing. Specifically, the setting unit 300 horizontally extends the rectangular area by incrementing l by 1 (step S159). Then, the processing returns to step S155.

Figure 42:
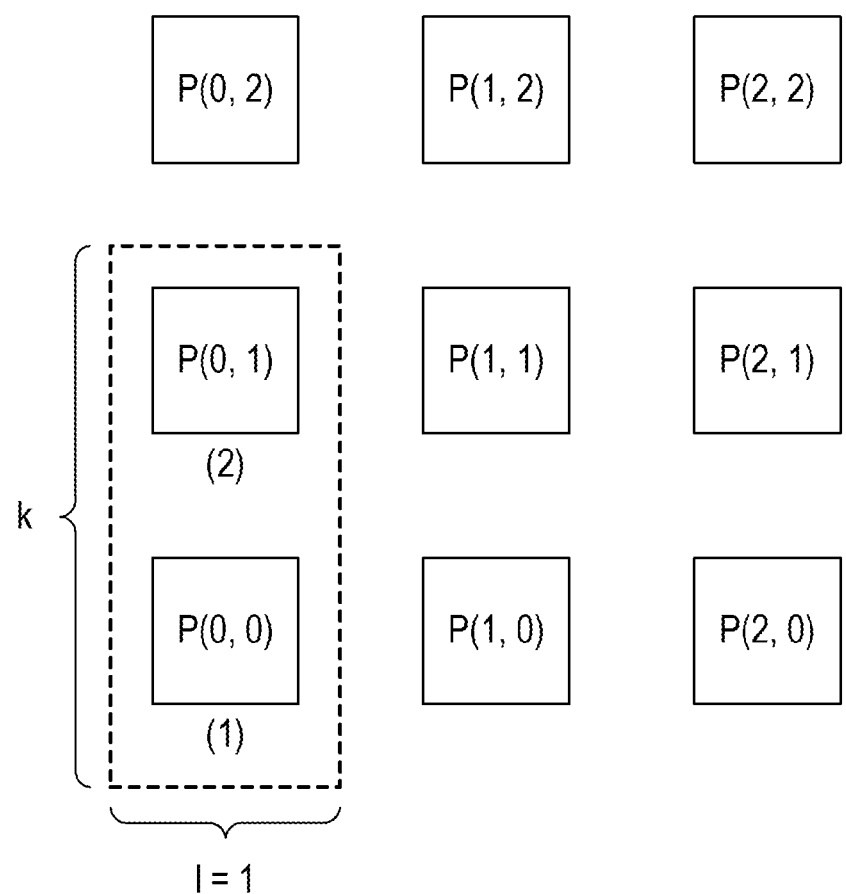
FIG. 42 is a diagram for describing the extension of a rectangular area.
Figure 43:
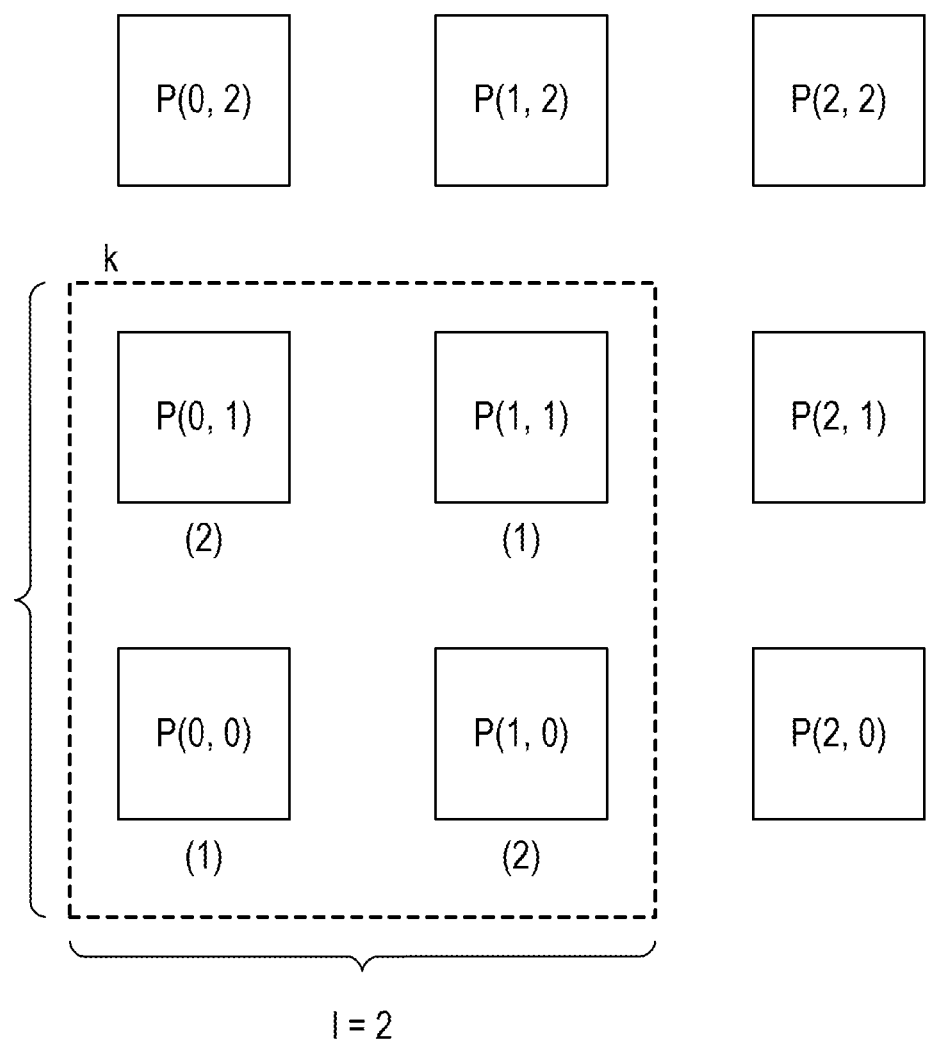
FIG. 43 is a diagram for describing the extension of the rectangular area.

FIGS. 42 and 43 are diagrams for describing the extension of the rectangular area. For example, as illustrated in FIG. 42, in an initial state, k=2 and l=1. The number of unused servers connected to the leaf switch P(0,0) included in the rectangular area is 1 and the number of unused servers connected to the leaf switch P(0,1) included in the rectangular area is 2. When n=6, since the number of unused servers is smaller than 6, the rectangular area is extended horizontally as illustrated in FIG. 43. The number of unused servers connected to the leaf switch P(1,0) in the rectangular area after extension is 2 and the number of unused servers connected to the leaf switch P(1,1) in the rectangular area after the extension is 1. In this case, since the number of unused servers in the rectangular area after the extension is 6, the extension of the rectangular area stops.

In the meantime, when the number of unused servers counted in step S155 is equal to or larger than n (step S157: Yes route), the setting unit 300 executes the following processing. Specifically, the setting unit 300 selects n execution servers from the rectangular area of (a, b)=(k, l) in the lattice portion of the finite projective plane and stores the identification information of the n selected execution servers in the job data storage unit 307 (step S161). In addition, the processing returns to the calling source.

When such processing is executed, the execution server may be selected from the viewpoint of utilizing the unused server. Further, in the example described above, the rectangular area is extended horizontally, but the rectangular area may be extended vertically.

Third Embodiment

In the third embodiment, selection processing different from the selection processing of the first and second embodiments is executed. The selection processing according to the third embodiment will be described with reference to FIG. 44.

Figure 44:
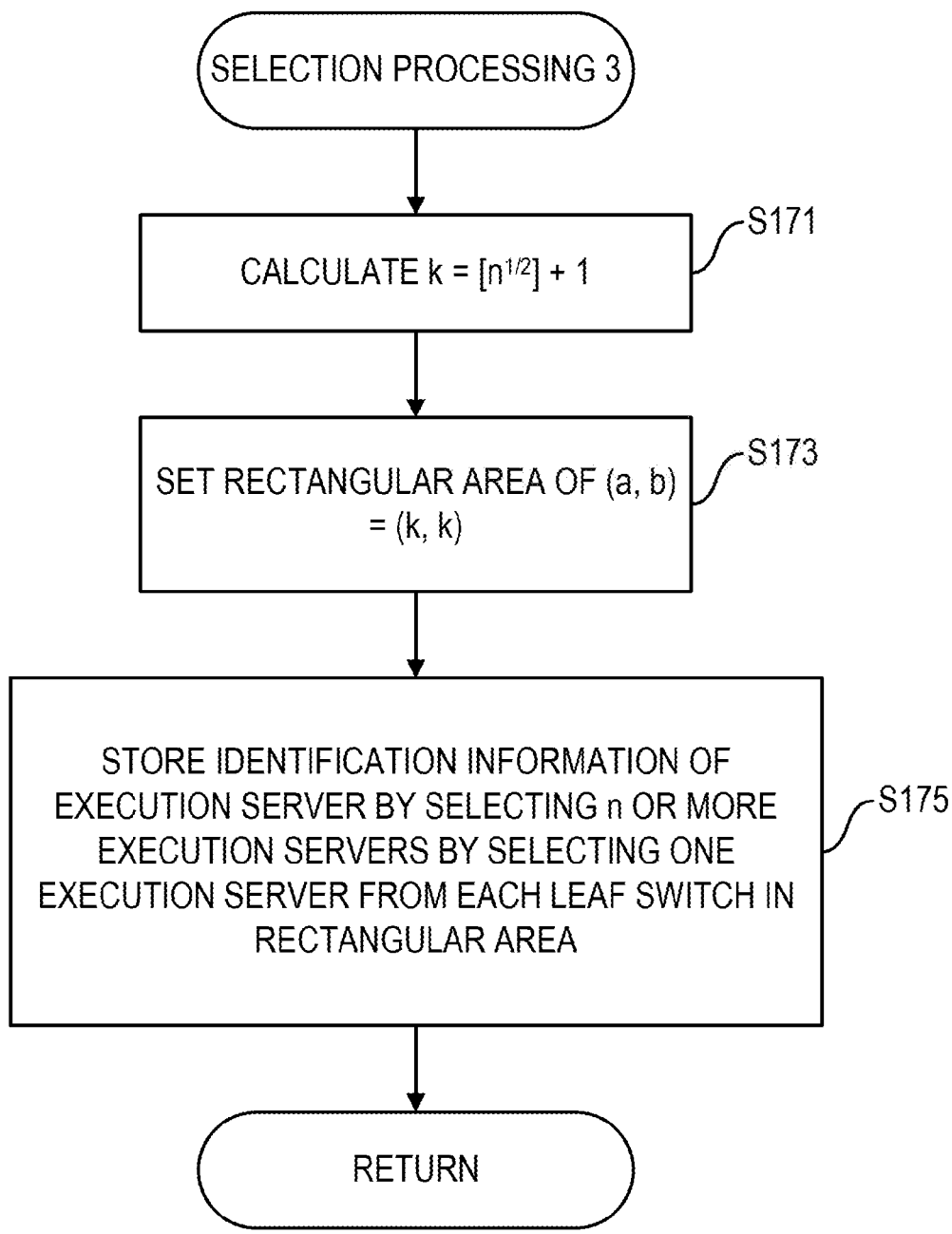
FIG. 44 is a diagram illustrating the processing flow of selection processing according to a third embodiment.

FIG. 44 is a diagram illustrating the processing flow of selection processing according to a third embodiment.

The setting unit 300 calculates k as $k=[n^{1/2}]+1$ (FIG. 44: step S171). n represents the number of execution servers, which is indicated by the information input in step S1.

The setting unit 300 sets a rectangular area of (a, b)=(k, k) in the lattice portion of the finite projective plane (step S173).

The setting unit 300 selects n or more execution servers by selecting one execution server from each leaf switch in the rectangular area and stores the identification information of the selected execution server in the job data storage unit 307 (step S175). In addition, the processing returns to the calling source.

When such processing is executed, since the number of execution servers connected to the execution switch is one or zero, it is possible to omit the all-reduce and the result distribution in each execution switch. As a result, a time until the all-reduce is completed may be shortened. The third embodiment is effective particularly when the communication cost between the switches is smaller than switch cost between the servers (e.g., a connection bandwidth between the switches is wider than the connection bandwidth between the servers).

Since n or more servers are selected as the execution server, overhead due to surplus servers occurs, but the overhead is at most approximately 1/k. A data amount of the surplus server is treated as 0.

Fourth Embodiment

In the fourth embodiment, selection processing different from the selection processing of the first to third embodiments is executed. The selection processing according to the fourth embodiment will be described with reference to FIG. 45.

Figure 45:
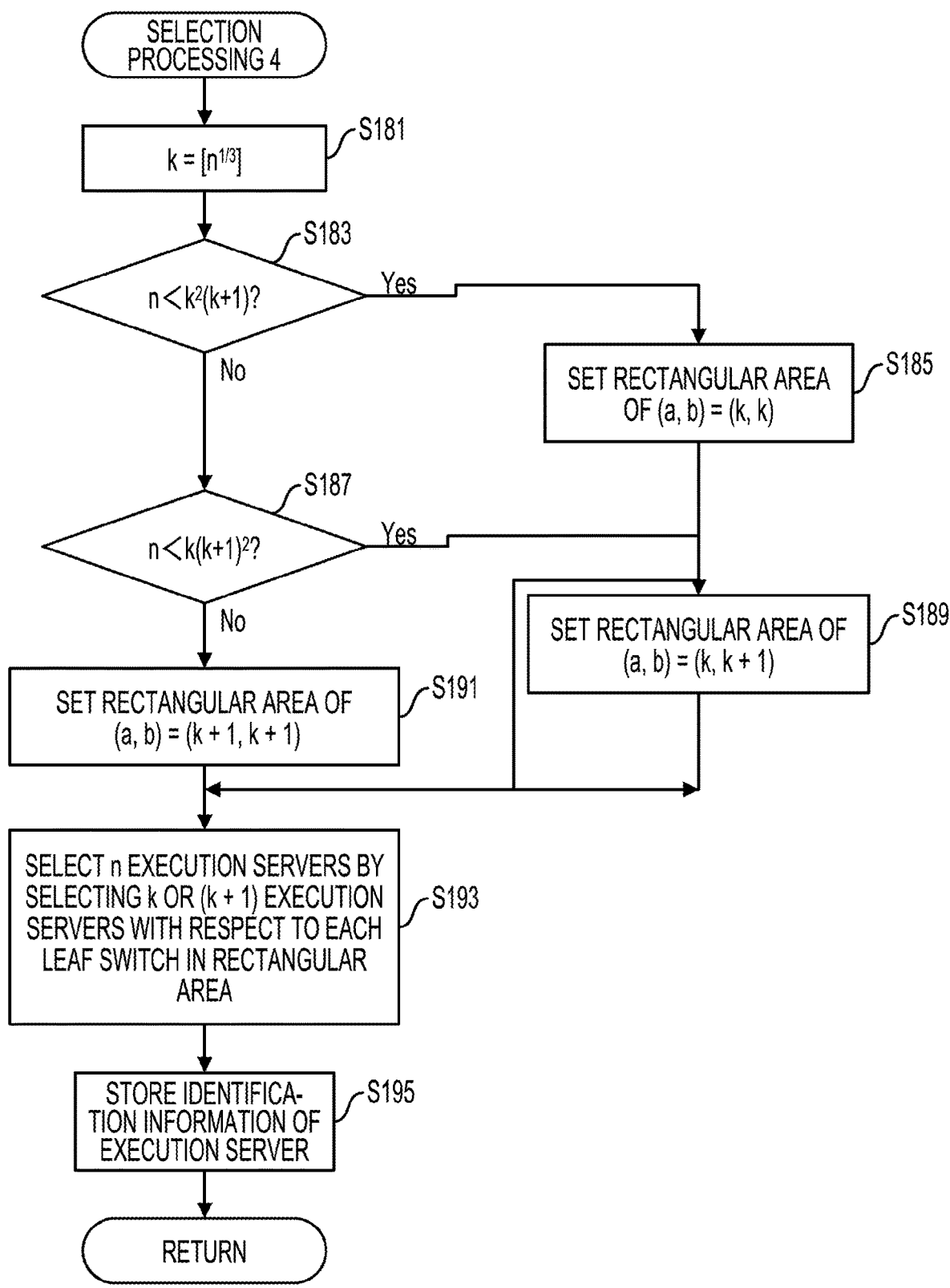
FIG. 45 is a diagram illustrating the processing flow of selection processing according to a fourth embodiment.

FIG. 45 is a diagram illustrating the processing flow of selection processing according to a fourth embodiment.

The setting unit 300 sets k as $k=[n^{1/3}]$ (FIG. 45: step S181). n represents the number of execution servers, which is indicated by the information input in step S1.

The setting unit 300 determines whether $n<k^2(k+1)$ is established (step S183).

When $n<k^2(k+1)$ is established (step S183: Yes route), the setting unit 300 sets the rectangular area of (a, b)=(k, k) in the lattice portion of the finite projection plane (step S185). Then, the processing proceeds to step S193.

When $n<k^2(k+1)$ is not established (step S183: No route), the setting unit 300 determines whether $n<k(k+1)_2$ is established (step S187).

When $n<k(k+1)^2$ is established (step S187: Yes route), the setting unit 300 sets a rectangular area of (a, b)=(k, k+1) in the lattice portion of the finite projection plane (step S189). Then, the processing proceeds to step S193.

When $n<k(k+1)^2$ is not established (step S187: No route), the setting unit 300 sets a rectangular area of (a, b)=(k+1, k+1) in the lattice portion of the finite projection plane (step S191).

The setting unit 300 selects a total of n execution servers by selecting k or (k+1) execution servers for each leaf switch in the set rectangular area (step S193).

The setting unit 300 stores the identification information of n execution servers selected in step S193 in the job data storage unit 307 (step S195). In addition, the processing returns to the calling source.

When such processing is executed, since a difference between the variables a, b, and c is at most 1, it is possible to minimize the overhead caused by a bias in the size of the variable.

Fifth Embodiment

In the fifth embodiment, selection processing different from the selection processing of the first to fourth embodiments is executed. The selection processing according to the fifth embodiment will be described with reference to FIG. 46.

Figure 46:
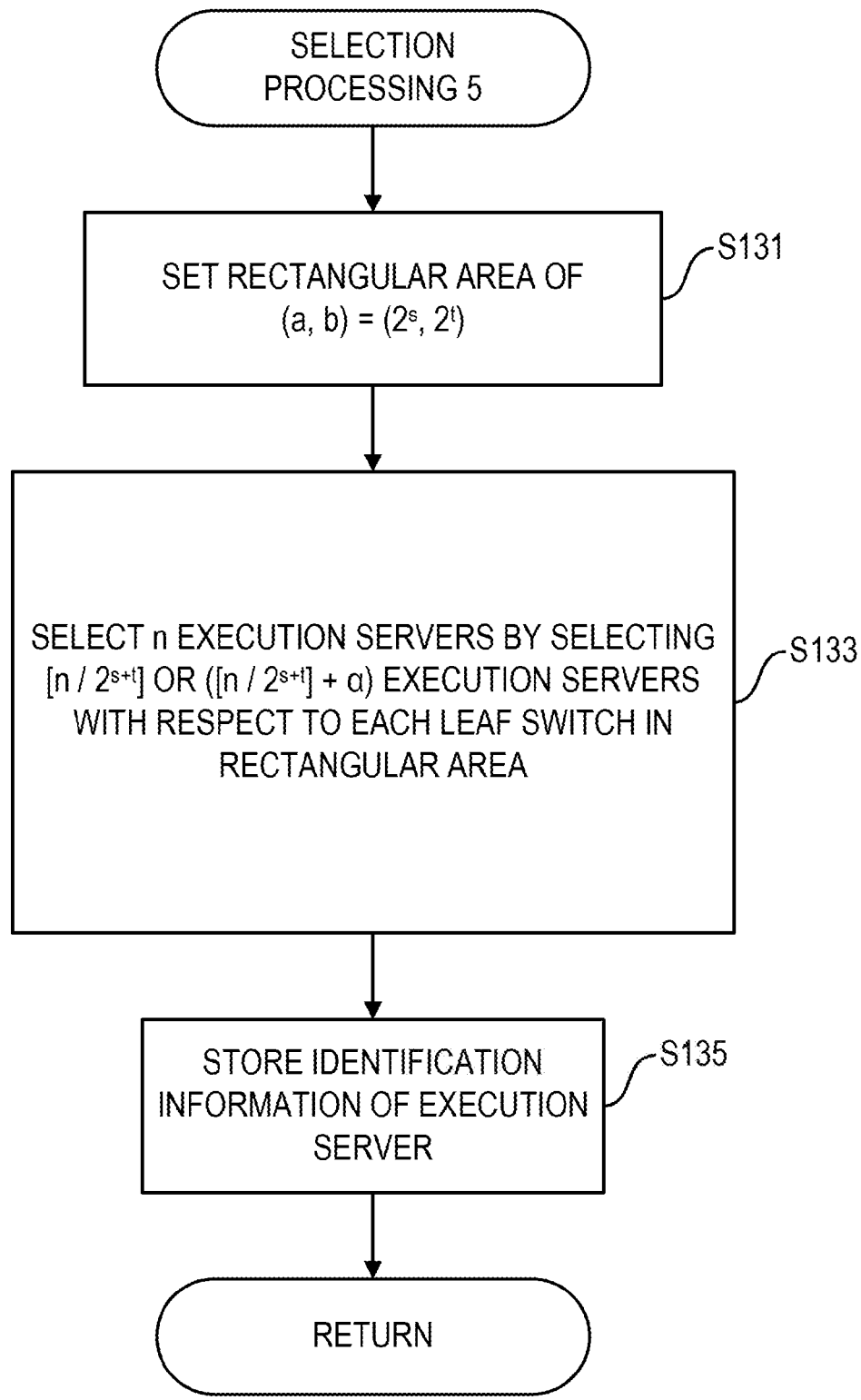
FIG. 46 is a diagram illustrating a processing flow of selection processing according to a fifth embodiment.

FIG. 46 is a diagram illustrating a processing flow of selection processing according to a fifth embodiment.

The setting unit 300 sets a rectangular area of (a, b)=($2^s$, $2^t$) in the lattice portion of the finite projection plane (FIG. 46: step S131). s and t are the natural numbers.

The setting unit 300 selects a total of n execution servers by selecting $[n/2^{s+t}]$ or ($[n/2^{s+t}]+\alpha$) execution servers for each leaf switch set in step S131 (step S133). $\alpha$ is the natural number. n represents the number of execution servers, which is indicated by the information input in step S1.

The setting unit 300 stores the identification information of n execution servers selected in step S133 in the job data storage unit 307 (step S135). In addition, the processing returns to the calling source.

When the variables a, b, and $c_i$ are the powers of 2, the number of phases of the all-reduce may be reduced. In the fifth embodiment, since at least the variables a and b are the powers of 2, it is possible to shorten the time for the all-reduce communication.

For example, it is assumed that the designated number of execution servers is 729. In this case, when $a=b=c_i=9$, the number of phases of the communication is 5*4=20. In the meantime, when $a=2^4=16$, $b=2^5=32$, and c=1 or 2, the number of phases of the communication is 11 (=1+4+5+1).

Sixth Embodiment

In the first to fifth embodiments, the first communication table for the all-reduce is generated in the first generation processing, but in the sixth embodiment, the first communication table for the reduce is generated in the first generation processing. When the server having the result of the reduce is the representative server, subsequent communication is the same as that in the first to fifth embodiments.

Figure 47:
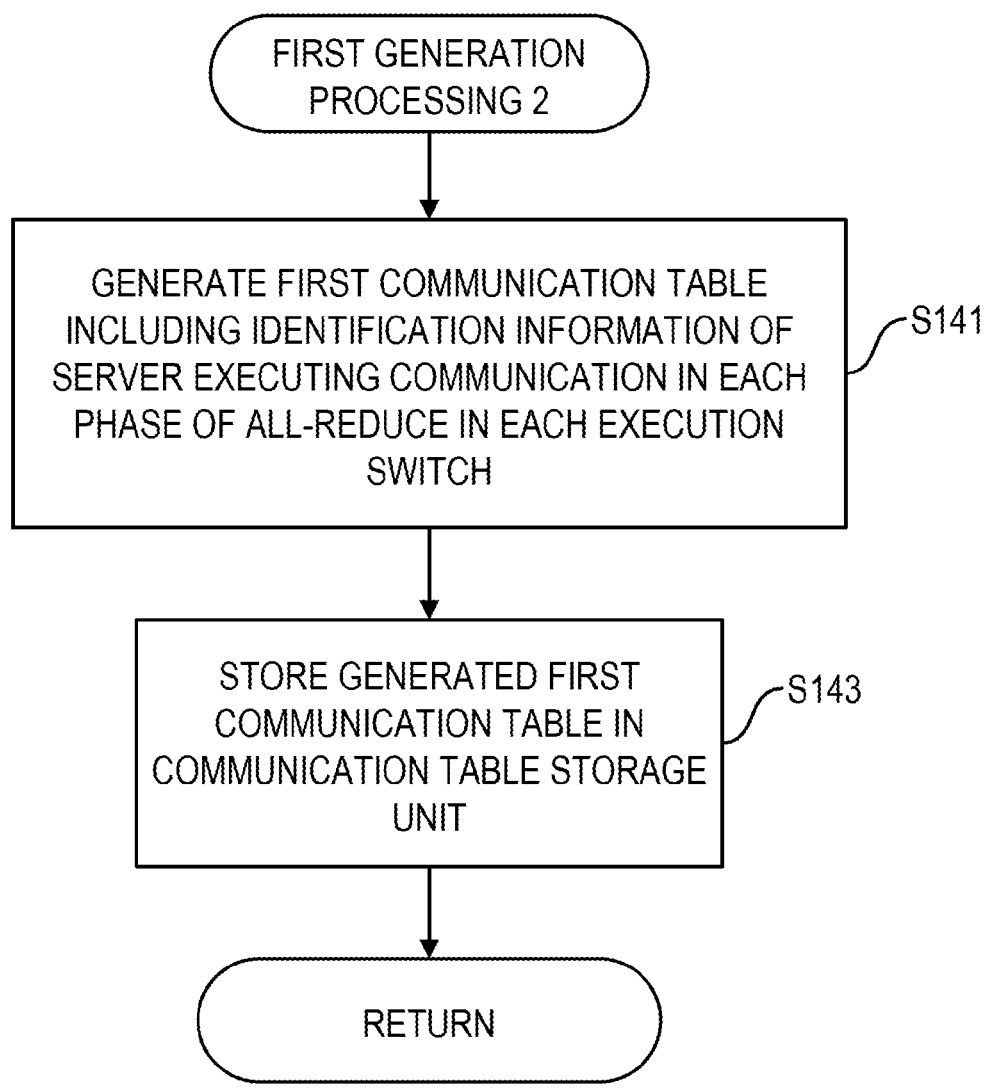
FIG. 47 is a diagram illustrating the processing flow of first generation processing according to a sixth embodiment.

FIG. 47 is a diagram illustrating the processing flow of first generation processing according to a sixth embodiment.

The first generation unit 3011 generates the first communication table including the identification information of the server that executes the communication in each phase of the reduce in each execution switch (FIG. 47: step S141).

Figure 48:
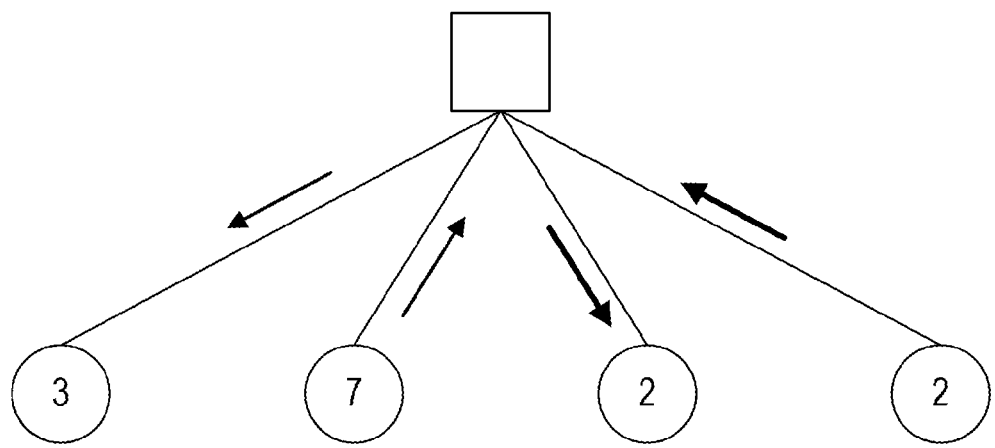
FIG. 48 is a diagram for describing the reduce implemented by a first communication table according to the sixth embodiment.
Figure 49:
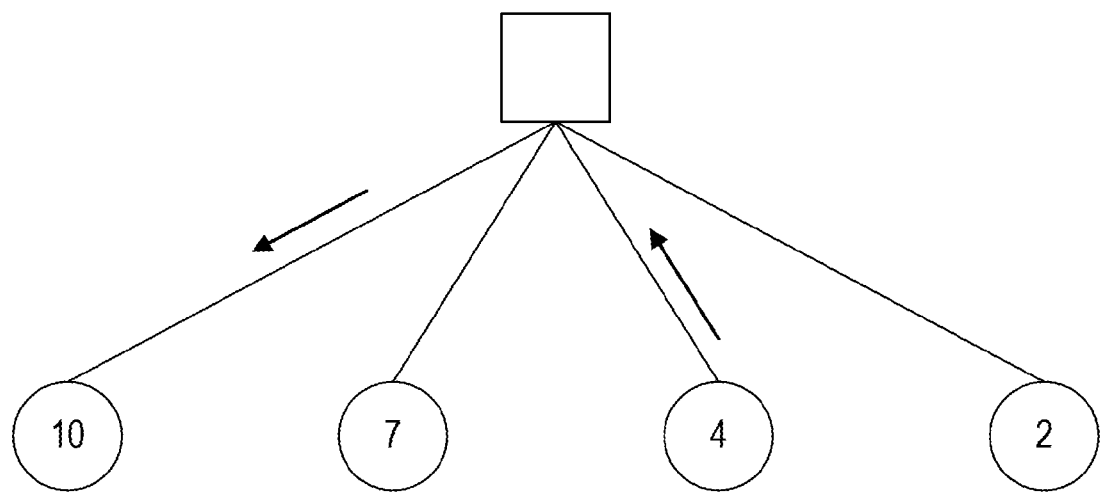
FIG. 49 is a diagram for describing the reduce implemented by the first communication table according to the sixth embodiment.
Figure 50:
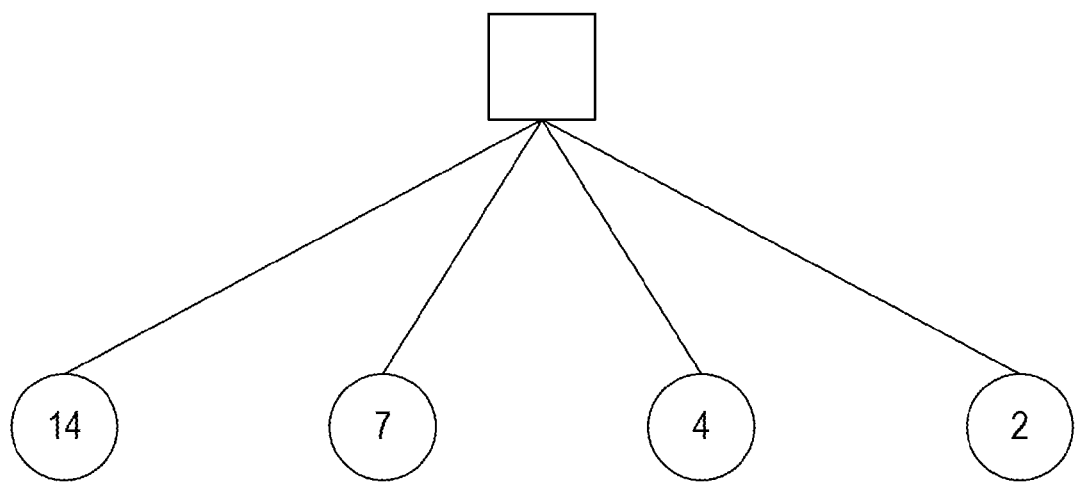
FIG. 50 is a diagram for describing the reduce implemented by the first communication table according to the sixth embodiment.

The reduce to be implemented in the first communication table according to the sixth embodiment will be described with reference to FIGS. 48 to 50. In FIGS. 48 to 50, as an example, one leaf switch and four servers connected to the leaf switch are illustrated and it is assumed that the communication is performed so that the server located at the leftmost side (hereinafter, referred to as the representative server) has the result of the reduce.

First, as illustrated in FIG. 48, the second server from a left side transmits the value of "7" to the representative server and the fourth server from the left side concurrently transmits the value of "2" to the third server from the left side. The representative server and the third server from the left side execute the operation (herein, addition).

Then, as illustrated in FIG. 49, the representative server has the value of "10" and the third server from the left side has the value of "4". Then, the third server from the left side transmits the value of "4" to the representative server. The representative server executes the operation.

Then, as illustrated in FIG. 50, the representative server has the value of "14" corresponding to the sum of four original numbers. The reduce is implemented as described above. Since the number of phases is 2 and the number d of servers is 4, the reduce is implemented in O(log(d)) phase. A base of a logarithm is 2. Since there is no link where the plurality of packets is simultaneously transmitted in the same direction in any phase, the route contention does not occur.

Referring back to the description of FIG. 47, the first generation unit 3011 stores the first communication table generated in step S141 in the communication table storage unit 303 (step S143). In addition, the processing returns to the calling source. Further, since the first communication table generated in the sixth embodiment has the same format as that of the first communication table generated in the first embodiment, the detailed description thereof will be omitted herein.

When such processing is executed, the number of phases of the communication to be implemented in the first communication table may be reduced as compared with the case of the all-reduce.

Although an embodiment of the present disclosure has been described above, the present disclosure is not limited thereto. For example, functional block configurations of the management apparatus 3 and the server described above may not match an actual program module configuration.

The configuration of each table described above is an example and does not need to be particularly limited thereto. Further, even in the processing flow, when a processing result is not changed, it is also possible to change the order of the processing. Further, it may be made to execute the processing in parallel.

In the example described above, the addition is performed as the operations of the all-reduce and the reduce, but an operation (e.g., multiplication) other than the addition may be performed.

APPENDIX

In the appendix, the Latin square fat tree and the finite projection plane will be described.

Figure 51:
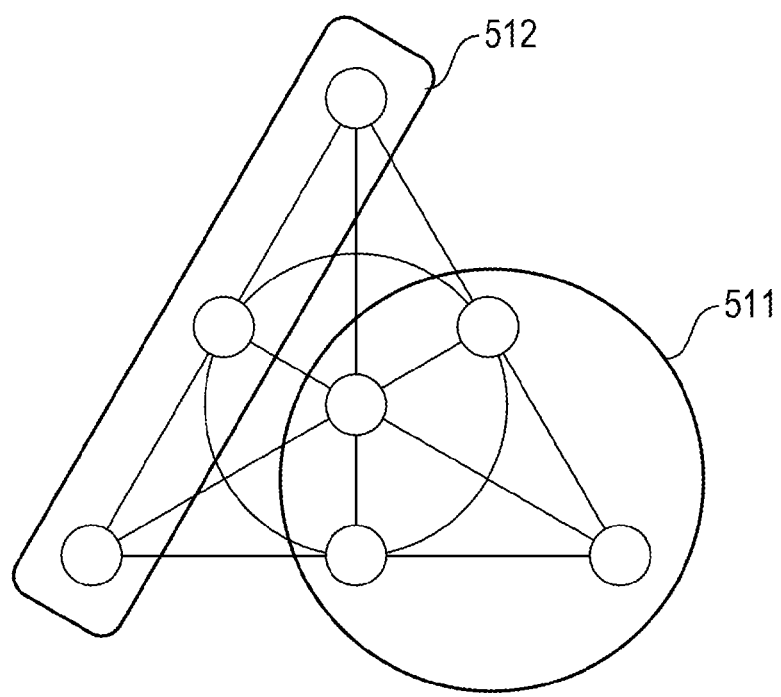
FIG. 51 is a diagram for describing the Latin square fat tree and a finite projective plane.

The finite projective plane is equivalent to a plane obtained by adding some infinite points to a normal plane and eliminating "two straight lines parallel to each other". FIG. 51 illustrates a structure of a finite projective plane when the order (hereinafter, referred to as n) is 2 and the number of ports is 6 (=2(n+1)). In FIG. 51, 3 (=n+1) leaf switches surrounded by a frame 512 correspond to an infinite point.

In the finite projective plane, one point P is set and n points P(c) (c=0, 1, . . . , n−1) are set and $n^2$ points P (c, r) (c, r=0, 1, . . . , n−1) are set. Further, one straight line L={P, P(0), . . . , P(n−1)} is set and n straight lines L={P, P(c, 0), . . . , P(c, n−1)} (c=0, 1, . . . , n−1) are set, and $n^2$ straight lines L(c, r)={P(c) and P(i, (r+ci) mod n)}(i, c, r=0, 1, . . . , n−1) are set.

As a feature of the finite projective plane, $(n^2+n+1)$ points exist and the number of straight lines is $(n^2+n+1)$. Two predetermined straight lines intersect at one point and only one straight line connecting two predetermined points exists. However, there is a constraint that n is a prime number.

Figure 52A:
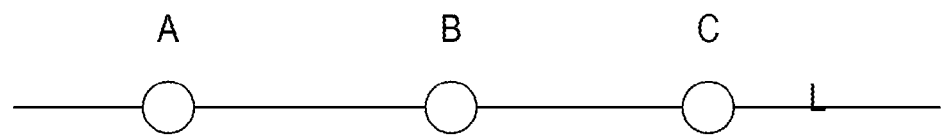
FIGS. 52A and 52B are diagrams for describing the Latin square fat tree and the finite projective plane.
Figure 52B:
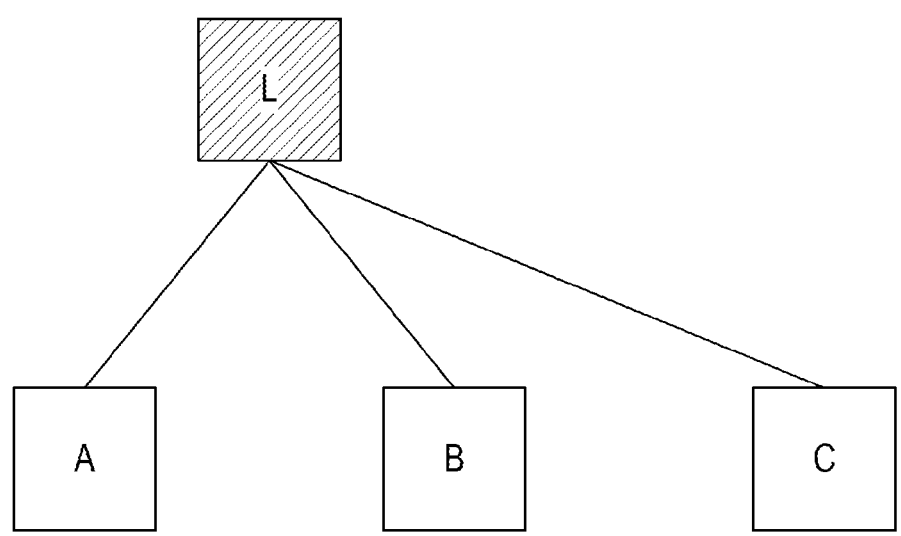

The structure of the finite projective plane is replaced by a topology structure. For example, the structure of the finite projective plane illustrated in FIG. 52A is replaced by the topology structure illustrated in FIG. 52B. In FIG. 52A, the straight line represents the spine switch and the point represents the leaf switch. In FIG. 52B, a hatched rectangle represents the spine switch and a non-hatched rectangle represents the leaf switch.

Figure 53A:
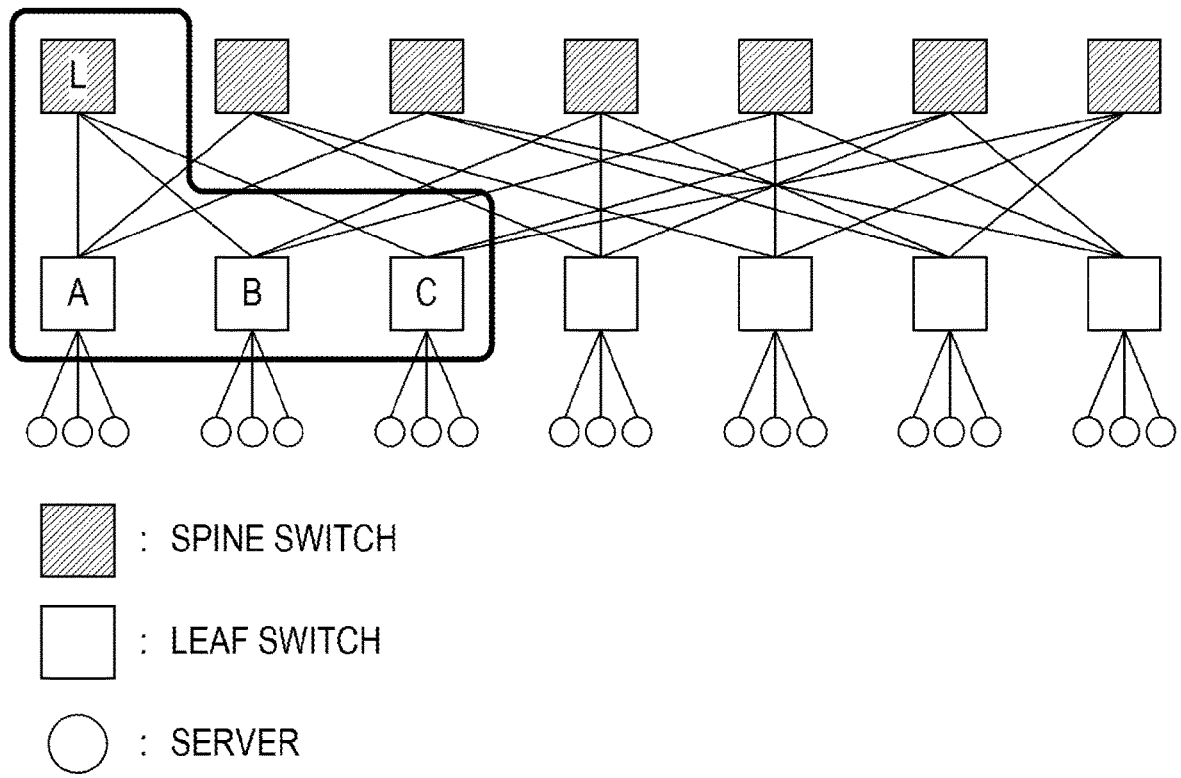
FIGS. 53A and 53B are diagrams for describing the Latin square fat tree and the finite projective plane.
Figure 53B:
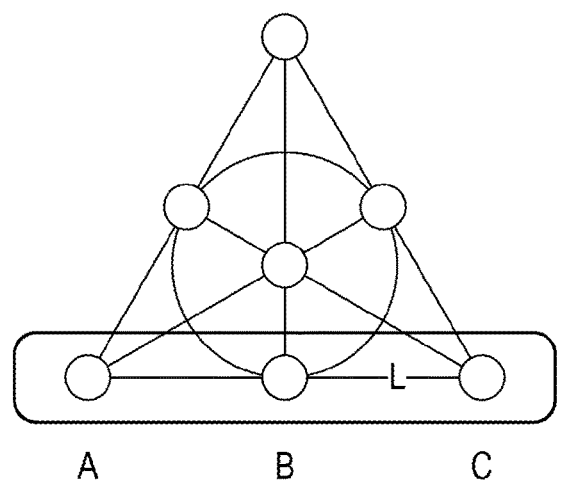

The topology structure illustrated in FIG. 53A is the topology structure of the Latin square fat tree in which the number of spine switches is 7 and the number of leaf switches is 7 and corresponds to the finite projective plane illustrated in FIG. 53B. The topology structure of a portion surrounded by a thick line in FIG. 53A is the same as the topology structure of FIG. 52B. Further, the structure of a portion surrounded by the thick line in FIG. 53B corresponds to the topology structure of the portion surrounded by the thick line in FIG. 53A.

Figure 54:
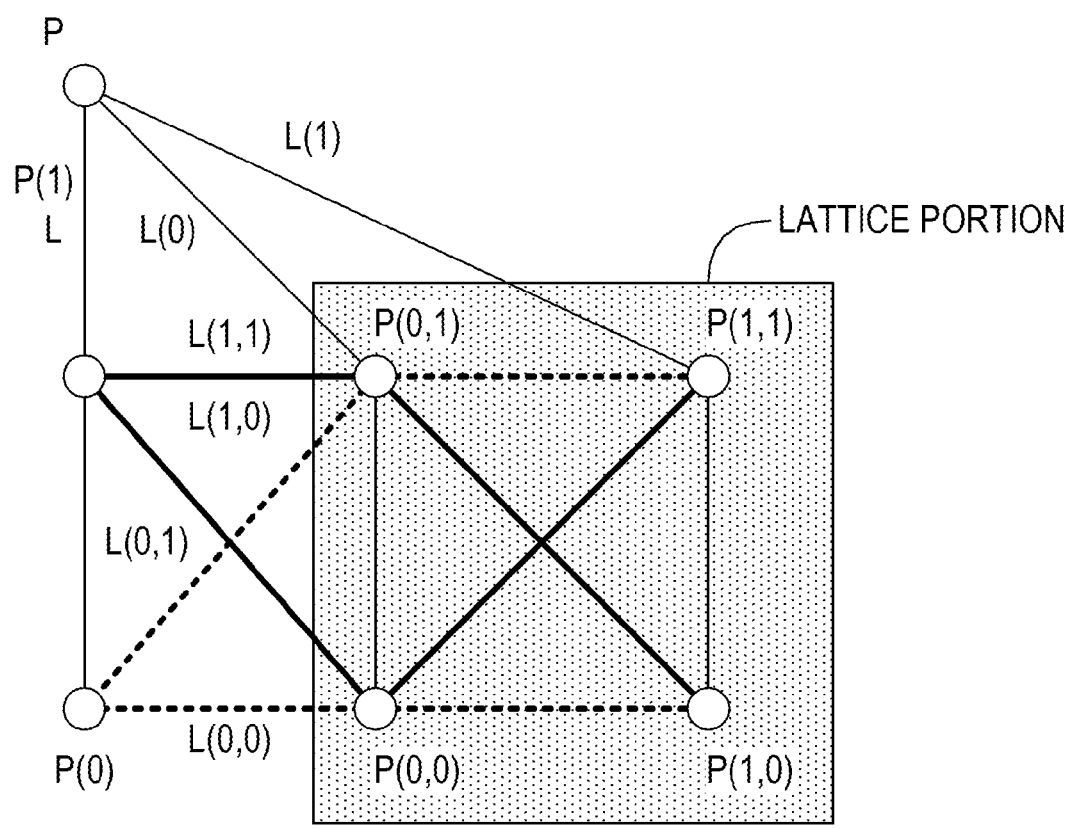
FIG. 54 is a diagram for describing the Latin square fat tree and the finite projective plane.

The structure illustrated in FIG. 53B may be converted to the structure illustrated in FIG. 54. In FIG. 54, 4 (=n*n) leaf switches included in a hatched lattice portion correspond to four leaf switches included in the portion surrounded by the frame 511 in FIG. 51. A group of parallel straight lines in the lattice portion is converted to intersect at additional points.

That is, straight lines having equal inclinations are converted to intersect each other.

This concludes the appendix.

Figure 55:
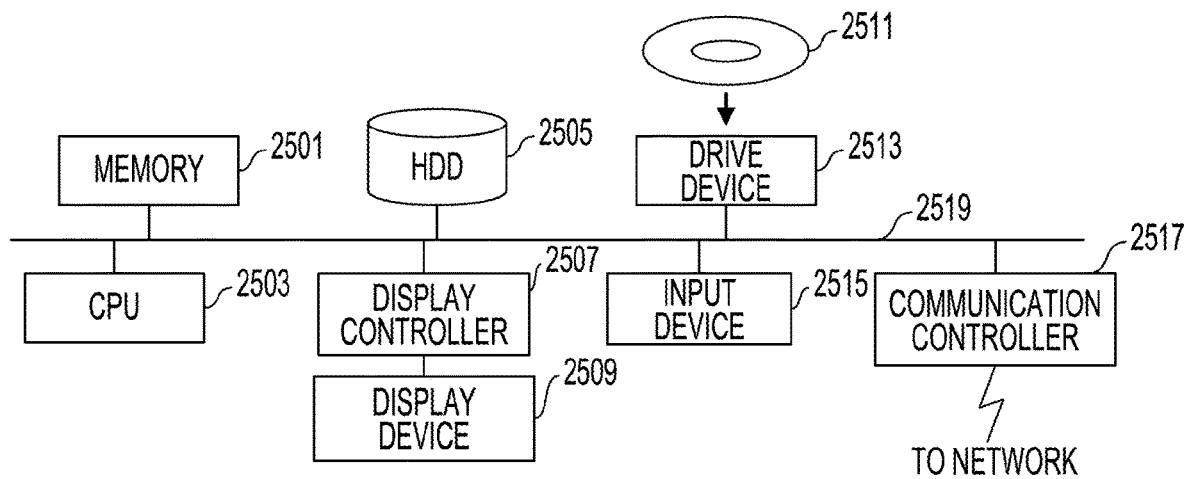
FIG. 55 is a functional block diagram of a computer.

The management apparatus 3 and the server described above are computer apparatuses, and as illustrated in FIG. 55, the memory 2501, the CPU 2503, the HDD 2505, a display controller 2507 connected to a display device 2509, a drive device 2513 for a removable disk 2511, an input device 2515, and a communication controller 2517 for connection with a network are connected through a bus 2519. An operating system (OS) and an application program for executing processing in the embodiment are stored in the HDD 2505 and read from the HDD 2505 to the memory 2501 when executed by the CPU 2503. The CPU 2503 controls the display controller 2507, the communication controller 2517, and the drive device 2513 in accordance with processing contents of the application program to perform a predetermined operation. Further, data being processed is mainly stored in the memory 2501, but may be stored in the HDD 2505. In the embodiment of the present disclosure, the application program for carrying out the processing described above is stored and distributed in the computer readable removable disk 2511 and is installed from the drive device 2513 into the HDD 2505. The application program may be installed in the HDD 2505 via the network such as the Internet and the communication controller 2517. Such a computer apparatus implements various functions as described above by organically cooperating hardware such as the CPU 2503, the memory 2501, or the like and a program such as the OS, the application program, or the like.

Figure 56:
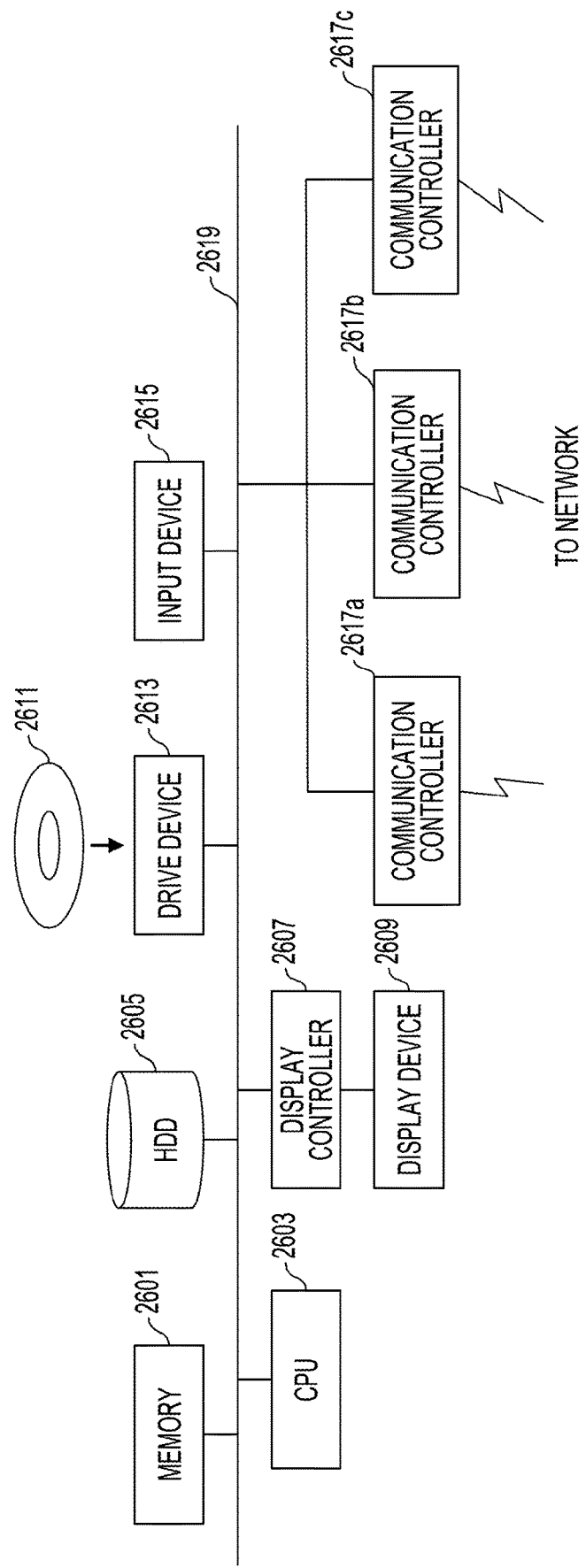
FIG. 56 is a functional block diagram of a switch.

In the leaf switch and the spine switch, the memory 2601, the CPU 2603, the HDD 2605, the display controller 2607 connected to the display device 2609, the drive device 2613 for the removable disk 2611, the input device 2615, and the communication controller 2617 (2617a to 2617c in FIG. 56) for connection with the network may be configured to be connected through the bus 2619 as illustrated in FIG. 56. Further, in some cases, the display controller 2607, the display device 2609, the drive device 2613, and the input device 2615 may not be included. The operating system (OS) and the application program for executing the processing in the embodiment are stored in the HDD 2605 and read from the HDD 2605 to the memory 2601 when executed by the CPU 2603. As necessary, the CPU 2603 controls the display controller 2607, the communication controller 2617, and the drive device 2613 to perform required operations. Further, data input through any one of the communication controllers 2617 is output through another communication controller 2617. The CPU 2603 controls the communication controller 2617 to appropriately switch an output destination. Further, the data being processed is stored in the memory 2601, but may be stored in the HDD 2605 if necessary. In the embodiment of the present technology, the application program for carrying out the processing described above is stored and distributed in the computer readable removable disk 2611 and is installed from the drive device 2613 into the HDD 2605. The application program may be installed in the HDD 2605 via the network such as the Internet or the like and the communication controller 2617. Such a computer apparatus implements various functions as described above by organically cooperating hardware such as the CPU 2603 or the memory 2601, the OS, a required application program, and the like.

The embodiment of the present disclosure described above is summarized as follows.

An information processing system according to a first aspect of the present embodiment includes (A) a plurality of leaf switches (the leaf switch in the embodiment is an example of the plurality of leaf switches) whose connection form is the Latin square fat tree, (B) a plurality of information processing apparatuses (the server in the embodiments is an example of the plurality of information processing apparatuses) connected to any one of a plurality of leaf switches, respectively, and (C) a management apparatus. In addition, the management apparatus includes (c1) a specifying unit (the setting unit 300 in the embodiment is an example of the specifying unit) extracting one or a plurality of rows and one or a plurality of columns from the lattice portion which is a portion other than an infinite original point of the finite projective plane corresponding to the Latin square fat tree and specifying a leaf switch corresponding to a point included in one or the plurality of rows which is extracted, and included in one or the plurality of columns which is extracted and (c2) a transmission unit (the communication table generation unit 301 in the embodiment is an example of the transmission unit) transmitting an instruction to execute the all-reduce to a predetermined number of information processing apparatuses among the information processing apparatuses connected to the specified leaf switch.

Some servers in the Latin square fat tree system may execute the all-reduce. Further, since the leaf switches connected to the same spine switch are used for the all-reduce, efficient communication is available in the all-reduce.

The specifying unit may (c11) extract one or the plurality of rows and one or the plurality of columns from a rectangular area having a maximum value of a predetermined optimization function among rectangular areas included in the lattice portion.

Comprehensively, appropriate rows and columns may be automatically selected.

The predetermined optimization function may be a function based on at least the communication cost, the use situation of the plurality of information processing apparatuses, and the physical positions of the plurality of leaf switches.

It is possible to select an appropriate row and column while considering at least the communication cost, the use situation of the plurality of information processing apparatuses, the physical positions of the plurality of leaf switches, and the like.

The specifying unit may (c12) extend the rectangular area until the number of first information processing apparatuses connected to the leaf switch in the rectangular area included in the lattice portion and not in use exceeds a predetermined number and extract one or the plurality of rows and one or the plurality of columns from the rectangular area when the number of first information processing apparatuses exceeds the predetermined number.

It is possible to perform appropriate extraction according to the use situation of the information processing apparatus.

The specifying unit may (c13) extract one or the plurality of rows and one or the plurality of columns from a rectangular area having a number obtained by adding 1 to an integer portion of a square root of a predetermined number as the number of rows and the corresponding number as the number of columns.

When the number of information processing apparatuses connected to the leaf switch is plural, the communication is performed between the information processing apparatuses. As described above, since the number of leaf switches connected to the leaf switches in the rectangular area is 0 or 1, the communication between the information processing apparatuses connected to the leaf switch is omitted to shorten the time required until the all-reduce is completed.

The specifying unit may (c14) calculate a first number corresponding to an integer portion of a cubic root of a predetermined number, extract one or the plurality of rows and one or the plurality of columns from a rectangular area having the first number as the number of rows and the first number as the number of columns when the predetermined number is smaller than a product of a square of the first number and a value obtained by adding 1 to the first number, extract one or the plurality of rows and one or the plurality of columns from a rectangular area having the first number as the number of rows and the value obtained by adding 1 to the first number as the number of columns when the predetermined number is equal to or larger than the product of the square of the first number and the value obtained by adding 1 to the first number and is smaller than the product of the first number and the square of the value obtained by adding 1 to the first number, and extract one or the plurality of rows and one or the plurality of columns from a rectangular area having the value obtained by adding 1 to the first number as the number of rows and the value obtained by adding 1 to the first number as the number of columns when the predetermined number is equal to or larger than the product of the first number and the square of the value obtained by adding 1 to the first number.

It is possible to reduce the overhead caused by the bias of the number of rows and the number of columns.

In addition, the specifying unit may (c15) extract one or the plurality of rows and one or the plurality of columns from a rectangular area having the power of 2 as the number of rows and the power of 2 as the number of columns.

In a case where the number of rows or the number of columns is not the power of 2 of the information processing apparatus, more phases are required for the all-reduce as compared with a case where the number of rows or the number of columns is the power of 2 of the information processing apparatus. That is, the overhead of the communication occurs. Therefore, when the above-described processing is executed, the overhead of the communication may be reduced.

The specifying unit may (c16) extract a predetermined number of information processing apparatuses so that the number of information processing apparatuses extracted from each of the specified leaf switches is evened.

It is possible to reduce the overhead caused by the bias of the number of information processing apparatuses.

The information processing apparatus that receives the execution instruction may (b1) execute the all-reduce so as not to transmit data to an information processing apparatus that transmits the data to one other information processing apparatus and receives data from another information processing apparatus in each phase of the communication.

It is possible to suppress the occurrence of the route contention.

A management apparatus according to a second aspect of the embodiment includes (D) a specifying unit (the setting unit 300 in the embodiment is an example of the specifying unit) that extracts one or a plurality of rows and one or a plurality of columns from the lattice portion which is a portion other than an infinite original point of the finite projection plane corresponding to the Latin square fat tree related with an information processing system including a plurality of leaf switches whose connection form is the Latin square fat tree and a plurality of information processing apparatuses each connected to any one of the plurality of leaf switches and specifies a leaf switch corresponding to a point included in one or the plurality of rows which is extracted and included in one or the plurality of columns which is extracted and (E) a transmission unit (the communication table generation unit 301 in the embodiment is an example of the transmission unit) that transmits an instruction to execute the all-reduce to a predetermined number of information processing apparatuses among the information processing apparatuses connected to the specified leaf switch.

An information processing method according to a third aspect of the embodiment includes (F) extracting one or a plurality of rows and one or a plurality of columns from the lattice portion which is a portion other than an infinite original point of the finite projection plane corresponding to the Latin square fat tree related with an information processing system including a plurality of leaf switches whose connection form is the Latin square fat tree and a plurality of information processing apparatuses each connected to any one of the plurality of leaf switches and specifying a leaf switch corresponding to a point included in one or the plurality of rows which is extracted and included in one or the plurality of columns which is extracted and (G) transmitting an instruction to execute the all-reduce to a predetermined number of information processing apparatuses among the information processing apparatuses connected to the specified leaf switch.

A program for causing the computer to execute the processing by the method may be created and the program is stored in a computer-readable memory medium or memory device such as a flexible disk, a CD-ROM, a magneto-optical disk, a semiconductor memory, a hard disk, or the like. In addition, an intermediate processing result is temporarily stored in a memory device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system, comprising:
   a plurality of leaf switches connected in a form of a Latin square fat tree;
   a plurality of information processing apparatuses connected to any one of the plurality of leaf switches, respectively; and
   a management apparatus including a first processor configured to:
   extract one or more rows and one or more columns from a lattice portion other than an infinite original point of a finite projection plane corresponding to the Latin square fat tree;
   specify leaf switches corresponding to points included in the extracted one or more rows and included in the extracted one or more columns;
   transmit an instruction to execute an all-reduce communication, in which a result of the communication is shared by all members that execute the communication, to a predetermined number of information processing apparatuses among the information processing apparatuses connected to the specified leaf switches;
calculate a first number corresponding to an integer portion of a cubic root of the predetermined number;
calculate a second number by adding 1 to the first number;
extract the one or more rows and the one or more columns from a rectangular area having the first number as a number of rows and as a number of columns when the predetermined number is smaller than a product of a square of the first number and the second number;
extract the one or more rows and the one or more columns from a rectangular area having the first number as the number of rows and the second number as the number of columns when the predetermined number is equal to or larger than the product of the square of the first number and the second number and is smaller than a product of the first number and a square of the second number; and
extract the one or more rows and the one or more columns from a rectangular area having the second number as the number of rows and as the number of columns when the predetermined number is equal to or larger than the product of the first number and the square of the second number.

2. The information processing system according to claim 1, wherein
the first processor is configured to:
extract the one or more rows and the one or more columns from a rectangular area having a maximum value of a predetermined optimization function among rectangular areas included in the lattice portion.

3. The information processing system according to claim 2, wherein
the predetermined optimization function is a function based on at least communication cost, use situations of the plurality of information processing apparatuses, and physical positions of the plurality of leaf switches.

4. The information processing system according to claim 1, wherein
the first processor is configured to:
extend a rectangular area included in the lattice portion until a number of first information processing apparatuses, which are connected to the leaf switches in the rectangular area and not in use, exceeds a predetermined number; and
extract the one or more rows and the one or more columns from the rectangular area when the number of first information processing apparatuses exceeds the predetermined number.

5. The information processing system according to claim 1, wherein
the first processor is configured to:
extract the one or more rows and the one or more columns from a rectangular area having a number obtained by adding 1 to an integer portion of a square root of the predetermined number as a number of rows and as a number of columns.

6. The information processing system according to claim 1, wherein
the first processor is configured to:
extract the one or more rows and the one or more columns from a rectangular area having a power of 2 as a number of rows and a power of 2 as a number of columns.

7. The information processing system according to claim 1, wherein the first processor is configured to:
extract the predetermined number of information processing apparatuses so that numbers of information processing apparatuses extracted from the respective specified leaf switches are evened.

8. The information processing system according to claim 1, wherein
each of the plurality of information processing apparatuses includes a second processor configured to:
execute the all-reduce communication upon receiving the instruction such that, in each phase of the communication, data is transmitted to an information processing apparatus that does not receive other data from another information processing apparatus.

9. A management apparatus, comprising:
a memory; and
a processor coupled to the memory and the processor configured to:
extract one or more rows and one or more columns from a lattice portion other than an infinite original point of a finite projection plane corresponding to a Latin square fat tree corresponding to a plurality of leaf switches connected in a form of the Latin square fat tree;
specify leaf switches corresponding to points included in the extracted one or more rows and included in the extracted one or more columns;
transmit an instruction to execute an all-reduce communication, in which a result of the communication is shared by all members that execute the communication, to a predetermined number of information processing apparatuses among the information processing apparatuses connected to the specified leaf switches;
calculate a first number corresponding to an integer portion of a cubic root of the predetermined number;
calculate a second number by adding 1 to the first number;
extract the one or more rows and the one or more columns from a rectangular area having the first number as a number of rows and as a number of columns when the predetermined number is smaller than a product of a square of the first number and the second number;
extract the one or more rows and the one or more columns from a rectangular area having the first number as the number of rows and the second number as the number of columns when the predetermined number is equal to or larger than the product of the square of the first number and the second number and is smaller than a product of the first number and a square of the second number; and
extract the one or more rows and the one or more columns from a rectangular area having the second number as the number of rows and as the number of columns when the predetermined number is equal to or larger than the product of the first number and the square of the second number.

10. A non-transitory computer-readable recording medium having stored therein a program that causes a computer to execute a process, the process comprising:
extract one or more rows and one or more columns from a lattice portion other than an infinite original point of a finite projection plane corresponding to a Latin square fat tree corresponding to a plurality of leaf switches connected in a form of the Latin square fat tree;
specify leaf switches corresponding to points included in the extracted one or more rows and included in the extracted one or more columns;
transmit an instruction to execute an all-reduce communication, in which a result of the communication is shared by all members that execute the communication, to a predetermined number of information processing apparatuses among the information processing apparatuses connected to the specified leaf switches;

calculate a first number corresponding to an integer portion of a cubic root of the predetermined number;

calculate a second number by adding 1 to the first number;

extract the one or more rows and the one or more columns from a rectangular area having the first number as a number of rows and as a number of columns when the predetermined number is smaller than a product of a square of the first number and the second number;

extract the one or more rows and the one or more columns from a rectangular area having the first number as the number of rows and the second number as the number of columns when the predetermined number is equal to or larger than the product of the square of the first number and the second number and is smaller than a product of the first number and a square of the second number; and extract the one or more rows and the one or more columns from a rectangular area having the second number as the number of rows and as the number of columns when the predetermined number is equal to or larger than the product of the first number and the square of the second number.

* * * * *